United States Patent
Uchimura et al.

(10) Patent No.: US 10,880,532 B2
(45) Date of Patent: *Dec. 29, 2020

(54) REPRODUCTION DEVICE, REPRODUCTION METHOD, AND RECORDING MEDIUM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,904

(22) Filed: Oct. 2, 2019

(65) Prior Publication Data

US 2020/0236335 A1 Jul. 23, 2020

Related U.S. Application Data

(63) Continuation of application No. 16/385,206, filed on Apr. 16, 2019, now Pat. No. 10,469,817, which is a
(Continued)

(30) Foreign Application Priority Data

Jun. 24, 2013 (JP) ................................ 2013-132017

(51) Int. Cl.
*H04N 5/76* (2006.01)
*H04N 9/793* (2006.01)
(Continued)

(52) U.S. Cl.
CPC ............. *H04N 9/793* (2013.01); *G11B 20/10* (2013.01); *G11B 27/105* (2013.01);
(Continued)

(58) Field of Classification Search
None
See application file for complete search history.

(56) References Cited

U.S. PATENT DOCUMENTS 9,706,184 B2 7/2017 Uchimura et al.
9,781,401 B2 10/2017 Uchimura et al.
(Continued)

FOREIGN PATENT DOCUMENTS

CA 2563523 A 11/2005
CN 1605102 A 4/2005
(Continued)

OTHER PUBLICATIONS

Cochran, "Fractal Volume Compression" (Year: 1996).*
(Continued)

*Primary Examiner* — Eileen M Adams
(74) *Attorney, Agent, or Firm* — Chip Law Group

(57) ABSTRACT

The present technology relates to a reproduction device, a reproduction method, and a recording medium capable of displaying graphics with a broader dynamic range of luminance and appropriate brightness. An optical disc records STN_table associating HDR graphics, which are graphics having a second luminance range different from and broader than a first luminance range, with tone_mapping_info including HDR information indicating a luminance characteristic of the HDR graphics and tone_mapping_info, which is tone mapping definition information used when luminance conversion from the HDR graphics to STD graphics which are graphics having the first luminance range is performed, the HDR graphics, and the tone_mapping_info. The present technology is applicable to a recording medium recording graphics.

12 Claims, 72 Drawing Sheets

Related U.S. Application Data continuation of application No. 15/678,172, filed on Aug. 16, 2017, now abandoned, which is a continuation of application No. 14/896,567, filed as application No. PCT/JP2014/065550 on Jun. 12, 2014, now Pat. No. 9,781,401.

(51) Int. Cl.

| | | |
|---|---|---|
| *G11B 20/10* | (2006.01) | |
| *H04N 9/82* | (2006.01) | |
| *G11B 27/10* | (2006.01) | |
| *G11B 27/32* | (2006.01) | |
| *H04N 9/87* | (2006.01) | |
| *H04N 19/46* | (2014.01) | |
| *H04N 19/30* | (2014.01) | |
| *H04N 19/40* | (2014.01) | |

(52) U.S. Cl.
CPC ............. *G11B 27/329* (2013.01); *H04N 5/76* (2013.01); *H04N 9/8205* (2013.01); *H04N 9/8707* (2013.01); *G11B 2220/2541* (2013.01); *H04N 19/30* (2014.11); *H04N 19/40* (2014.11); *H04N 19/46* (2014.11)

(56) References Cited

U.S. PATENT DOCUMENTS

| | | | |
|---|---|---|---|
| 9,832,440 | B2 | 11/2017 | Uchimura et al. |
| 10,469,817 | B2* | 11/2019 | Uchimura ............ H04N 9/8707 |
| 2005/0286870 | A1 | 12/2005 | Owada |
| 2007/0201560 | A1 | 8/2007 | Segall et al. |
| 2007/0223813 | A1 | 9/2007 | Segall et al. |
| 2008/0192819 | A1 | 8/2008 | Ward et al. |
| 2008/0310501 | A1 | 12/2008 | Ward et al. |
| 2009/0046207 | A1* | 2/2009 | Salvucci ............... H04N 19/186 348/663 |
| 2010/0328537 | A1* | 12/2010 | Davies .................. H04N 5/202 348/674 |
| 2012/0170907 | A1* | 7/2012 | Johnson ........... G11B 20/10527 386/241 |
| 2012/0230597 | A1 | 9/2012 | Ward et al. |
| 2012/0230656 | A1 | 9/2012 | Owada |
| 2014/0037206 | A1 | 2/2014 | Newton et al. |

FOREIGN PATENT DOCUMENTS

| | | |
|---|---|---|
| CN | 1713710 A | 12/2005 |
| CN | 1806287 A | 7/2006 |
| CN | 101902637 A | 12/2010 |
| EP | 1827024 A1 | 8/2007 |
| EP | 1845704 A2 | 10/2007 |
| EP | 2375383 A2 | 10/2011 |
| EP | 3013040 A1 | 4/2016 |
| JP | 2006-013750 A | 1/2006 |
| JP | 2007-243942 A | 9/2007 |
| JP | 2007-257641 A | 10/2007 |
| JP | 2007-534238 A | 11/2007 |
| JP | 2010-213360 A | 9/2010 |
| KR | 10-2007-0026525 A | 3/2007 |
| KR | 10-2013-0020724 A | 2/2013 |
| WO | 2005/104035 A1 | 11/2005 |
| WO | 2012/147010 A1 | 11/2012 |
| WO | 2012/172460 A1 | 12/2012 |
| WO | 2013/046095 A1 | 4/2013 |

OTHER PUBLICATIONS

Notice of Allowance for U.S. Appl. No. 16/385,206, dated Jun. 25, 2019, 11 pages.

Cochran, et al., "Fractal Volume Compression", IEEE Transactions on Visualization and Computer Graphics, vol. 2, No. 4, Dec. 1996, pp. 313-322.

Non-Final Office Action for U.S. Appl. No. 15/678,172, dated Dec. 20, 2018, 17 pages.

Sullivan, et al, "Joint Draft 6 of New Profile for Professional Applications" Amendment to ITU-T Rec. H. 264 & ISO/IEC 14496-10 (Amendment 2 to 2005 Edition), Joint Video Team (JVT) of ISO/IEC MPEG & ITU-T VCEG (ISO/IEC JTC1/SC29/WG11 and ITU-T SG16 Q.6), 22nd Meeting, JVT-V204, Jan. 13-19, 2007, 11 pages.

Hattori, et al, "Signalling of Luminance Dynamic Range in Tone Mapping Information SEI", Joint Collaborative Team on Video Coding (JCT-VC) of ITU-T SG16 WP3 and ISO/IEC JTC1/SC29/WG//, 10 Meeting, Stckholm, SE, JCTVC-J0149, Jul. 11-20, 2012, 07 pages.

Office Action for JP Patent Application No. 2015-523970, dated Dec. 11, 2018, 03 pages of Office Action and 02 pages of English Translation.

Office Action for JP Patent Application No. 2015-523970, dated Jun. 7, 2018, 11 pages of Office Action and 03 pages of English Translation.

Office Action for CN Patent Application No. 201480034716.1, dated Apr. 2, 2018, 11 pages of Office Action and 03 pages of English Translation.

Extended European Search Report of EP Patent Application No. 14818202.5, dated May 29, 2017, 07 pages.

International Search Report and Written Opinion of PCT Application No. PCT/JP2014/065550, dated Sep. 2, 2014,11 pages of English Translation and 08 pages of ISRWO.

International Preliminary Report on Patentability of PCT Application No. PCT/JP2014/065550, dated Jan. 7, 2016, 10 pages of English Translation and 05 pages of IPRP.

Notice of Allowance for U.S. Appl. No. 14/896,567, dated Jun. 12, 2017, 02 pages.

Notice of Allowance for U.S. Appl. No. 14/896,567, dated May 15, 2017, 11 pages.

Non-Final Office Action for U.S. Appl. No. 14/896,567, dated Feb. 2, 2017, 36 pages.

Jinno, et al., "New local tone mapping and two-layer coding for HDR images", International Conference on Acoustics, Speech and Signal Processing (ICASSP), IEEE, Aug. 31, 2012, pp. 765-768.

Hattori, et al., "Signalling of Luminance Dynamic Range in Tone mapping information SEI", Sony Corporation, Joint Collaborative Team on Video Coding (JCT-VC) of ITU-T SG16 WP3 and ISO/IEC JTC1/SC29NVG11, 10th Meeting, Stockholm, SE, Document: JCTVC-J0149, Jul. 11-20, 2012, 7 pages.

Office Action for KR Patent Application No. 10-2015-7034578, dated Jun. 29, 2020, 07 pages of Office Action and 08 pages of English Translation.

\* cited by examiner

FIG. 7

| | | Descriptor |
|---|---|---|
| 1: | tone_mapping_info(payloadSize) { | |
| 2: |   tone_map_id | ue(v) u(32) |
| 3: |   tone_map_cancel_flag | u(1) |
| 4: |   if(!tone_map_cancel_flag) { | |
| 5: |     tone_map_persistence_flag | u(1) |
| 6: |     coded_data_bit_depth | u(8) |
| 7: |     target_bit_depth | u(8) |
| 8: |     tone_map_model_id | ue(v) u(8) |
| 9: |     if(tone_map_model_id==0) { | |
| 10: |       min_value | u(32) |
| 11: |       max_value | u(32) |
| 12: |     }else if(tone_map_model_id==1) { | |
| 13: |       sigmoid_midpoint | u(32) |
| 14: |       sigmoid_width | u(32) |
| 15: |     }else if(tone_map_model_id==2) { | |
| 16: |       for(i=0;i<(1<<target_bit_depth);i++) | |
| 17: |         start_of_coded_interval[i] | u(v) u(256) |
| 18: |     }else if(tone_map_model_id==3) { | |
| 19: |       num_pivots | u(16) |
| 20: |       for(i=0;i<num_pivots;i++) { | |
| 21: |         coded_pivot_value[i] | u(v) u(256) |
| 22: |         target_pivot_value[i] | u(v) u(256) |
| 23: |       } | |
| 24: |     }else if(tone_map_model_id==4) { | |
| 25: |       camera_iso_speed_idc | u(8) |
| 26: |       if(camera_iso_speed_idc==EXTENDED_ISO) | |
| 27: |         camera_iso_speed_value | u(32) |
| 28: |       exposure_index_idc | u(8) |
| 29: |       if(exposure_index_idc==EXTENDED_ISO) | |
| 30: |         exposure_index_value | u(32) |
| 31: |       exposure_compensation_value_sign_flag | u(1) |
| 32: |       exposure_compensation_value_numerator | u(16) |
| 33: |       exposure_compensation_value_denom_idc | u(16) |
| 34: |       ref_screen_luminance_white | u(32) |
| 35: |       extended_range_white_level | u(32) |
| 36: |       nominal_black_level_code_value | u(16) |
| 37: |       nominal_white_level_code_value | u(16) |
| 38: |       extended_white_level_code_value | u(16) |
| 39: |     } | |
| 40: |   } | |
| 41: | } | |

FIG.8

```
(tone_map_model_id=0)
    min_value
    max_value (tone_map_model_id=2)
    for(i=0; i<(1<<target_bit_depth); i++)
        start_of_coded_interval[i]

(tone_map_model_id=3)
    num_pivots
    for(i=0; i<num_pivots; i++){
        coded_pivot_value[i]
        target_pivot_value[i]
    }

(tone_map_model_id=4)
    camera_iso_speed_idc
    if(camera_iso_speed_idc==EXTENDED_ISO)
        camera_iso_speed_value
    exposure_index_idc
    if(exposure_index_idc==EXTENDED_ISO)
        exposure_index_value
    exposure_compensation_value_sign_flag
    exposure_compensation_value_numerator
    exposure_compensation_value_denom_idc
    ref_screen_luminance_white
    extended_range_white_level
    nominal_black_level_code_value
    nominal_white_level_code_value
    extended_white_level_code_value
```

ONE AMONG 3 KINDS IS USED AS
tone mapping DEFINITION INFORMATION
FOR STD → HDR CONVERSION AND
tone mapping DEFINITION INFORMATION
FOR HDR → STD CONVERSION

USED AS HDR INFORMATION

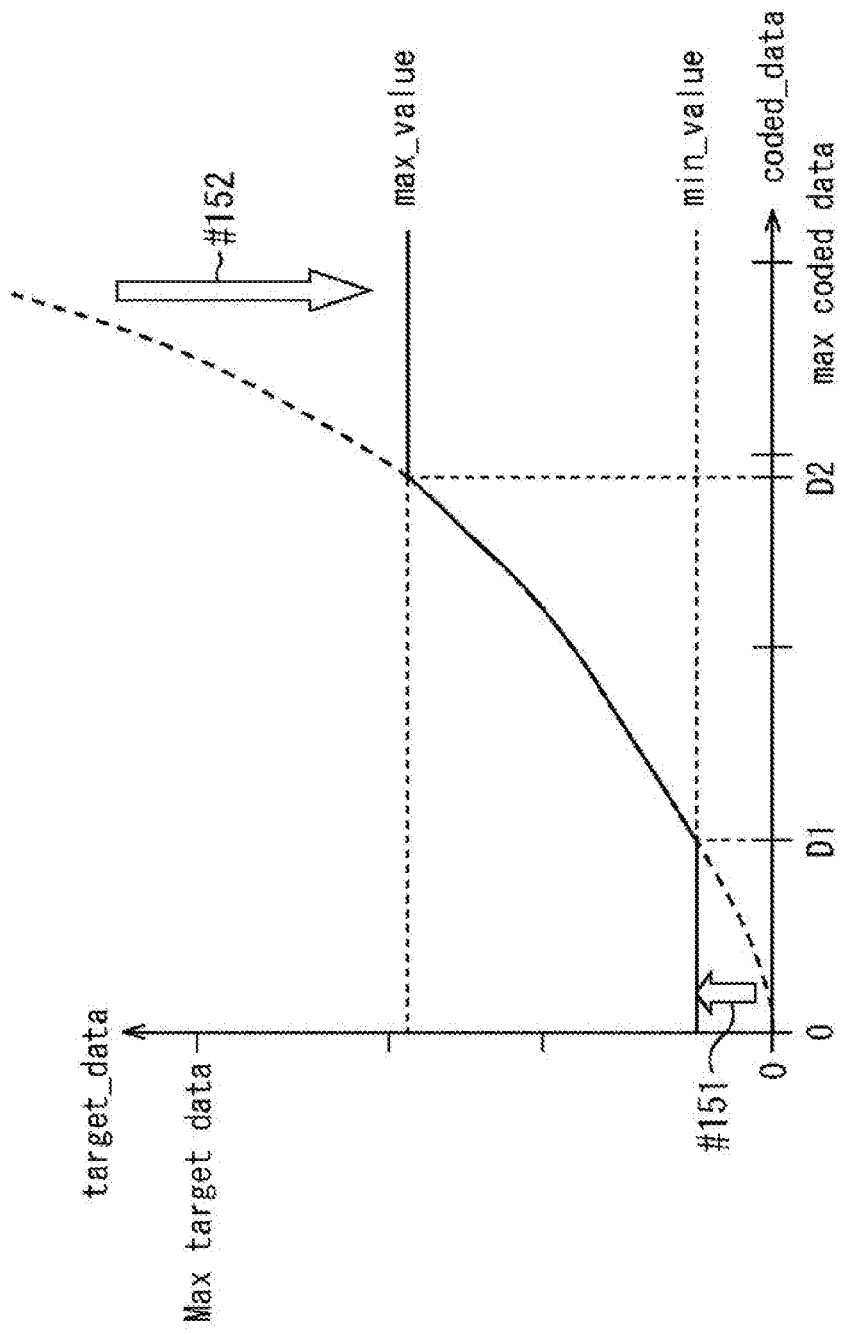

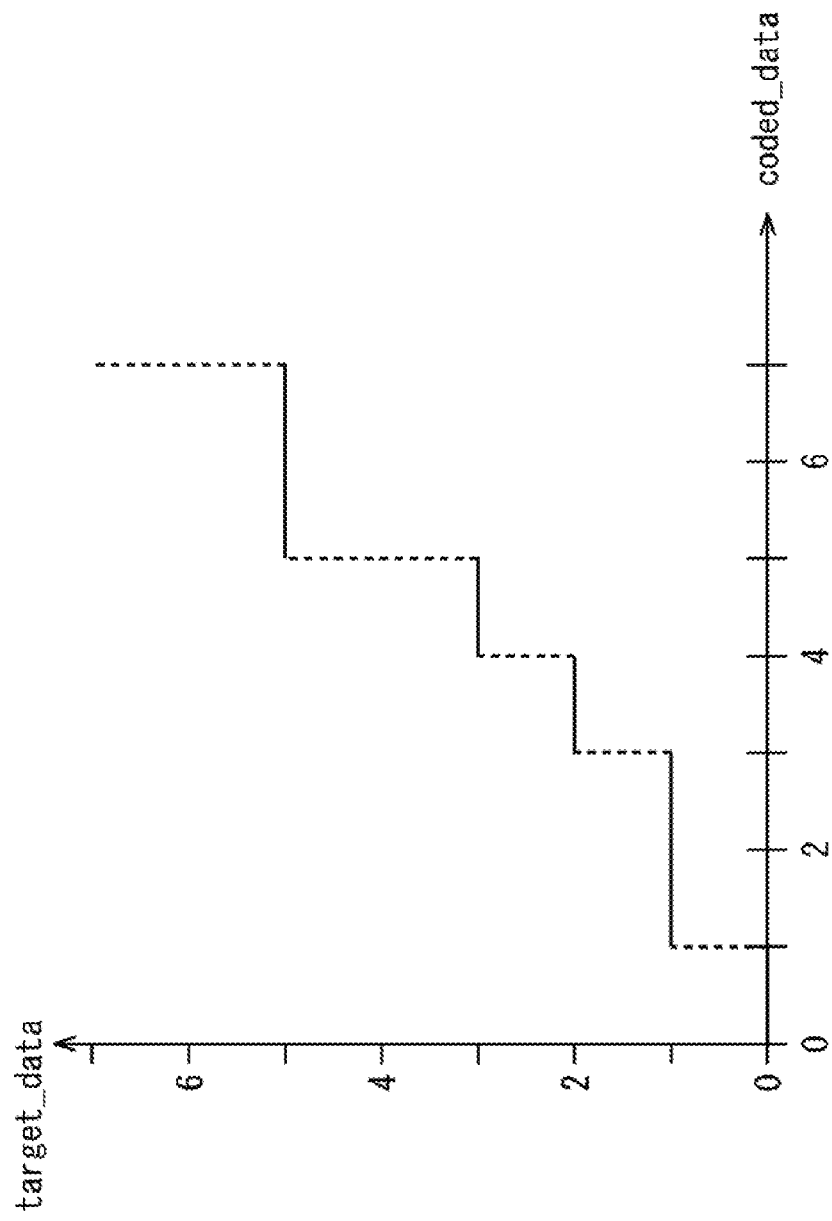

FIG. 16

```
1: STN_table() {
2: length 16 uimsbf
3: reserved_for_future_use 16 bslbf
4: number_of_primary_video_stream_entries 8 uimsbf
5: number_of_primary_audio_stream_entries 8 uimsbf
6: number_of_PG_textST_stream_entries 8 uimsbf
7: number_of_IG_stream_entries 8 uimsbf
8: number_of_secondary_audio_stream_entries 8 uimsbf
9: number_of_secondary_video_stream_entries 8 uimsbf
10: number_of_PiP_PG_textST_stream_entries_plus 8 uimsbf
11: primary_video_tone_mapping_flag 1
12: PG_text_ST_tone_mapping_flag 1
13: IG_tone_mapping_flag 1
14: secondary_video_tone_mapping_flag 1
15: reserved_for_future_use 36bits
16: If(video_tone_mapping_flag == 0)
17: {
18: for (primary_video_stream_id=0;
19: primary_video_stream_id<
20: number_of_primary_video_stream_entries;
21: primary_video_stream_id++) {
22: stream_entry()
23: stream_attributes()
24: }
25: else
26: {
27: for (primary_video_stream_id=0;
28: primary_video_stream_id<
29: number_of_primary_video_stream_entries;
30: primary_video_stream_id++) {
31: stream_entry()
32: stream_attributes()
33: number_of_tone_mapping_info_ref    8uimsbf
34: for(i = 0; I < number_of_tone_mapping_info_ref; i++)
35: {
36: tone_mapping_info_ref    8uimsbf
37: }
38: }
39: }
40: If(PG_text_ST_tone_mapping_flag == 0)
41: for (PG_textST_stream_id=0;
42: PG_textST_stream_id<number_of_PG_textST_stream_entries
43: +number_of_PiP_PG_textST_stream_entries_plus;
44: PG_textST_stream_id++) {
45: stream_entry()
46: stream_attributes()
47: }
48: else
49: {
50: for (PG_textST_stream_id=0;
51: PG_textST_stream_id<number_of_PG_textST_stream_entries
52: +number_of_PiP_PG_textST_stream_entries_plus;
53: PG_textST_stream_id++) {
54: stream_entry()
55: stream_attributes()
56: number_of_tone_mapping_info_ref    8uimsbf
57: for(i = 0; I < number_of_tone_mapping_info_ref; i++)
58: {
59:  tone_mapping_info_ref    8uimsbf
60: }
61: }
62: }
63: If(IG_tone_mapping_flag == 0)
64: {
65: for (IG_stream_id=0;
66: IG_stream_id<number_of_IG_stream_entries;
67: IG_stream_id++) {
68: stream_entry()
69: stream_attributes()
70: }
71: }
72: else
73: {
74: for (IG_stream_id=0;
75: IG_stream_id<number_of_IG_stream_entries;
76: IG_stream_id++) {
77: stream_entry()
78: stream_attributes()
79: number_of_tone_mapping_info_ref    8uimsbf
80: for(i = 0; I < number_of_tone_mapping_info_ref; i++)
81: {
82: tone_mapping_info_ref    8uimsbf
83: }
84: }
85: }
86: If(secondary_video_tone_mapping_flag == 0)
87: {
88: for (secondary_video_stream_id=0;
89: secondary_video_stream_id <
90: number_of_secondary_video_stream_entries;
91: secondary_video_stream_id++) {
92: stream_entry()
93: stream_attributes()
94: comb_info_Secondary_video_Secondary_audio()
95: comb_info_Secondary_video_PiP_PG_textST()
96: }
97: else
98: {
99: for (secondary_video_stream_id=0;
100: secondary_video_stream_id <
101: number_of_secondary_video_stream_entries;
102: secondary_video_stream_id++) {
103: stream_entry()
104: stream_attributes()
105: number_of_tone_mapping_info_ref    8uimsbf
106: for(i = 0; I < number_of_tone_mapping_info_ref; i++)
107: {
108: tone_mapping_info_ref    8uimsbf
109: }
110: comb_info_Secondary_video_Secondary_audio()
111: comb_info_Secondary_video_PiP_PG_textST()
112: }
```

FIG. 17

```
1: StreamCodingInfo(i,stream_index) {
2:   length 8 uimsbf
3:   stream_coding_type 8 bslbf
4:   [Video Block]
5:   [Audio Block]
6:   [Graphics Block]
7: }
```

FIG. 18A

```
1:  [Video Block]
2:  if (stream_coding_type==0x02 ||
3:  stream_coding_type==0x1B ||
4:  stream_coding_type==0xEA) {
5:  video_format 4 bslbf
6:  frame_rate 4 bslbf
7:  aspect_ratio 4 bslbf
8:  reserved_for_future_use 2 bslbf
9:  cc_flag 1 bslbf
10: HDR_flag 1 bslgf
11: mode_flag 1 bslbf
12: reserved_for_future_use 15 bslbf
13: ISRC()
14: number_of_tone_mapping_info_ref 8bits
15: for(i=0; i<number_of_tone_mapping_info_ref; i++)
16: {
17:    tone_mapping_info_ref  8bits
18: }
19: reserved_for_future_use 32 bslbf
20: }
```

FIG. 18B

```
1:  [Graphics Block]
2:  else if (stream_coding_type==0x90) {
3:  // Presentation Graphics stream
4:  PG_language_code 8*3 bslbf
5:  reserved_for_future_use 8 bslbf
6:  ISRC()
7:  number_of_tone_mapping_info_ref 8bits
8:  for(i=0; i<number_of_tone_mapping_info_ref; i++)
9:  {
10:    tone_mapping_info_ref  8bits
11: }
12: reserved_for_future_use 32 bslbf
13: } else if (stream_coding_type==0x91) {
14: // Interactive Graphics stream
15: IG_language_code 8*3 bslbf
16: reserved_for_future_use 8 bslbf
17: ISRC()
18: number_of_tone_mapping_info_ref 8bits
19: for(i=0; i<number_of_tone_mapping_info_ref; i++)
20: {
21:    tone_mapping_info_ref  8bits
22: }
23: reserved_for_future_use 32 bslbf
24: } else if (stream_coding_type==0x92) {
25: // Text subtitle stream
26: character_code 8 bslbf
27: textST_language_code 8*3 bslbf
28: ISRC()
29: reserved_for_future_use 32 bslbf
30: }
```

FIG. 20

```
 1: extended_palette_definition_segment() {
 2:   segment_descriptor()
 3:   palette_id 8 uimsbf
 4:   palette_version_number 8 uimsbf
 5:   color_depth 8bits
 6:   while (processed_length < segment_length) {
 7:     palette_entry() {
 8:       palette_entry_id 8 uimsbf
 9:       Y_value
10:       Cr_value
11:       Cb_value
12:       T_value
13:     }
14:   }
15: }
```

FIG. 37

```
1:  Tone_map()
2:  {
3:    length 32bits
4:    number_of_tone_mapping_info 32bits
5:    reserved 64bits
6:    for(i=0;i<number_of_tone_mapping_info;i++)
7:    {
8:      tone_mapping_info()
9:    }
10:   reserved 64bits
11: }
```

FIG. 38A

```
1:   StreamCodingInfo(i, stream_index) {
2:   length 8 uimsbf
3:   stream_coding_type 8 bslbf
4:   [Video Block]
5:   [Audio Block]
6:   [Grahics Block]
7:   [ToneMap Block]
8:   }
```

FIG. 38B

```
1:   [ToneMap Block]
2:   else if (stream_coding_type==0xB0) {
3:   // Tone Map stream
4:   reserved_for_future_use 32 bslbf
5:   ISRC()
6:   number_of_tone_mapping_info_ref 8bits
7:   for(i=0; i<number_of_tone_mapping_info_ref; i++)
8:   {
9:      tone_mapping_info_ref  8bits
10:  }
11:  reserved_for_future_use 32 bslbf
12:  } else {
13:     padding_word 8*(length-1) bslbf
14:  }
```

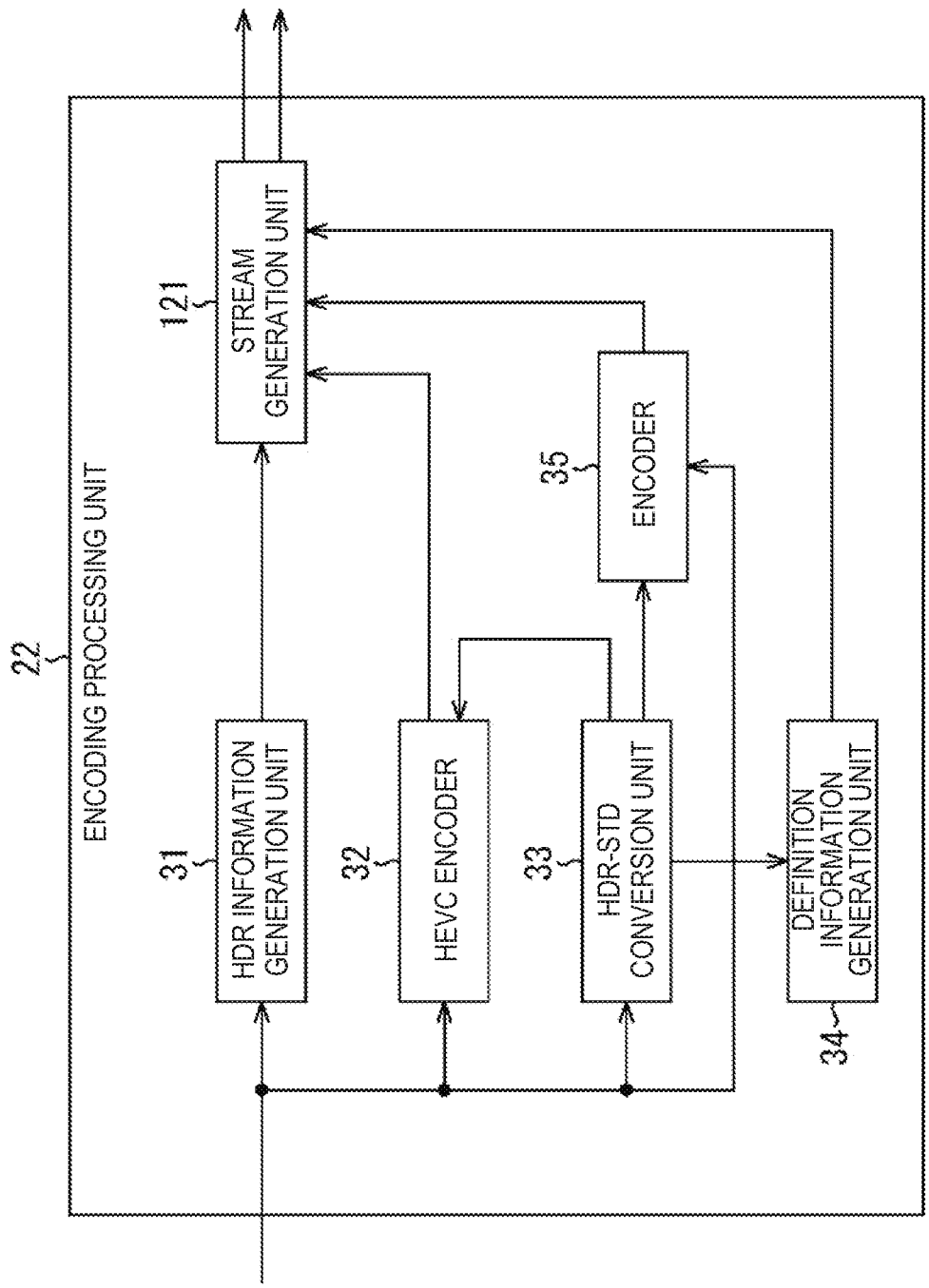

FIG. 50

```
1: extended_palette_definition_segment() {
2: segment_descriptor()
3: palette_id 8 uimsbf
4: palette_version_number 8 uimsbf
5: color_depth 8bits
6: number_of_tone_mapping_info_ref 8bitts
7: for(i=0; I < number_of_tone_mapping_info_ref)
8: {
9:   tone_mapping_info_ref  8bits
10: }
11: while (processed_length < segment_length) {
12: palette_entry() {
13: palette_entry_id 8 uimsbf
14: Y_value
15: Cr_value
16: Cb_value
17: T_value
18: }
19: }
20: }
```

FIG. 51

```
1: Tone_mapping_info_definition_segment() {
2: segment_type 8 unimsbf
3: segment _length 16 uimsbf
4: tone_mapping_info
5: }
```

FIG. 62

```
1: //AT TIME OF Video REPRODUCTION
2: ToneMapControl tmCtrl = ToneMapControl.getInstance();
3: int[] tone_map_id = new int[2];
4: tone_map_id[0] = 1; tone_map_id[1] = 2;
5: tmCtrl.setToneMapID(tone_map_id);
```

FIG. 64

```
1:  // AT TIME OF Video STOP
2:  ToneMapControl tmCtrl=ToneMapControl.getInstance();
3:  ToneMapFactory factory=ToneMapFactory.getInstance();
4:  ToneMapLinear tmLinear=factory.createToneMapLinear(max,min);
5:  ToneMapLuminanceDynamicRangeInfo tmldri=factory.
6:    createToneMapLuminanceDynamicRangeInfo(ref_screen_luminance_white,
7:    extended_range_white_level,nominal_black_level_code_value,
8:    nominal_white_level_code_value,extended_white_level_code_value);
9:  ToneMap[] toneMap=new ToneMap[2];
10: toneMap[0]=tmLinear;// SuperClass OF ToneMapLinear IS ToneMAP
11: toneMap[1]=tmldri;
12: tmCtrl.setToneMap(toneMap);
```

FIG. 65

```
■ org.blurayx.hdr.ToneMapControl
  ● void setToneMapID(int[] id)      //DURING video REPRODUCTION
  ● int[] getToneMapID()              //DURING video REPRODUCTION
  ● void setToneMap(ToneMap[] tm)
  ● ToneMap[] getToneMap()
■ org.blurayx.hdr.BackgroundToneMapControl
  ● void setToneMap(ToneMap[] tm)
  ● ToneMap[] getToneMap()
■ org.blurayx.hdr.ToneMapFactory
  ● ToneMapFactory getInstance()
  ● ToneMapLinear createToneMapLinear(long max, long min)
  ● ToneMapSigmoidal ceateToneMapSigmoidal(long[] start_code_interval)
  ● ToneMapUserDefinedTable createToneMapUserDefinedTable(long sigmoid, long sig_width)
  ● ToneMapPieceWiseLinear caateToneMapPieceWiseLinear(long[] coded_pivot_value, long[] target_pivot_value)
  ● ToneMapLuminanceDynamicRangeInfo createToneMapLuminanceDynamicRangeInfo(long ref_screen_luminance_white,
    long extended_range_white_level, int nominal_black_level_code_value, int nominal_white_level_code_value,
    int extended_white_level_code_value)
```

FIG. 66

- org.blurayx.hdr.ToneMap (FOLLOWING MASTER CLASS)
  - long getToneMapId()
  - bool getToneMapCancelFlag()
  - bool getToneMapPersistenceFlag()
  - int getCodedDataBitDepth()
  - int getTargetBitDepth()
  - long getToneMapModelId()
  - void setToneMapId(long tm_id)
  - void setToneMapCancelFlag(bool tm_cancel_flag)
  - void setToneMapPersistenceFlag(bool tm_persistent_flag)
  - void setCodedDataBitDepth(int coded_data_depth)
  - void setTargetBitDepth(int target_bit_depth)
- org.blurayx.hdr.ToneMapLinear
  - long getMax()
  - long getMin()
  - void setMax(long max)
  - void setMin(long min)
- org.blurayx.hdr.ToneMapSigmoidal
  - long[] getStart_code_interval()
  - void setStart_code_interval(long[] start_code_interval)
- org.blurayx.hdr.ToneMapUserDefinedTable
  - long getSigmoid()
  - long getSigWidth()
  - void setSigmoid(long sigmoid)
  - void setSigWidth(long sig_width)
- org.blurayx.hdr.ToneMapPieceWiseLinear
  - long[] getCodedPivotValue()
  - long[] getTargetPivotValue()
  - void setCodedPivotValue(long[] coded_pivot_value)
  - void setTargetpivotValue(long[] target_pivot_value)
- org.blurayx.hdr.ToneMapLuminanceDynamicRangeInfo
  - long getRefScreenLuminanceWhite()
  - long getExtendedRangeWhiteLevel()
  - int getNormalBlackLevelCodeValue()
  - int getNormalWhiteLevelCodeValue()
  - int getExtendedWhiteLevelCodeValue()
  - void setRefScreenLuminanceWhite(long ref_screen_luminance_white)
  - void setExtendedRangeWhiteLevel(long extended_range_white_level)

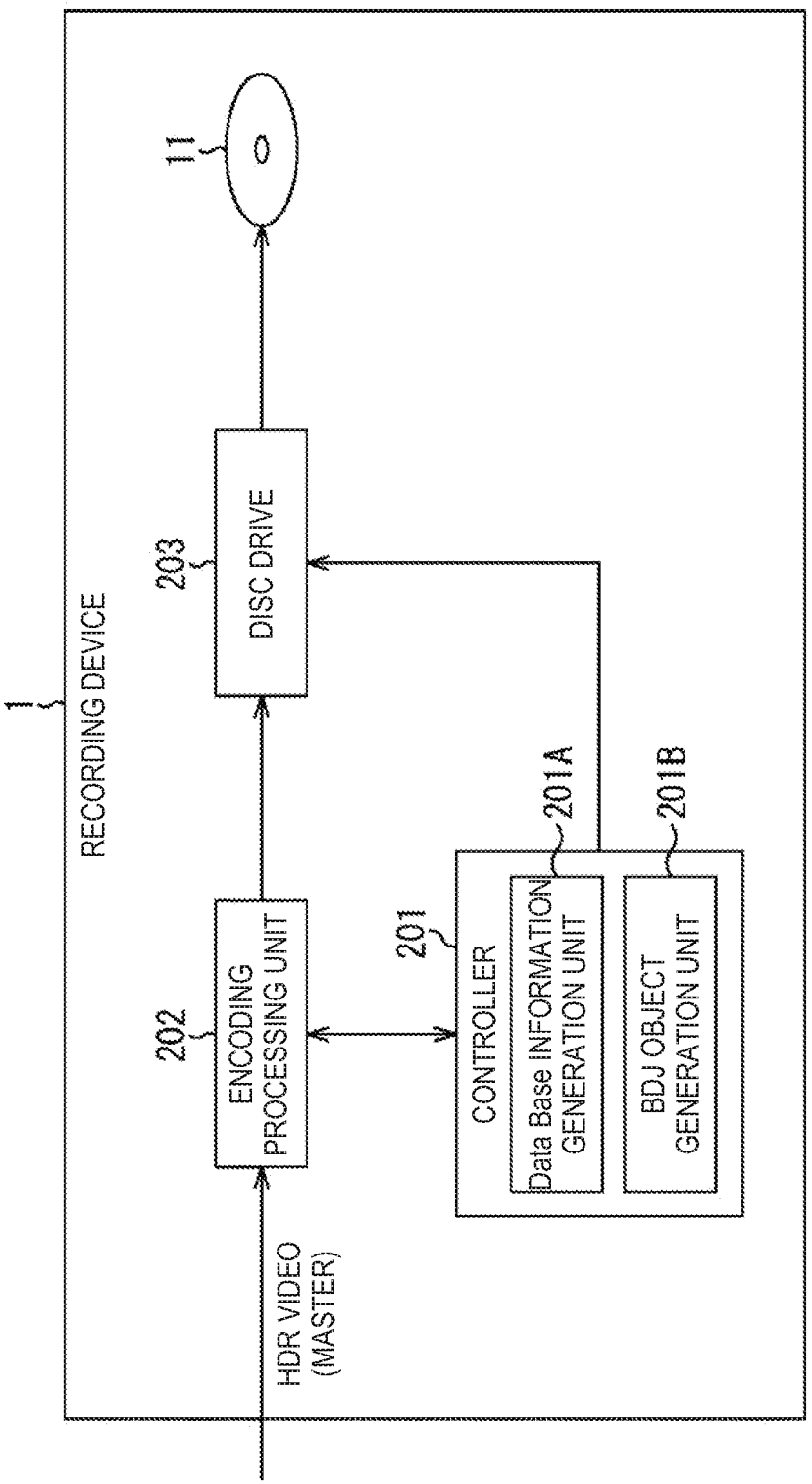

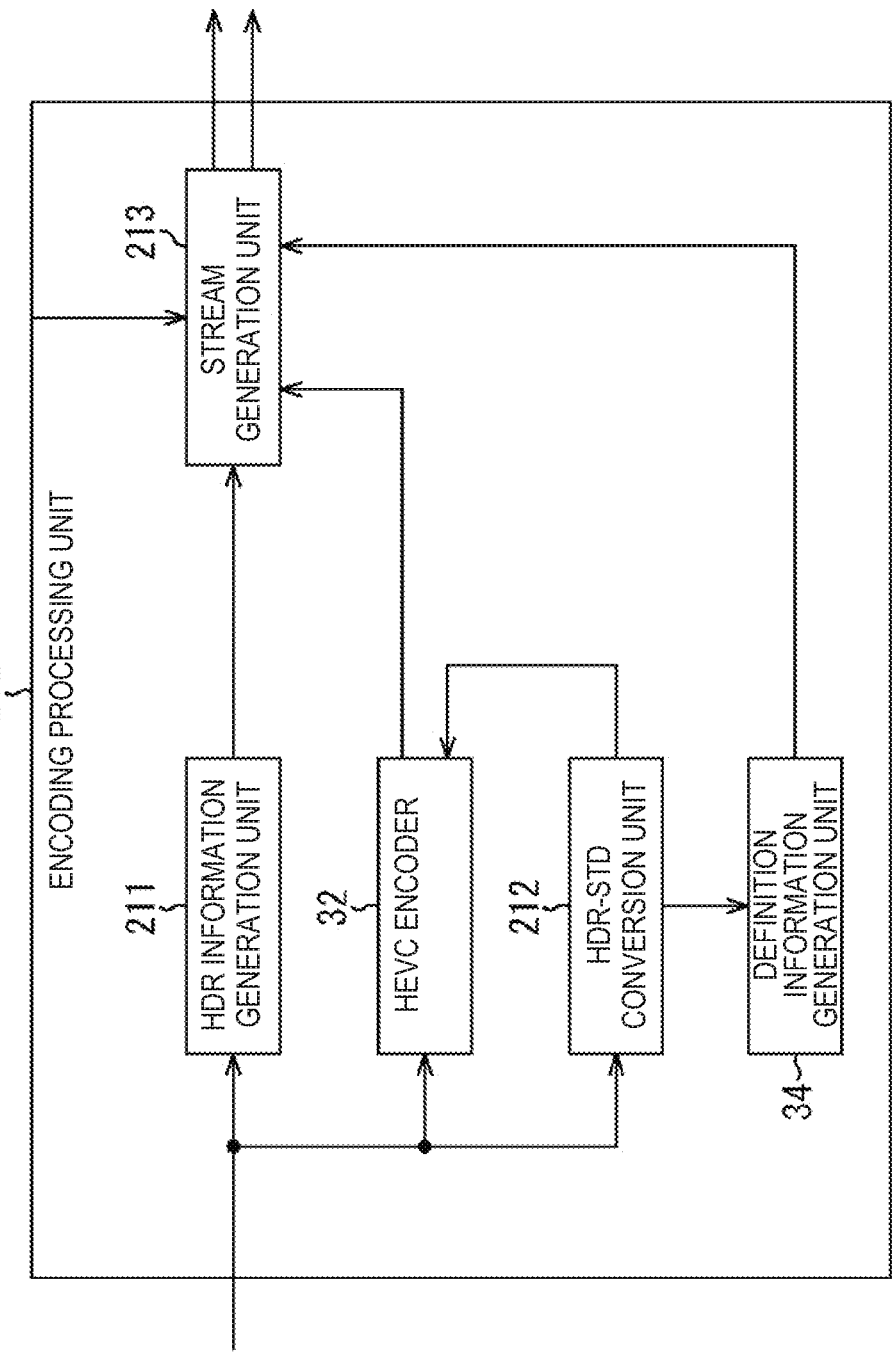

REPRODUCTION DEVICE, REPRODUCTION METHOD, AND RECORDING MEDIUM

CROSS-REFERENCE TO RELATED APPLICATION

The present application is a continuation application of U.S. patent application Ser. No. 16/385,206, filed Apr. 16, 2019 which is a continuation application of U.S. patent application Ser. No. 15/678,172, filed Aug. 16, 2017 which is a continuation application of U.S. patent application Ser. No. 14/896,567, filed Dec. 7, 2015, now U.S. Pat. No. 9,781,401, which is a national stage entry of PCT/JP2014/065550, filed Jun. 12, 2014, which claims priority from prior Japanese Priority Patent Application JP 2013-132017 filed in the Japan Patent Office on Jun. 24, 2013, the entire contents of which are hereby incorporated by reference.

TECHNICAL FIELD

The present technology relates to a reproduction device, a reproduction method, and a recording medium, and more particularly, to a reproduction device, a reproduction method, and a recording medium capable of displaying graphics with a broad dynamic range of luminance and appropriate brightness.

BACKGROUND ART

As recording media for content such as movies, there are Blu-ray (registered trademark) discs (hereinafter appropriately referred to as BDs). In the related art, authoring of subtitles contained in BDs or graphics of menu buttons or the like manipulated by users is performed by compressing dynamic ranges of master graphics on the assumption that content is viewed with monitors of standard luminance (100 nits=100 cd/m2).

Graphics which are masters have dynamic ranges equal to or greater than dynamic ranges displayable on monitors of standard luminance. When the dynamic ranges of the master graphics are compressed, the dynamic ranges obviously deteriorate.

CITATION LIST

Patent Literature

Patent Literature 1: JP 2009-58692A
Patent Literature 2: JP 2009-89209A

SUMMARY OF INVENTION

Technical Problem

With advances in display technologies for organic electroluminescence (EL) displays, liquid crystal displays (LCDs), and the like, monitors brighter than standard, such as 500 nits or 1000 nits, are being sold. There are demands for graphics suitable for performance of monitors with such broad dynamic ranges.

The present technology has been conceived in view of such a situation and aims at displaying graphics with a broad dynamic range of luminance and appropriate brightness.

Solution to Problem

According to a first aspect of the present technology, there is provided a reproduction device including: a reading unit configured to read association information, extended graphics, HDR information, and luminance conversion definition information from a recording medium having recorded therein the association information which associates the extended graphics, which are graphics having a second luminance range different from and broader than a first luminance range, with the HDR information indicating a luminance characteristic of the extended graphics, and the luminance conversion definition information used when luminance conversion from the extended graphics to standard graphics which are graphics having the first luminance range is performed, the extended graphics, the HDR information, and the luminance conversion definition information; a conversion unit configured to convert the extended graphics into the standard graphics based on the luminance conversion definition information associated with the extended graphics in the association information; and an output unit configured to output the extended graphics and the HDR information associated with the extended graphics in the association information to a display device which is capable of displaying the extended graphics, and to output the standard graphics converted by the conversion unit to a display device which is not capable of displaying the extended graphics.

A reproduction method according to the first aspect of the present technology corresponds to the reproduction device according to the first aspect of the present technology.

According to the first aspect of the present technology, association information, extended graphics, HDR information, and luminance conversion definition information are read from a recording medium having recorded therein the association information which associates the extended graphics, which are graphics having a second luminance range different from and broader than a first luminance range, with the HDR information indicating a luminance characteristic of the extended graphics, and the luminance conversion definition information used when luminance conversion from the extended graphics to standard graphics which are graphics having the first luminance range is performed, the extended graphics, the HDR information, and the luminance conversion definition information; the extended graphics are converted into the standard graphics based on the luminance conversion definition information associated with the extended graphics in the association information; the extended graphics and the HDR information associated with the extended graphics in the association information are output to a display device which is capable of displaying the extended graphics; and the converted standard graphics is output to a display device which is not capable of displaying the extended graphics.

According to a second aspect of the present technology, there is provided a recording medium recording: association information configured to associate extended graphics which are graphics having a second luminance range different from and broader than a first luminance range with HDR information indicating a luminance characteristic of the extended graphics, and luminance conversion definition information used when luminance conversion from the extended graphics to standard graphics, which are graphics having the first luminance range is performed; the extended graphics; the HDR information; and the luminance conversion definition information. A reproduction device reproducing the recording medium performs processes of reading the association information, the extended graphics, the HDR information, and the luminance conversion definition information from the recording medium, converting the extended graphics into the standard graphics based on the luminance conversion definition information associated with the extended graphics in the association information, and outputting the extended graphics and the HDR information associated with the extended graphics in the association information to a display device which is capable of displaying the extended graphics, and outputting the converted standard graphics to a display device which is not capable of displaying the extended graphics.

According to the second aspect of the present technology, there is recorded association information configured to associate extended graphics which are graphics having a second luminance range different from and broader than a first luminance range with HDR information indicating a luminance characteristic of the extended graphics and luminance conversion definition information used when luminance conversion from the extended graphics to standard graphics which are graphics having the first luminance range is performed, the extended graphics, the HDR information, and the luminance conversion definition information.

According to a third aspect of the present technology, there is provided a reproduction device including: a reading unit configured to read association information, extended graphics, HDR information, and luminance conversion definition information from a recording medium having recorded therein the association information which associates standard graphics, which are graphics having a first luminance range, with the HDR information indicating a luminance characteristic of the extended graphics, which are graphics having a second luminance range different from and broader than the first luminance range and the luminance conversion definition information used when luminance conversion from the standard graphics to the extended graphics is performed, the standard graphics, the HDR information, and the luminance conversion definition information; a conversion unit configured to convert the standard graphics into the extended graphics based on the luminance conversion definition information associated with the standard graphics in the association information; and an output unit configured to output the extended graphics converted by the conversion unit and the HDR information associated with the standard graphics before the conversion in the association information to a display device which is capable of displaying the extended graphics, and to output the standard graphics to a display device which is not capable of displaying the extended graphics.

A reproduction method according to the third aspect of the present technology corresponds to the reproduction device according to the third aspect of the present technology.

According to the third aspect of the present technology, association information, extended graphics, HDR information, and luminance conversion definition information are read from a recording medium having recorded therein the association information which associates standard graphics, which are graphics having a first luminance range, with the HDR information indicating a luminance characteristic of the extended graphics, which are graphics having a second luminance range different from and broader than the first luminance range and the luminance conversion definition information used when luminance conversion from the standard graphics to the extended graphics is performed, the standard graphics, the HDR information, and the luminance conversion definition information; the standard graphics are converted into the extended graphics based on the luminance conversion definition information associated with the standard graphics in the association information; the extended graphics converted in the conversion step and the HDR information associated with the standard graphics before the conversion in the association information are output to a display device which is capable of displaying the extended graphics; and the standard graphics are output to a display device which is not capable of displaying the extended graphics.

According to a fourth aspect of the present technology, there is provided a recording medium recording: association information which associates standard graphics which are graphics having a first luminance range with HDR information indicating a luminance characteristic of the extended graphics which are graphics having a second luminance range different from and broader than the first luminance range and the luminance conversion definition information used when luminance conversion from the standard graphics to the extended graphics is performed; the standard graphics; the HDR information; and the luminance conversion definition information. A reproduction device reproducing the recording medium performs processes of reading the association information, the extended graphics, the HDR information, and the luminance conversion definition information from the recording medium, converting the standard graphics into the extended graphics based on the luminance conversion definition information associated with the standard graphics in the association information, and outputting the converted extended graphics and the HDR information associated with the standard graphics before the conversion in the association information to a display device which is capable of displaying the extended graphics, and outputting the standard graphics to a display device which is not capable of displaying the extended graphics.

According to the fourth aspect of the present technology, there is recorded association information which associates standard graphics which are graphics having a first luminance range with HDR information indicating a luminance characteristic of the extended graphics which are graphics having a second luminance range different from and broader than the first luminance range and the luminance conversion definition information used when luminance conversion from the standard graphics to the extended graphics is performed, the standard graphics, the HDR information, and the luminance conversion definition information.

Advantageous Effects of Invention

According to the present technology, it is possible to display brightness proper for graphics having a broad dynamic range of luminance.

BRIEF DESCRIPTION OF DRAWINGS

FIG. 7 is a diagram illustrating the syntax of Tone_mapping_info.

FIG. 8 is a diagram illustrating an example of information used as definition information of tone mapping and HDR information.

FIG. 9 is a diagram illustrating an example of a tone curve shown by Tone_mapping_info of tone_map_model_id=0.

FIG. 10 is a diagram illustrating an example of a step function shown by Tone_mapping_info of tone_map_model_id=2.

FIG. 16 is a diagram illustrating the syntax of STN_table.

FIG. 17 is a diagram illustrating the syntax of StreamCodingInfo.

FIG. 18A is a diagram illustrating the syntaxes of [Video Block] in FIG. 17 and FIG. 18B is a diagram illustrating the syntaxes of [Graphics Block] in FIG. 17.

FIG. 20 is a diagram illustrating the syntax of XPDS.

FIG. 37 is a diagram illustrating the syntax of a Tone_map stream.

FIG. 38A and FIG. 38B is a diagram illustrating the syntax of StreamCodingInfo in the second embodiment.

FIG. 39 is a diagram illustrating a configuration example of an encoding processing unit in the second embodiment of the recording and reproduction system to which the present technology is applied.

FIG. 50 is a diagram illustrating an example of the syntax of an XPDS in FIGS. 49A and 49B.

FIG. 51 is a diagram illustrating an example of the syntax of a TDS in FIGS. 49A and 49B.

FIG. 62 is a diagram illustrating an example of a command at the time of video reproduction.

FIG. 64 is a diagram illustrating an example of a command at the time of the video stop.

FIG. 65 is a diagram illustrating a class structure of a BDJ application.

FIG. 66 is a diagram illustrating a class structure of the BDJ application.

FIG. 67 is a diagram illustrating a configuration example of a recording device of the fourth embodiment of the recording and reproduction system to which the present technology is applied.

FIG. 68 is a block diagram illustrating a configuration example of an encoding processing unit in FIG. 67.

DESCRIPTION OF EMBODIMENTS

First Embodiment (Configuration Example of First Embodiment of Recording and Reproduction System)

Figure 1:
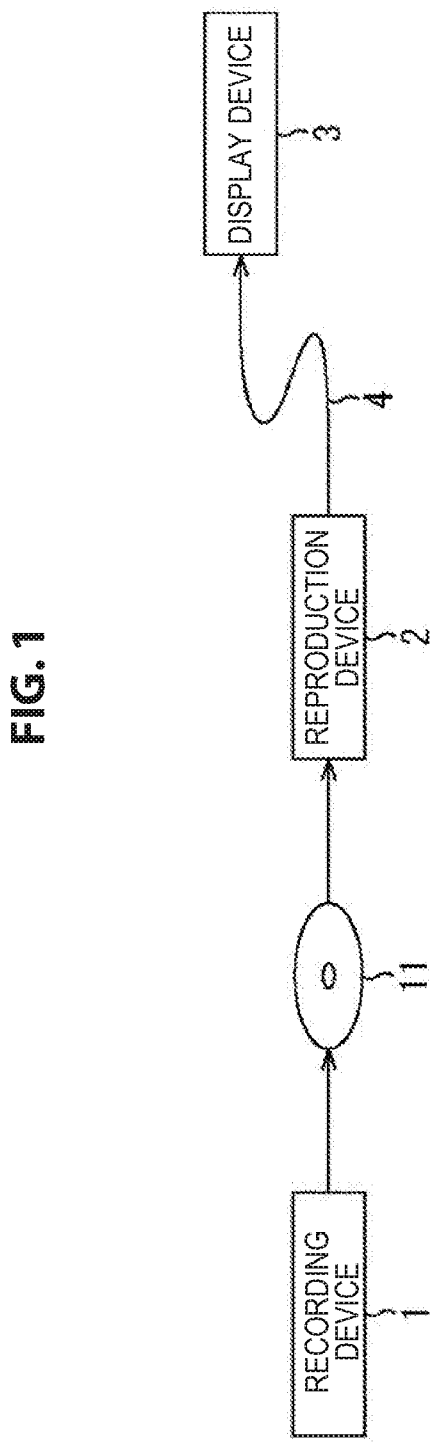
FIG. 1 is a diagram illustrating a configuration example of a first embodiment of a recording and reproduction system to which the present technology is applied.

FIG. 1 is a diagram illustrating a configuration example of a first embodiment of a recording and reproduction system to which the present technology is applied.

The recording and reproduction system in FIG. 1 is configured to include a recording device 1, a reproduction device 2, and a display device 3. The reproduction device 2 and the display device 3 are connected via a High Definition Multimedia Interface (HDMI: registered trademark) cable 4. The reproduction device 2 and the display device 3 may be connected via a cable of another standard or may be connected via wireless communication.

The recording device 1 records content and the reproduction device 2 reproduces the content. Supply of the content from the recording device 1 to the reproduction device 2 is performed using an optical disc 11. The optical disc 11 is, for example, a disc on which content is recorded in a Blu-ray (registered trademark) Disc Read-Only (BD-ROM) format.

The recording of content on the optical disc 11 may be performed in another format such as BD-R or -RE. The supply of content from the recording device 1 to the reproduction device 2 may also be performed using a removable medium other than the optical disc, such as a memory card on which a flash memory is mounted, or may also be performed through network delivery.

When the optical disc 11 is a BD-ROM disc, the recording device 1 is, for example, a device used by a content author. The optical disc 11 on which the content is recorded by the recording device 1 will be appropriately assumed to be supplied to the reproduction device 2 in the following description. However, in practice, optical discs are copied based on a master record on which the content is recorded by the recording device 1 and the optical disc 11 which is one of the optical discs is supplied to the reproduction device 2.

At least one High Dynamic Range (HDR) video which is a video having a dynamic range equal to or greater than a dynamic range (luminance range) displayable on a monitor of standard luminance is input to the recording device 1. The standard luminance is, for example, 100 cd/m2 (=100 nits).

HDR graphics which are graphics having a dynamic range equal to or greater than a dynamic range displayable on a monitor of standard luminance are input to the recording device 1. Hereinafter, when it is not necessary to distinguish the HDR video from the HDR graphics, the HDR video and the HDR graphics are collectively referred to as HDR data.

The recording device 1 encodes input master HDR data without conversion, that is, encodes data having a dynamic range equal to or greater than a dynamic range displayable on a monitor of standard luminance, and records the master HDR data on the optical disc 11 with a BD format.

In this case, HDR information indicating luminance characteristics of the master HDR data and low-conversion information used when the HDR data is converted into STD data are also recorded on the optical disc 11.

The STD data is a general term of STD video (standard video) which is a video having a dynamic range displayable on a monitor of standard luminance, and STD graphics which are graphics having the dynamic range. When the dynamic range of the STD data is a range of 0% to 100%, the dynamic range of the HDR data is expressed as a range of 0% to 101% or more, such as a range of 0% to 500% or a range of 0% to 1000%.

The recording device 1 converts the input master HDR data into the STD data, that is, converts the HDR data into data having a dynamic range displayable on a monitor of standard luminance, encodes the data, and records the data on the optical disc 11 with the BD format. In this case, the HDR information and high-conversion information used when the STD data is converted into the HDR data are also recorded on the optical disc 11.

An HDR video recorded by the recording device 1 or an STD video obtained by converting the HDR video is, for example, a video having a so-called 4K resolution such as a horizontal×vertical resolution of 4096×2160 or 3840×2160 pixels. As a video encoding scheme, for example, a High Efficiency Video Coding (HEVC) scheme is used. In the HEVC scheme, information indicating the luminance characteristics of data of an HDR image and information used when the data of the HDR image is converted into data of an STD image or conversion of the data of the STD image into the data of the HDR image can be set in supplemental enhancement information (SEI). Accordingly, the HDR information and the low-conversion information or the high-conversion information is set and recorded in the SEI of a video stream which is an HEVC stream of a video. As a subtitle encoding scheme, there is a run-length scheme.

The reproduction device 2 communicates with the display device 3 via the HDMI cable 4 to acquire information regarding display performance of the display device 3. The reproduction device 2 specifies that the display device 3 is a device including an HDR monitor which is a monitor capable of displaying HDR data or a device including an STD monitor which is a monitor capable of displaying only STD data.

The reproduction device 2 activates a drive and reads a graphics stream which is a stream obtained by encoding graphics and a video stream recorded on the optical disc 11 to perform decoding.

For example, when the data obtained through the decoding is HDR data and the display device 3 includes the HDR monitor, the reproduction device 2 outputs the HDR data obtained through the decoding to the display device 3. In this case, the reproduction device 2 outputs the HDR information to the display device 3 along with the HDR data.

On the other hand, when the data obtained through the decoding is the HDR data and the display device 3 includes the STD monitor, the reproduction device 2 converts the HDR data obtained through the decoding into STD data and outputs the STD data. The conversion of the HDR data into the STD data is performed using the low-conversion information recorded on the optical disc 11.

When the data obtained through the decoding is STD data and the display device 3 includes the HDR monitor, the reproduction device 2 converts the STD data obtained through the decoding into HDR data and outputs the HDR data to the display device 3. The conversion of the STD data into the HDR data is performed using the high-conversion information recorded on the optical disc 11. In this case, the reproduction device 2 outputs the HDR information to the display device 3 along with the HDR data. On the other hand, when the data obtained through the decoding is STD data and the display device 3 includes the STD monitor, the reproduction device 2 outputs the STD data obtained through the decoding to the display device 3.

The display device 3 receives the STD data or the HDR data transmitted from the reproduction device 2 and displays a video on the monitor based on the STD data or the HDR data.

For example, when the HDR information is transmitted, the display device 3 recognizes that the data transmitted along with the HDR information from the reproduction device 2 is the HDR data. As described above, the HDR information is transmitted along with the HDR data to the display device 3 including the HDR monitor. In this case, the display device 3 displays the video of the HDR data according to characteristics designated by the HDR information. That is, when the monitor of the display device 3 is a monitor having a dynamic range of 0% to 500% and the dynamic range of the HDR data is designated as predetermined characteristics of 0% to 500% by the HDR information, the display device 3 adjusts luminance in the range of 0% to 500% according to the predetermined characteristics and displays the video.

When the luminance characteristics of the master HDR data are configured to be designated, a content author can display a video with intended luminance.

In general, a display device such as a TV recognizes data input from the outside as data having a dynamic range of 0% to 100%. When the monitor of the display device has a broader dynamic range than the dynamic range of 0% to 100%, the display device expands luminance according to the characteristics of the monitor by itself and displays the video. By designating the luminance characteristics and adjusting the luminance of the HDR data according to the designated characteristics, it is possible to prevent luminance adjustment not intended by the author from being performed on the display device side.

In general, a reproduction device outputting data to a display device such as a TV converts luminance according to characteristics of a transmission path, and then outputs data. A display device receiving the data converts the luminance of the received data according to characteristics of a monitor and displays a video. By outputting the HDR data from the reproduction device 2 to the display device 3 without performing the conversion of the luminance in the reproduction device 2, it is possible to reduce a number of times the luminance is converted, and thus a video having luminance closer to the master can be displayed on the display device 3.

On the other hand, when the HDR information is not transmitted, the display device 3 recognizes that the data transmitted from the reproduction device 2 is the STD data and displays the video of the STD data. The fact that the STD data is transmitted from the reproduction device 2 means that the display device 3 is a device that includes the STD monitor.

When audio data is recorded on the optical disc 11 by the recording device 1, the audio data is also transmitted from the reproduction device 2. The display device 3 outputs audio from a speaker based on the audio data transmitted from the reproduction device 2.

Hereinafter, a mode in which the master HDR data is recorded on the optical disc 11 without conversion is appropriately referred to as mode-i. In the case of mode-i, the HDR information and the low-conversion information are recorded on the optical disc 11.

Further, a mode in which the master HDR data is converted into the STD data and is recorded on the optical disc 11 is referred to as mode-ii. In the case of mode-ii, the HDR information and the high-conversion information are recorded on the optical disc 11.

(Signal Processing in Mode-i)

Figure 2:
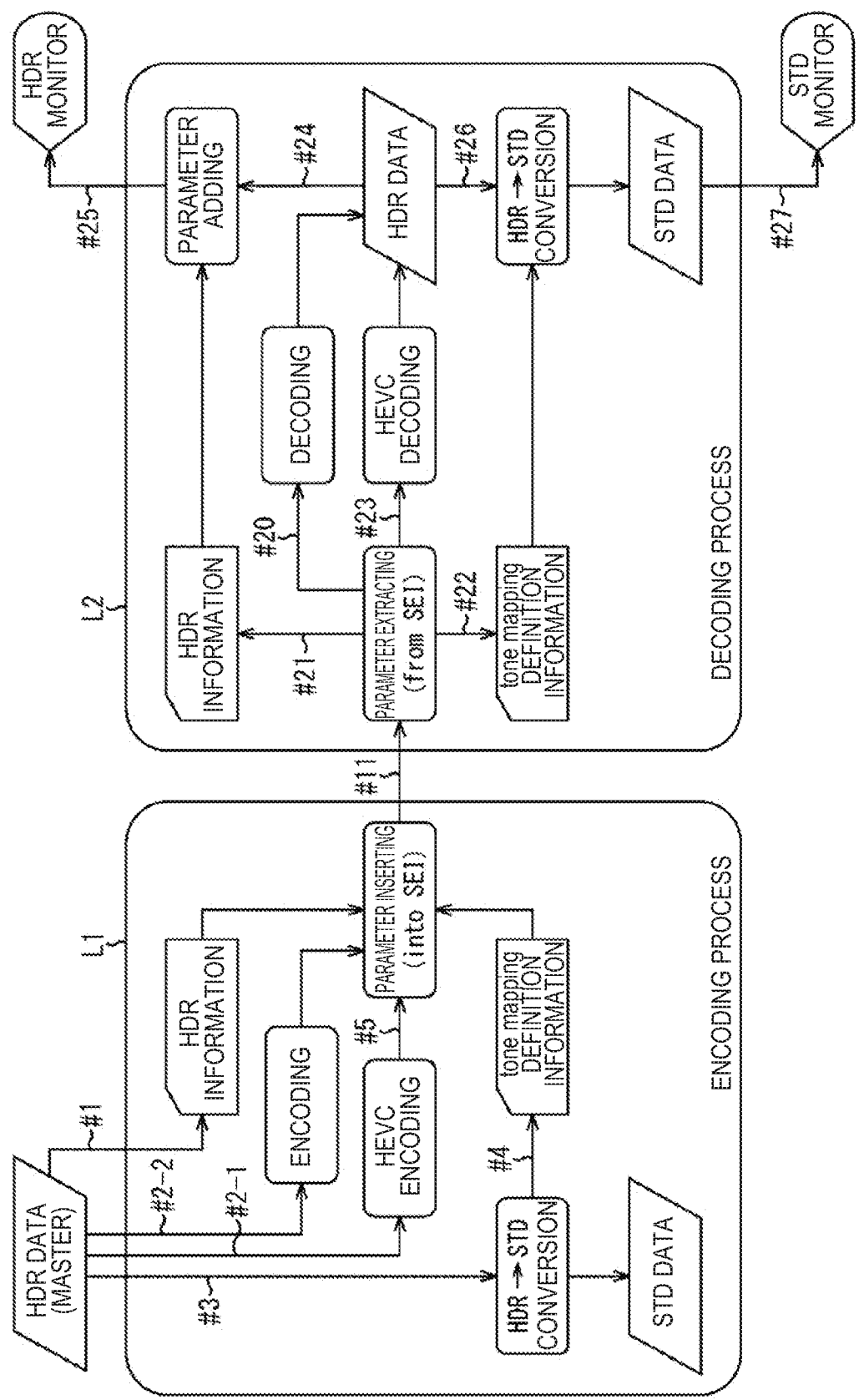
FIG. 2 is a diagram illustrating an example of signal processing in mode-i.

FIG. 2 is a diagram illustrating an example of signal processing in mode-i.

A process on the left side indicated by a solid line L1 is an encoding process performed in the recording device 1 and a process on the right side indicated by a solid line L2 is a decoding process performed in the reproduction device 2.

When the master HDR data is input, the recording device 1 detects the luminance of the master HDR data and generates the HDR information as indicated by the tip of arrow #1. The recording device 1 encodes the master HDR video in accordance with the HEVC scheme to generate coded data, as indicated by the tip of arrow #2-1 and encodes master HDR graphics to generate a graphics stream, as indicated by the tip of arrow #2-2.

The recording device 1 converts the master HDR data into the STD data, as indicated by the tip of arrow #3. A video of the STD data obtained through the conversion is displayed on a monitor (not illustrated). The conversion of the HDR data into the STD data is performed appropriately while the author confirms the video of the STD after the conversion with his or her eyes and adjusts a conversion parameter.

Based on the adjustment by the author, the recording device 1 generates tone mapping definition information for HDR-STD conversion which is low-conversion information, as indicated by the tip of arrow #4.

The tone mapping definition information is information defining a correspondence relation between each luminance value in a dynamic range such as a range of 0% to 400% broader than a standard dynamic range and each luminance value in a dynamic range such as a range of 0% to 100% which is the standard dynamic range.

As indicated by the tip of arrow #5, the recording device 1 inserts the HDR information and the tone mapping definition information as the SEI into encoded data of the HDR video to generate a video stream. The recording device 1 records the generated video stream and a graphics stream of the HDR graphics on the optical disc 11 in accordance with the BD format and supplies the optical disc 11 to the reproduction device 2, as indicated by arrow #11.

In this way, the HDR video, the HDR information of the HDR graphics, and the tone mapping definition information for the HDR-STD conversion are supplied using the SEI to the reproduction device 2 in the form inserted into the video stream.

The reproduction device 2 reads the graphics stream from the optical disc 11 and decodes the graphics stream, as indicated by the tip of arrow #20, to generate the HDR graphics.

The reproduction device 2 reads the video stream from the optical disc 11 and extracts the HDR information and the tone mapping definition information from the SEI of the video stream, as indicated by the tips of arrows #21 and #22.

As indicated by the tip of arrow #23, the reproduction device 2 decodes the encoded data included in the video stream in accordance with the HEVC scheme to generate the HDR video. When the display device 3 includes the HDR monitor, the reproduction device 2 adds the HDR information to the HDR data obtained through the decoding, as indicated by the tip of arrow #24, and outputs the HDR data to the display device 3, as indicated by the tip of arrow #25.

On the other hand, when the display device 3 includes the STD monitor, the reproduction device 2 converts the HDR data obtained through the decoding into the STD data using the tone mapping definition information for the HDR-STD conversion extracted from the video stream, as indicated by the tip of arrow #26. The reproduction device 2 outputs the STD data obtained through the conversion to the display device 3, as indicated by the tip of arrow #27.

In this way, the HDR data obtained through the decoding is output to the display device 3 including the HDR monitor along with the HDR information. The HDR data obtained through the decoding is output to the display device 3 including the STD monitor after the HDR data is converted into the STD data.

Figure 3:
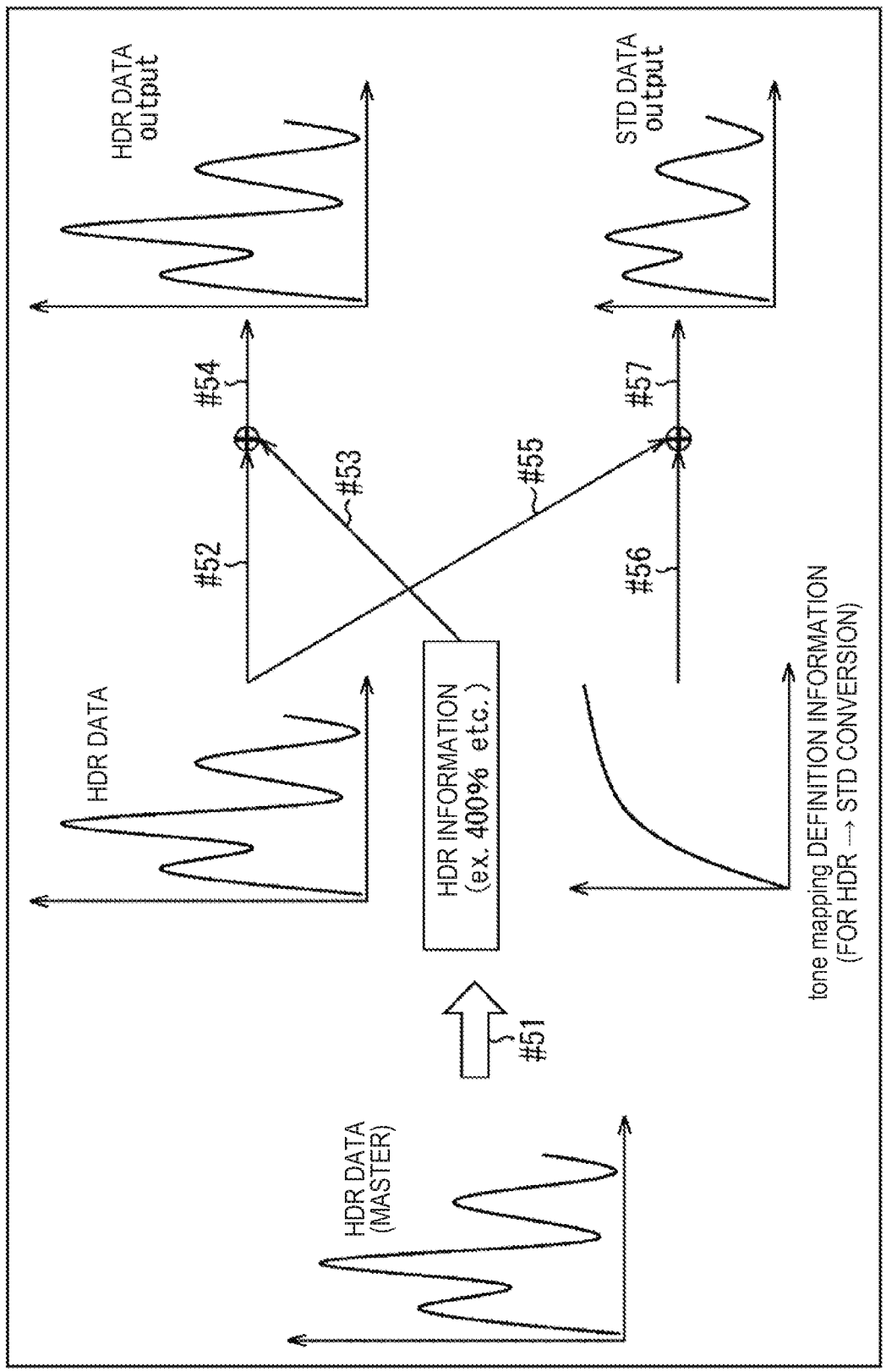
FIG. 3 is a diagram illustrating the flow of a signal processed in mode-i.

FIG. 3 is a diagram illustrating the flow of a process from input of the master HDR data to the recording device 1 to output of the data from the reproduction device 2.

As indicated by the tip of white arrow #51, the master HDR data is supplied to the reproduction device 2 along with the tone mapping definition information for the HDR-STD conversion and the HDR information generated by the recording device 1 bypassed on the master HDR data. The HDR information includes information indicating that the dynamic range is expanded to, for example, the range of 0% to 400%.

When the display device 3 includes the HDR monitor, the HDR information is added to the HDR data obtained through the decoding, as indicated by the tips of arrows #52 and #53 in the reproduction device 2. The HDR data to which the HDR information is added is output to the display device 3, as indicated by the tip of arrow #54.

On the other hand, when the display device 3 includes the STD monitor, the HDR data obtained through the decoding is converted into the STD data using the tone mapping definition information for the HDR-STD conversion, as indicated by the tips of arrows #55 and #56, in the reproduction device 2. The STD data obtained through the conversion is output to the display device 3, as indicated by the tip of arrow #57. In FIG. 3, each of the amplitude of a waveform indicating the HDR data and the amplitude of a waveform indicating the STD data indicates a dynamic range.

In this way, in mode-i, the master HDR data is recorded as the HDR data without conversion on the optical disc 11. According to the performance of the display device 3 which is an output destination, switching is performed between the addition of the HDR information and the output of the HDR data obtained through the decoding without conversion, and the conversion of the HDR data into the STD data and the output of the STD data.

(Signal Processing in Mode-ii)

Figure 4:
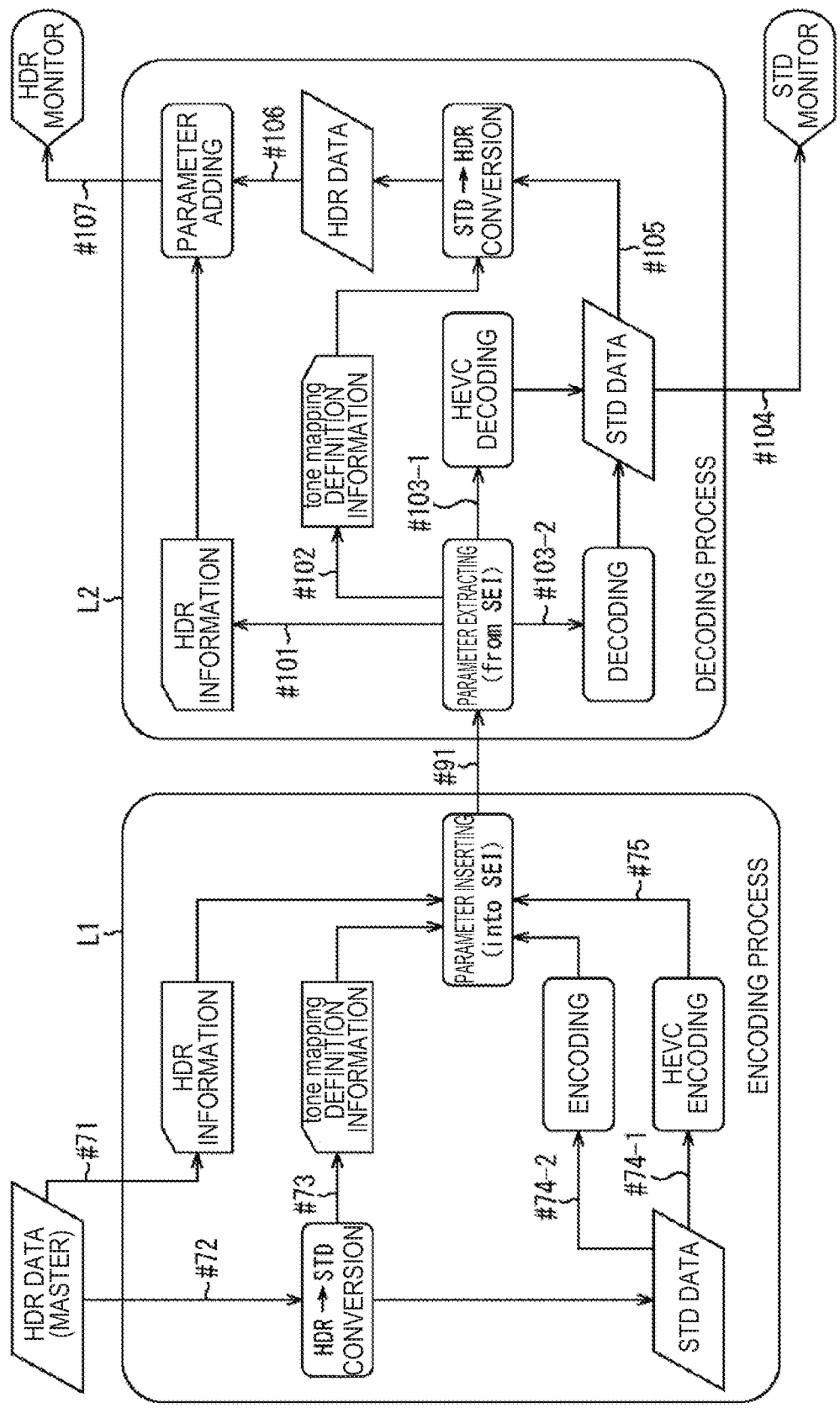
FIG. 4 is a diagram illustrating an example of signal processing in mode-ii.

FIG. 4 is a diagram illustrating an example of signal processing in mode-ii.

When the master HDR data is input, the recording device 1 detects the luminance of the master HDR data and generates the HDR information, as indicated by the tip of arrow #71.

The recording device 1 converts the master HDR data into the STD data, as indicated by the tip of arrow #72. The video of the STD data obtained through the conversion is displayed on the monitor (not illustrated).

Based on the adjustment by the author, the recording device 1 generates tone mapping definition information for STD-HDR conversion which is high-conversion information, as indicated by the tip of arrow #73.

As indicated by the tip of arrow #74-1, the recording device 1 encodes the STD video obtained by converting the master HDR video in accordance with the HEVC scheme to generate encoded data. As indicated by the tip of arrow #74-2, the recording device 1 encodes the STD graphics obtained by converting the master HDR graphics to generate a graphics stream.

As indicated by the tip of arrow #75, the recording device 1 inserts the HDR information and the tone mapping definition information as the SEI into encoded data to generate a video stream. The recording device 1 records the generated video stream and a graphics stream on the optical disc 11 in accordance with the BD format and supplies the optical disc 11 to the reproduction device 2, as indicated by arrow #91.

The reproduction device 2 reads the video stream from the optical disc 11 and extracts the HDR information and the tone mapping definition information from the SEI of the video stream, as indicated by the tips of arrows #101 and #102.

The reproduction device 2 decodes the encoded data included in the video stream in accordance with the HEVC scheme to generate the STD video, as indicated by the tip of arrow #103-1, and decodes the graphics stream to generate the STD graphics, as indicated by the tip of arrow #103-2. When the display device 3 includes the STD monitor, the reproduction device 2 outputs the STD data obtained through the decoding to the display device 3, as indicated by the tip of arrow #104.

On the other hand, when the display device 3 includes the HDR monitor, the reproduction device 2 converts the STD data obtained through the decoding into the HDR data using the tone mapping definition information for the STD-HDR conversion extracted from the video stream, as indicated by the tip of arrow #105. The reproduction device 2 adds the HDR information to the HDR data obtained through the conversion, as indicated by the tip of arrow #106, and outputs the HDR data to the display device 3, as indicated by the tip of arrow #107.

In this way, after the STD data obtained through the decoding is converted into the HDR data, the HDR data is output to the display device 3 including the HDR monitor along with the HDR information. The STD data obtained through the decoding is output to the display device 3 including the STD monitor without conversion.

Figure 5:
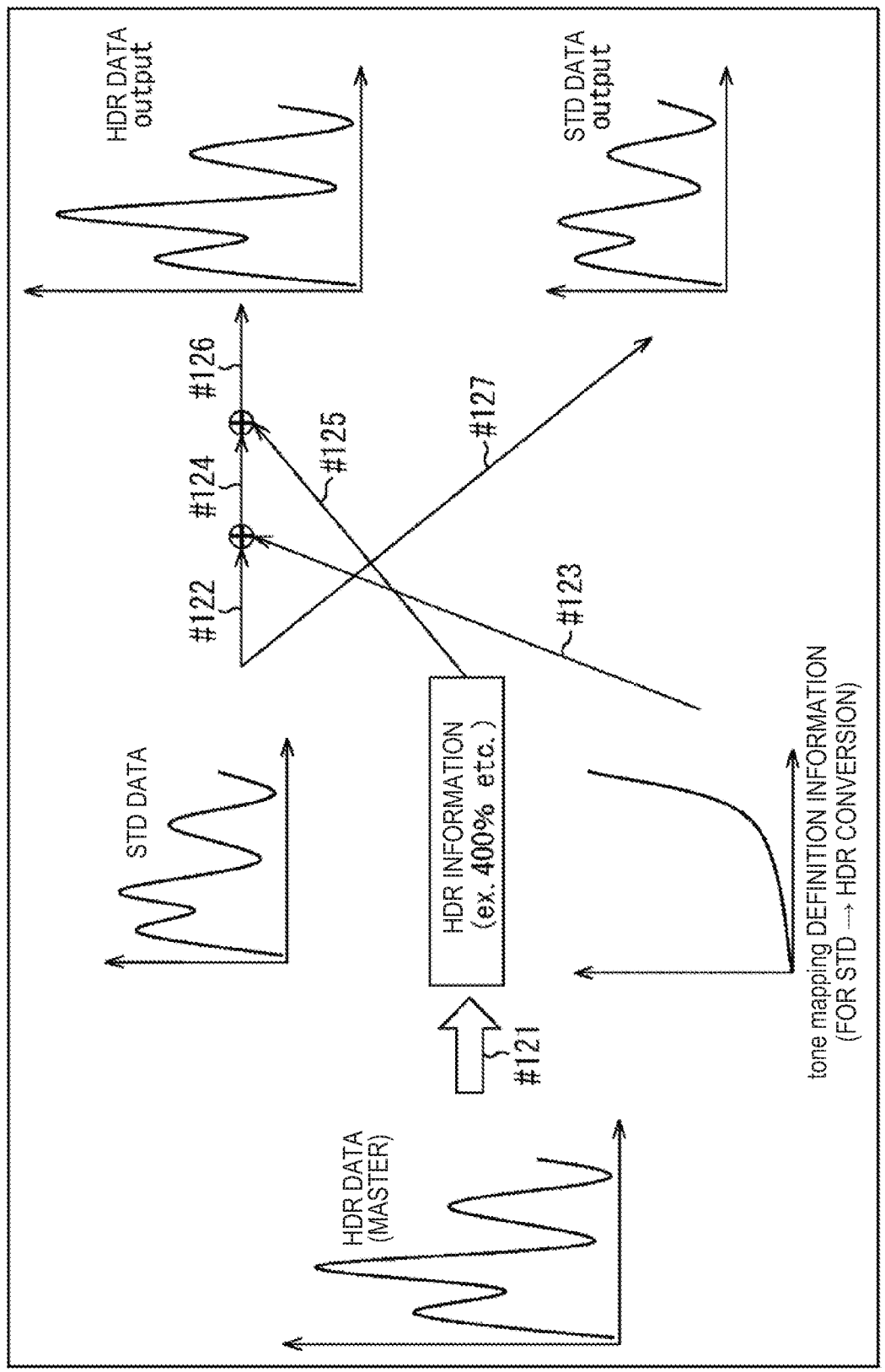
FIG. 5 is a diagram illustrating the flow of a signal processed in mode-ii.

FIG. 5 is a diagram illustrating the flow of a process from input of the master HDR data to the recording device 1 to output of the data from the reproduction device 2.

As indicated by the tip of white arrow #121, after the master HDR data is converted into the STD data, the STD data is supplied to the reproduction device 2 along with the tone mapping definition information for the STD-HDR conversion and the HDR information generated in the recording device 1 based on the master HDR data.

When the display device 3 includes the HDR monitor, the STD data obtained through the decoding is converted into the HDR data using the tone mapping definition information for the STD-HDR conversion, as indicated by the tips of arrows #122 and #123 in the reproduction device 2. The HDR data obtained by converting the STD data is added to the HDR information, as indicated by the tips of arrows #124 and #125, and the HDR data is output to the display device 3, as indicated by the tip of arrow #126.

On the other hand, when the display device 3 includes the STD monitor, the STD data obtained through the decoding is output to the display device 3, as indicated by the tip of arrow #127, in the reproduction device 2.

In this way, in mode-ii, the master HDR data is converted into the STD data to be recorded on the optical disc 11. According to the performance of the display device 3 which is an output destination, switching is performed between the conversion of the STD data obtained through the decoding into the HDR data and the addition and output of the HDR information, and the output of the STD data without conversion.

The details of the configurations and operations of the recording device 1 and the reproduction device 2 described above will be described below.

Here, the HEVC scheme will be described.

(Configuration of Access Unit in HEVC Scheme)

Figure 6:
FIG. 6 is a diagram illustrating the configuration of an access unit in an HEVC scheme.

FIG. 6 is a diagram illustrating the configuration of an access unit in the HEVC scheme.

A video stream is configured to include an access unit which is a collection of network abstraction layer (NAL) units. One access unit includes video data of one picture.

As illustrated in FIG. 6, one access unit is configured to include an access unit delimiter (AU delimiter), a video parameter set (VPS), a sequence parameter set (SPS), a picture parameter set (PPS), an SEI, a video coding layer (VCL), an end of sequence (EOS), and an end of stream (EOS).

The AU delimiter indicates the beginning of an access unit. The VPS includes metadata indicating the content of a bit stream. The SPS includes information, such as a picture size and a coding tree block (CTB) size, which is necessarily referred to in a decoding process for a sequence by an HEVC decoder. The PPS includes information which is necessarily referred to by the HEVC decoder in order to perform a decoding process for a picture. The VPS, the SPS, and the PPS are used as header information.

The SEI is auxiliary information that includes timing information of each picture or information regarding random access. The HDR information and the tone mapping definition information are included in tone_mapping_info which is one of the SEIs. Identification information identifying tone_mapping_info is assigned to tone_mapping_info. In the present specification, tone_mapping_info in which the identification information is i is referred to as tone_mapping_info #i.

The VCL is encoded data of 1 picture. The end of sequence (EOS) indicates an end position of a sequence and the end of stream (EOS) indicates an end position of a stream.

(tone_mapping_info)

FIG. 7 is a diagram illustrating the syntax of tone_mapping_info.

The brightness or color of a video obtained by performing decoding using tone_mapping_info is converted according to the performance of a monitor which is a video output destination. A line number and a colon (:) on the left side of FIG. 7 are shown for convenience of the description and are not included in the syntax. The same also applies to FIGS. 16, 17, 18A, 18B, 20, 37, 38, 50, and 51 to be described below. Main information included in tone_mapping_info will be described.

In the 2nd line, tone_map_id is identification information of tone_mapping_info. In the 8th line, tone_map_model_id indicates a model of a tone map used for conversion.

In the recording device 1, at least one piece of tone_mapping_info in which one value among 0, 2, and 3 is set as tone_map_model_id and one piece of tone_mapping_info in which a value of 4 is set as tone_map_model_id are generated.

As illustrated in FIG. 8, tone_mapping_info in which one value among 0, 2 and 3 is set as tone_map_model_id is used as the tone mapping definition information for HDR-STD conversion or STD-HDR conversion. Information included in tone_mapping_info in which a value of 4 is set as tone_map_model_id is used as the HDR information.

In FIG. 7, 9th to 11th lines are a description of tone_map_model_id=0. In the case of tone_map_model_id=0, min_value and max_value are described.

FIG. 9 is a diagram illustrating an example of a tone curve shown by tone_mapping_info of tone_map_model_id=0.

In FIG. 9, the horizontal axis represents coded_data (RGB value before conversion) and the vertical axis represents target_data (RGB value after conversion). When the tone curve in FIG. 9 is used, an RGB value equal to or less than D1 is converted into an RGB value indicated by min_value, as indicated by white arrow #151. Further, an RGB value equal to or greater than D2 is converted into an RGB value indicated by max_value, as indicated by white arrow #152.

Here, tone_mapping_info of tone_map_model_id=0 is used as the tone mapping definition information for HDR-STD conversion. When tone_mapping_info of one_map_model_id=0 is used, luminance equal to or greater than max_value and equal to or less than min_value (luminance expressed by an RGB value) is lost, but a load on the conversion process is lightened.

In FIG. 7, 15th to 17th lines are a description of tone_map_model_id=2. In the case of tone_map_model_id=2, start_of_coded_interval[i] of the same number as the number of pieces of max_target_data, which indicates a step function, is described. The number of bits of start_of_coded_interval[i] may be a variable value decided by coded_data_bit_depth in the 6th line or a fixed value (256 bits). In the case of the variable value, the number of bits can be reduced to be less than the fixed value.

FIG. 10 is a diagram illustrating an example of a step function shown by tone_mapping_info of tone_map_model_id=2.

When the step function in FIG. 10 is used, for example, coded_data=5 is converted into target_data=3. When start_of_coded_interval[i] is assumed to be {1, 3, 4, 5, 5, 5, 7, 7, . . . }, a coded_data-target_data conversion table is expressed as {0, 1, 1, 2, 3, 5, 5, . . . }.

Here, tone_mapping_info of tone_map_model_id=2 is used as the tone mapping definition information for STD-HDR conversion or HDR-STD conversion. Further, since tone_mapping_info of tone_map_model_id=2 has a large amount of data, it is necessary to perform convolution to a conversion table at the time of generation, but a load of the conversion process is light.

In FIG. 7, 18th to 23rd lines are a description of tone_map_model_id=3. In the case of tone_map_model_id=3, coded_pivot_value[i] and target_pivot_value[i] of numbers designated by num_pivots, which indicate a polygonal line function, are described. The number of bits of coded_pivot_value[i] and target_pivot_value[i] may be a variable value decided by coded_data_bit_depth in the 6th line or may be a fixed value (256 bits). In the case of the variable value, the number of bits can be reduced to be less than the fixed value.

Figure 11:
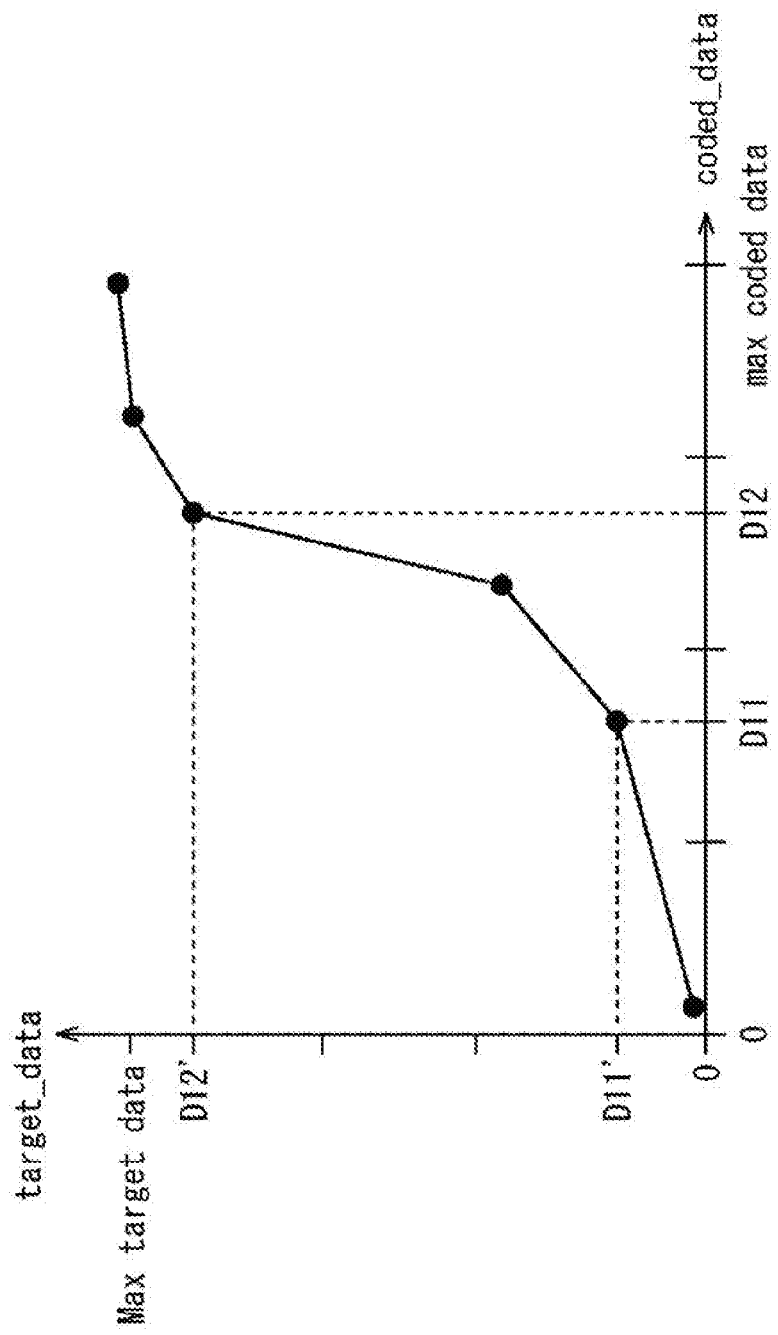
FIG. 11 is a diagram illustrating an example of a polygonal line function shown by Tone_mapping_info of tone_map_model_id=3.

FIG. 11 is a diagram illustrating an example of a polygonal line function shown by tone_mapping_info of tone_map_model_id=3.

When the polygonal line function in FIG. 11 is used, for example, coded_data=D11 is converted into target_data=D11' and coded_data=D12 is converted into target_data=D12'. Here, tone_mapping_info of tone_map_model_id=3 is used as the tone mapping definition information for STD-HDR conversion or HDR-STD conversion.

In this way, tone_mapping_info in which one value among 0, 2, and 3 is set as tone_map_model_id is used as the tone mapping definition information for STD-HDR conversion or HDR-STD conversion and is transmitted from the recording device 1 to the reproduction device 2.

In FIG. 7, 24th to 39th lines are a description of tone_map_model_id=4. Of the information regarding tone_map_model_id=4, ref_screen_luminance_white, extended_range_white_level, nominal_black_level_code_value, nominal_white_level_code_value, and extended_white_level_code_value are parameters included in the HDR information.

Figure 12:
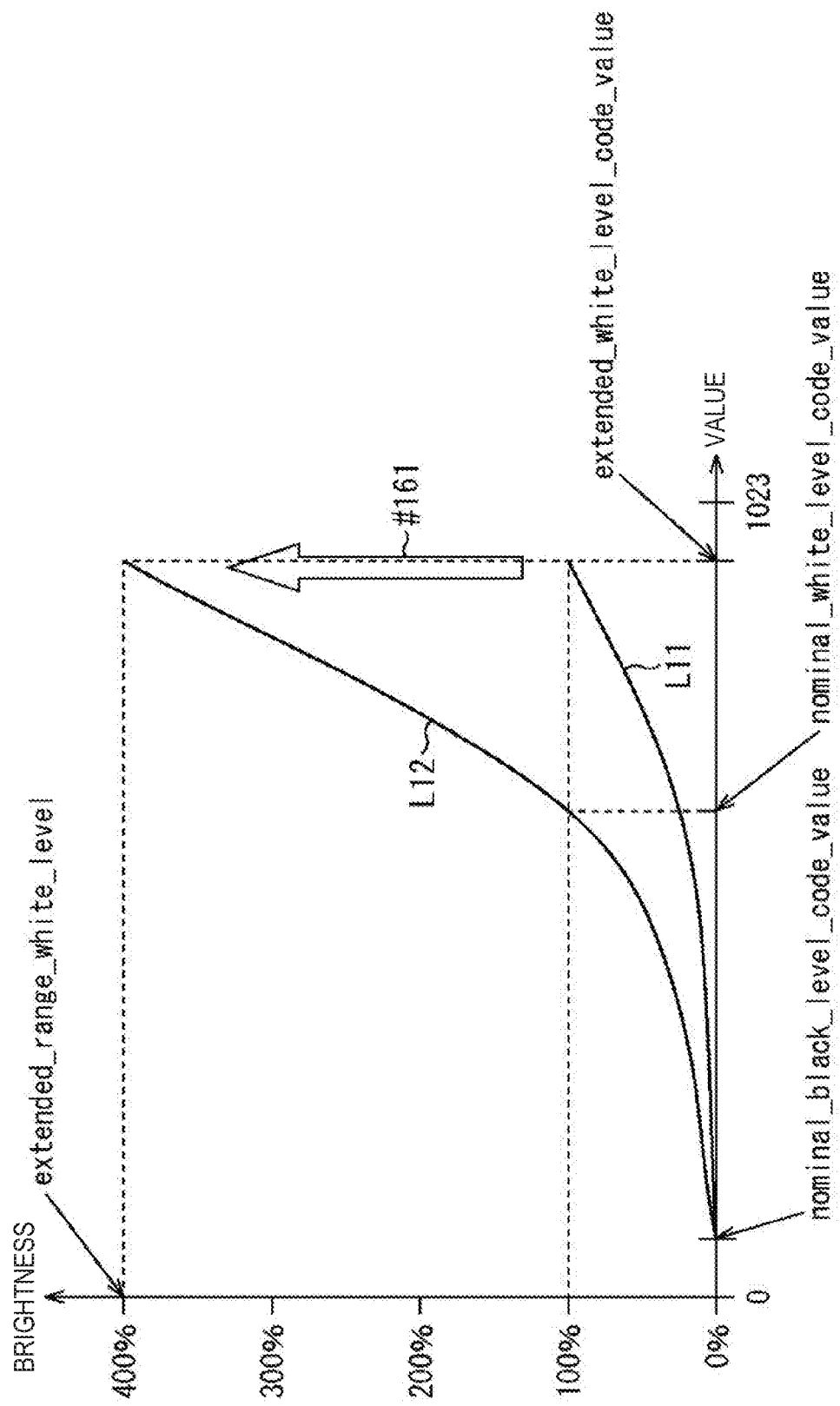
FIG. 12 is a diagram illustrating an example of each piece of information included in the HDR information.

FIG. 12 is a diagram illustrating an example of each piece of information included in the HDR information.

In FIG. 12, the horizontal axis represents a luminance value. When a bit length is 10 bits, the luminance value is a value of 0 to 1023. In FIG. 12, the vertical axis represents brightness. A curved line L11 indicates a relation between a luminance value and brightness in a monitor having standard luminance. A dynamic range of the monitor having the standard luminance is a range of 0% to 100%.

Here, ref_screen_luminance_white indicates the brightness (cd/m2) of a standard monitor. Further, extended_range_white_level indicates the brightness of a dynamic range after extension. In the case of the example of FIG. 12, 400 is set as a value of extended_range_white_level.

Here, nominal_black_level_code_value indicates a luminance value of black (brightness of 0%) and nominal_white_level_code_value indicates a luminance value of white (brightness of 100%) in the monitor having the standard luminance. Further, extended_white_level_code_value indicates a luminance value of white in the dynamic range after extension.

In the case of the example of FIG. 12, the dynamic range of 0% to 100% is extended to a dynamic range of 0% to 400% according to the value of extended_range_white_level, as indicated by white arrow #161. A luminance value corresponding to brightness of 400% is designated by extended_white_level_code_value.

The luminance characteristics of the HDR data are characteristics indicated by a curved line L12 in which the values of nominal_black_level_code_value, nominal_white_level_code_value, and extended_white_level_code_value are respectively brightness of 0%, 100%, and 400%.

In this way, the luminance characteristics of the master HDR data are indicated by tone_mapping_info in which the value of 4 is set as tone_map_model_id and is transmitted from the recording device 1 to the reproduction device 2.

Here, the BD-ROM format will be described.
(Management Structure of AV Stream in BD-ROM Format)

Figure 13:
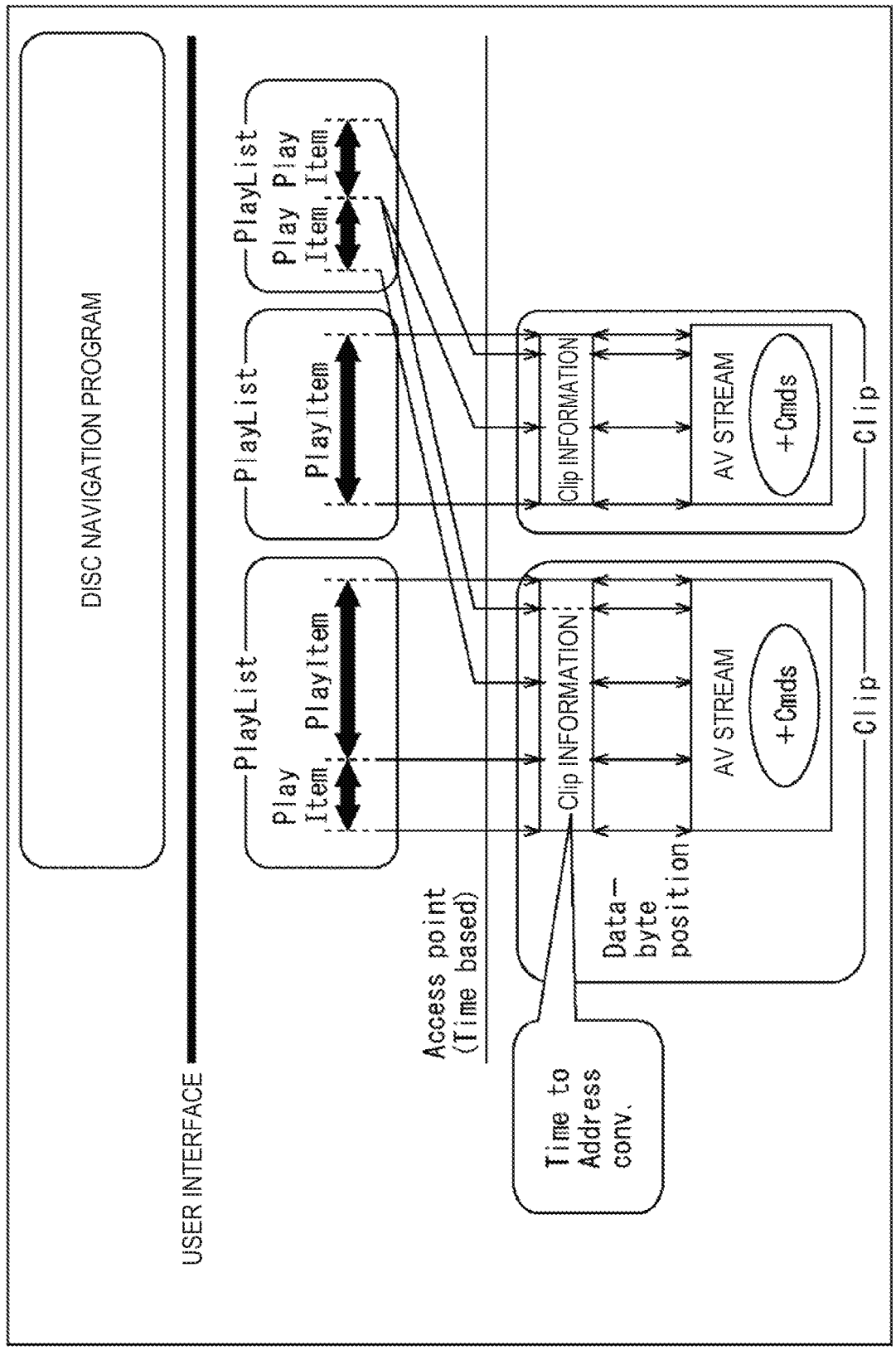
FIG. 13 is a diagram illustrating an example of a management structure of an AV stream in a BD-ROM format.

FIG. 13 is a diagram illustrating an example of a management structure of an AV stream in a BD-ROM format.

The management of an AV stream including a video stream is performed using two layers of PlayList and Clip. The AV stream is recorded not only on the optical disc 11 but also on a local storage of the reproduction device 2.

A pair of one AV stream and Clip Information which is information pertaining to the AV stream is managed as one object. A pair of AV stream and Clip Information is referred to as Clip.

The AV stream is developed on a time axis and an access point of each Clip is designated in PlayList mainly with a time stamp. Clip Information is used, for example, to search for an address at which decoding is to start, in the AV stream.

PlayList is a collection of reproduction sections of an AV stream. One reproduction section in the AV stream is referred to as PlayItem. PlayItem is expressed with a pair of IN point and OUT point of a reproduction section on the time axis. As illustrated in FIG. 13, PlayList is configured to include one PlayItem or a plurality of PlayItems.

The first PlayList from the left side of FIG. 13 is configured to include two PlayItems. The first half portion and the second half portion of the AV stream included in the left Clip are referred to by the two PlayItems.

The second PlayList from the left side is configured to include one PlayItem and the entire AV stream included in the right Clip is referred to by the PlayList.

The third PlayList from the left side is configured to include two PlayItems. A certain portion of the AV stream included in the left Clip and a certain portion of the AV stream included in the right Clip are referred to by the two PlayItems.

For example, the left PlayItem included in the first PlayList from the left side is designated as a reproduction target by a disc navigation program, the first half portion of the AV stream included in the left Clip referred to by the PlayItem is reproduced. In this way, PlayList is used as reproduction management information to manage reproduction of the AV stream.

A reproduction path which is a reproduction path of at least one PlayList in PlayList and is made in accordance with at least the one PlayList is referred to as Main Path. A reproduction path which is a reproduction path of at least one SubPlayItem in PlayList and is made in accordance with at least the one SubPlayItem in parallel with Main Path is referred to as Sub Path.
(Structure of Main Path and Sub Path)

Figure 14:
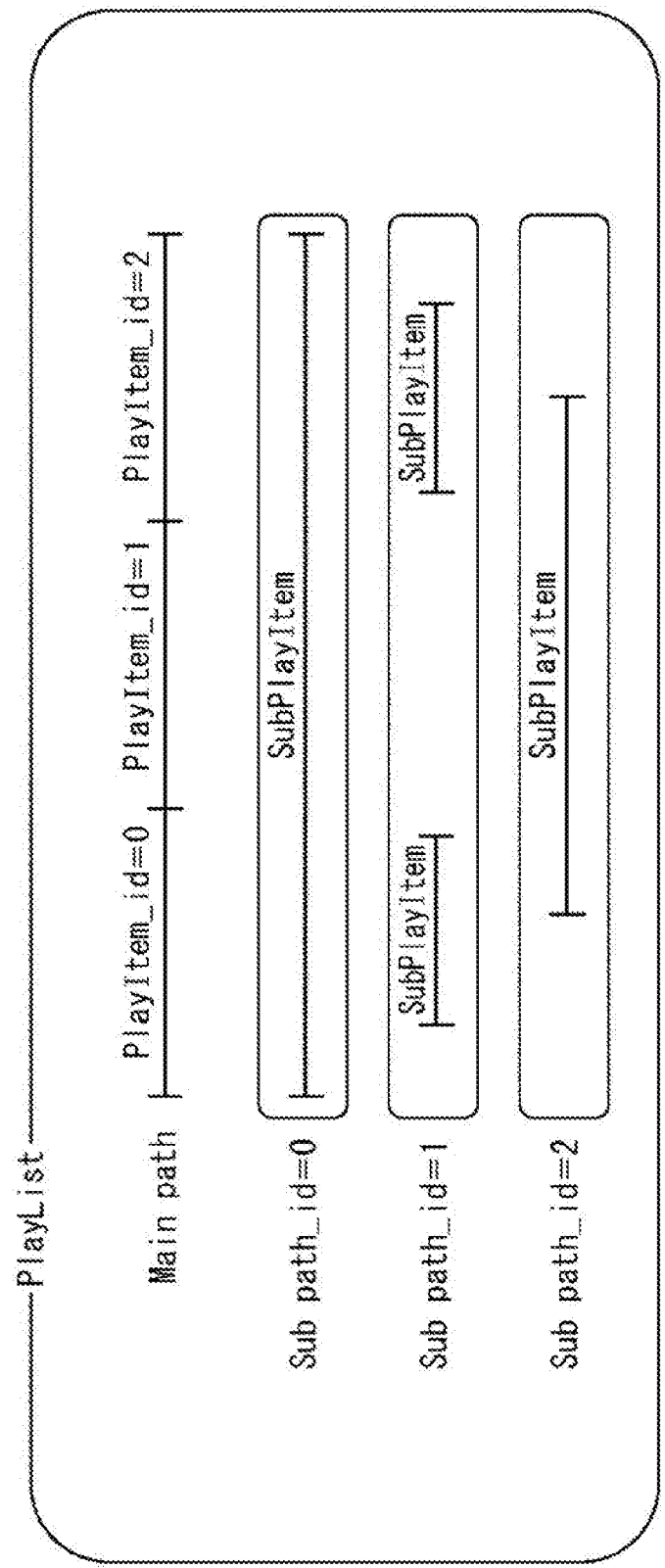
FIG. 14 is a diagram illustrating the structure of Main Path and Sub Path.

FIG. 14 is a diagram illustrating the structure of Main Path and Sub Path. PlayList includes one Main Path and at least one Sub Path. PlayList in FIG. 14 includes one Main Path and three Sub Paths which are Main Path and Sub Paths of three PlayItems and are made in accordance with the three PlayItems.

In PlayItems forming Main Path, IDs are each set sequentially from the beginning. In Sub Paths, IDs of Subpath_id=0, Subpath_id=1, and Subpath_id=2 are set sequentially from the beginning.

In the example of FIG. 14, one SubPlayItem is included in Sub Path of Subpath_id=0 and two SubPlayItems are included in Sub Path of Subpath_id=1. One SubPlayItem is included in Sub Path of Subpath_id=2.

An AV stream referred to by one PlayItem includes at least a video stream of a main video. The AV stream may include or may not include at least one audio stream reproduced at the same timing as (synchronized with) the video stream of the main video included in the AV stream.

The AV stream may include or may not include at least one video stream of a sub-video reproduced in synchronization with the video stream of the main video included in the AV stream.

The AV stream may include or may not include at least one PG stream which is a stream of subtitle data (Presentation Graphic (PG)) of a bit map reproduced in synchronization with the video stream of the main video included in the AV stream.

The AV stream may include or may not include at least one Text_ST stream which is a stream of text data (Text-ST) of subtitles reproduced in synchronization with the video stream of the main video included in the AV stream.

The AV stream may include or may not include at least one IG stream which is a stream of image data (Interactive Graphic (IG)) of a menu button reproduced in synchronization with the video stream of the main video included in the AV stream.

The video stream of the main video, and the audio stream, the video stream of the sub-video, the PG stream, the Text-ST stream, and the IG stream reproduced in synchronization with the video stream of the main video are multiplexed to the AV stream referred to by one PlayItem.

One SubPlayItem refers to, for example, a video stream, an audio stream, a PG stream, a Text-ST stream, an IG stream, or the like different from the AV stream referred to by PlayItem.

In this way, the AV stream is reproduced using PlayList and Clip Information. PlayList and Clip Information including the information regarding the reproduction of the AV stream are appropriately referred to as Data Base information.

(Management Structure of File of Optical Disc 11)

Figure 15:
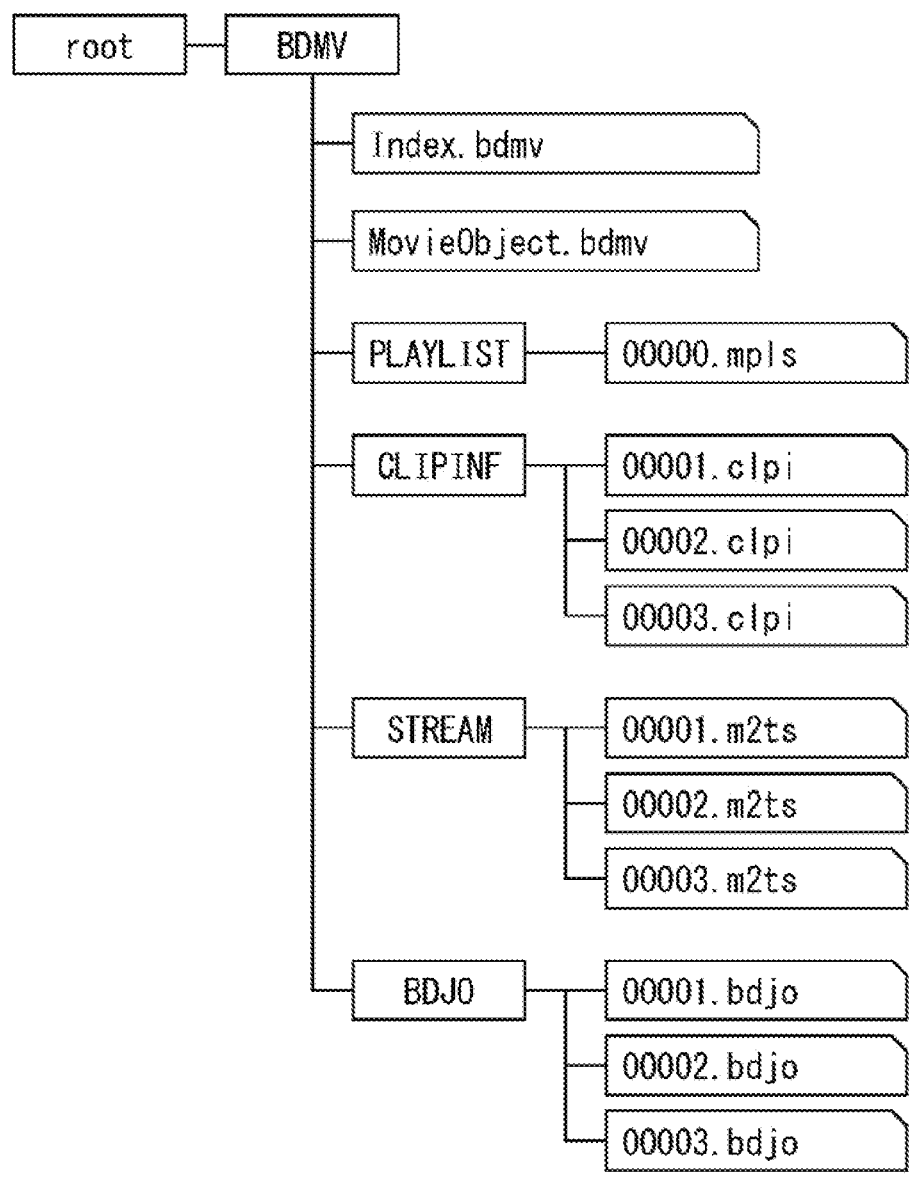
FIG. 15 is a diagram illustrating an example of a management structure of a file.

FIG. 15 is a diagram illustrating an example of a management structure of a file recorded on the optical disc 11.

Each file recorded on the optical disc 11 is hierarchically managed by a directory structure. One root directory is created on the optical disc 11.

A BDMV directory is placed under the root directory.

Under the BDMV directory, an Index file which is a file in which a name "Index.bdmv" is set and a MovieOjbect file which is a file in which a name "MovieObject.bdmv" are set.

In the Index file, for example, a list of title numbers recorded on the optical disc 11, and kinds of objects and object numbers executed in correspondence to the title numbers are described. As the kinds of objects, there are two kinds of a movie object (MovieObject) and a BDJ object (BDJ object).

The movie object is an object in which a navigation command of reproduction or the like of a playlist is described. The BDJ object is an object in which a BDJ application is described. In a MovieObject file, a movie object is described.

Under the BDMV directory, a PLAYLIST directory, a CLIPINF directory, a STREAM directory, a BDJO directory, and the like are provided.

In the PLAYLIST directory, PlayList files in which PlayList is described are stored. In each PlayList file, a name in which a 5-digit number and an extension ".mpls" are combined is set. In one Playlist file illustrated in FIG. 15, a file name "00000.mpls" is set.

In the CLIPINF directory, Clip Information files in which Clip Information is described are stored. In each Clip Information file, a name in which a 5-digit number and an extension ".clpi" are combined is set. In three Clip Information files in FIG. 15, file names "00001.clpi," "00002.clpi," and "00003.clpi" are set.

In the STREAM directory, stream files are stored. In each stream file, a name in which a 5-digit number and an extension ".m2ts" are combined is set. In three stream files in FIG. 15, file names "00001.m2ts," "00002.m2ts," and "00003.m2ts" are set.

The Clip Information file and the stream file in which the same 5-digit number is set in the file name are files forming one Clip. When the stream file "00001.m2ts" is reproduced, the Clip Information file "00001.clpi" is used. When the stream file "00002.m2ts" is reproduced, the Clip Information file "00002.clpi" is used.

In the BDJO directory, BDJ object files in which a BDJ object is described are stored. In each BDJ object file, a name in which a 5-digit number and an extension ".bdjo" are combined is set. In three stream files in FIG. 15, file names "00001.bdjo," "00002.bdjo," and "00003.bdjo" are set.

Here, main description of the syntax of each file will be described.

(Syntax of Playlist File)

FIG. 16 is a diagram illustrating the syntax of STN_table of PlayItem of a playlist file.

STN_table includes information regarding the AV stream referred to by PlayItem. When there is Sub Path reproduced in association with PlayItem, information regarding the AV stream referred by SubPlayItem forming the Sub Path.

In the 4th line, number_of_primary_video_stream_entries indicates the number of video streams of a main video entered (registered) in STN_table. In the 6th line, number_of_PG_textST_stream_entries indicates the number of PG streams and Text-ST streams entered in STN_table. In the 7th line, number_of_IG_stream_entries indicates the number of IG streams entered in STN_table.

In the 11th line, primary_video_tone_mapping_flag indicates whether the video stream of the main video and tone_mapping_info are associated with each other. In the 12th line, PG_text_ST_tone_mapping_flag indicates whether the PG stream, the Text-ST stream, and tone_mapping_info are associated with one another. In the 13th line, IG_tone_mapping_flag indicates whether the IG stream and tone_mapping_info are associated with each other. In the 14th line, secondary_vidieo_tone_mapping_flag indicates whether the video stream of the sub-video and tone_mapping_info are associated with each other.

As illustrated in the 33rd line, when primary_video_tone_mapping_flag is 1, number_of_tone_mapping_info_ref indicating the number of pieces of tone_mapping_info used when the video stream of the main video is reproduced is described in STN_table.

As illustrated in the 34th to 37th lines, when primary_video_tone_mapping_flag is 1, tone_mapping_info_ref indicating tone_map_id of tone_mapping_info used when the video stream of the main video is reproduced is described in STN_table. Thus, the video stream of the main video and tone_mapping_info of the video stream are associated with each other. Accordingly, number_of_tone_mapping_info_ref and tone_mapping_info_ref in the 33rd to 37th lines are association information associating the video stream of the main video with tone_mapping_info of the video stream of the main video.

Similarly, as illustrated in the 56th to 60th lines, when PG_text_ST_tone_mapping_flag is 1, the number of pieces of tone_mapping_info used when the PG stream and the Text-ST stream are reproduced and tone_map_id of tone_mapping_info are set in STN_table. Thus, the PG stream and the Text-ST stream are associated with tone_mapping_info of the PG stream and the Text-ST stream. Accordingly, number_of_tone_mapping_info_ref and tone_mapping_info_ref in the 56th to 60th lines are association information associating the PG stream and the Text-ST stream with tone_mapping_info of the PG stream and the Text-ST stream.

Similarly, as illustrated in the 79th to 83rd lines, when IG_tone_mapping_flag is 1, the number of pieces of tone_mapping_info used when the IG stream is reproduced and tone_map_id of tone_mapping_info are set in STN_table. Thus, the IG stream and tone_mapping_info of the IG stream are associated with each other. Accordingly, number_of_tone_mapping_info_ref and tone_mapping_info_ref in the 79th to 83rd lines are association information associating the IG stream with tone_mapping_info of the IG stream. Similarly, as illustrated in the 105th to 109th lines, when secondary_video_tone_mapping_flag is 1, the number of pieces of tone_mapping_info used when the video stream of the sub-video is reproduced and tone_map_id of tone_mapping_info are set in STN_table. Thus, the video stream of the sub-video and tone_mapping_info of the video stream of the sub-video are associated with each other. Accordingly, number_of_tone_mapping_info_ref and tone_mapping_info_ref in the 105th to 109th lines are association information associating the video stream of the sub-path with tone_mapping_info of the video stream of the sub-video.

As described above, each AV stream and tone_mapping_info of the AV stream are associated with each other in STN_table. Accordingly, the reproduction device 2 can select tone_mapping_info of each AV stream in tone_mapping_info inserted into the SEI of the video stream based on STN_table and use tone_mapping_info when the AV stream is reproduced.

(Syntax of Clip Information File)

FIG. 17 is a diagram illustrating the syntax of StreamCodingInfo of a Clip Information file.

StreamCodingInfo includes information regarding encoding of the AV stream included in Clip.

In the 3rd line, stream_coding_type indicates an encoding scheme of an elementary stream included in the AV stream. For example, in StreamCodingInfo of Clip Information used when the video stream is reproduced, a value indicating that the encoding scheme is the HEVC scheme is set as stream_coding_type.

As illustrated in the 4th to 6th lines, StreamCodingInfo includes [Video Block] which is information regarding encoding of the video stream, [Audio Block] which is encoding of an audio stream, and [Graphics Block] which is information regarding encoding of a graphics stream.

FIGS. 18A and 18B are diagrams illustrating the syntaxes of [Video Block] and [Graphics Block] in FIG. 17.

FIG. 18A illustrates the syntax of [Video Block] and FIG. 18B illustrates the syntax of [Graphics Block].

[Video Block] in FIG. 18A is information regarding encoding of the video stream described in StreamCodingInfo of Clip Information used in reproduction of the video stream. In the 5th line, video_format indicates a video scanning scheme.

In the 10th line, HDR_flag is a 1-bit flag and indicates whether the HDR data is recorded as a master. For example, HDR_flag=1 indicates that the HDR data is recorded as a master. Further, HDR_flag=0 indicates that the STD data is recorded as a master.

In the 11th line, mode_flag is a 1-bit flag and indicates a recording mode of the AV stream. Further, mode_flag is effective in the case of HDR_flag=1. For example, mode_flag=1 indicates that the recording mode is mode-i. Further, mode_flag=0 indicates that the recording mode is mode-ii.

In this way, Clip Information includes the flag indicating whether the AV stream reproduced using Clip Information is a stream in which a master of the AV stream is master HDR data and the flag indicating the recording mode of the AV stream.

The reproduction device 2 can specify, for example whether the master data is the HDR data without actual analysis of the AV stream by referring to the flag included in Clip Information.

In the 14th line, number_of_tone_mapping_info_ref indicates the number of pieces of tone_mapping_info included in the video stream. As illustrated in the 15th to 18th lines, [Video Block] also includes tone_mapping_info_ref indicating tone_map_id of tone_mapping_info included in the video stream.

[Graphics Block] in FIG. 18B is information regarding encoding of the graphics stream described in StreamCodingInfo of Clip Information used in reproduction of the graphics stream. As illustrated in the 4th line, when the graphics stream is the PG stream, [Graphics Block] includes PG_language_code indicating a language code of the PG stream.

As illustrated in the 7th to 11th lines, when the graphics stream is the PG stream, [Graphics Block] includes number_of_tone_mapping_info_ref indicating the number of pieces of tone_mapping_info included in the PG stream and tone_mapping_info_ref indicating tone_map_id of tone_mapping_info.

When the graphics stream is the IG stream, as illustrated in the 15th line, [Graphics Block] also include IG_language_code indicating a language code of the IG stream. As illustrated in the 18th to 22nd lines, number_of_tone_mapping_info_ref indicating the number of pieces of tone_mapping_info included in the IG stream and tone_mapping_info_ref indicating tone_map_id of tone_mapping_info are included.

Here, the configurations of the PG stream and the IG stream will be described.

(Configurations of PG Stream and IG Stream)

Figure 19A:
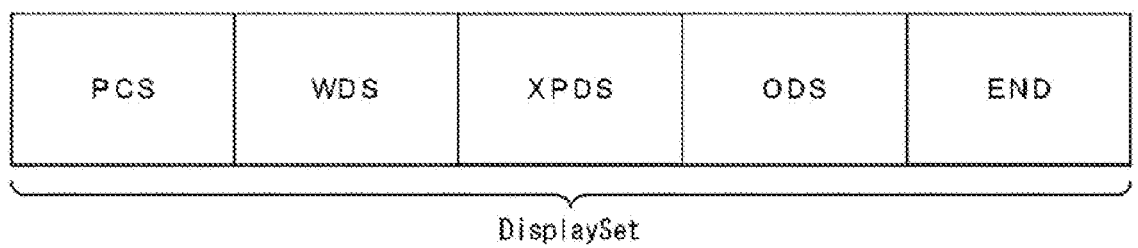
FIG. 19A is a diagram illustrating a configuration example of a display set of a PG stream and FIG. 19B is a diagram illustrating a configuration example of a display set of an IG stream.
Figure 19B:
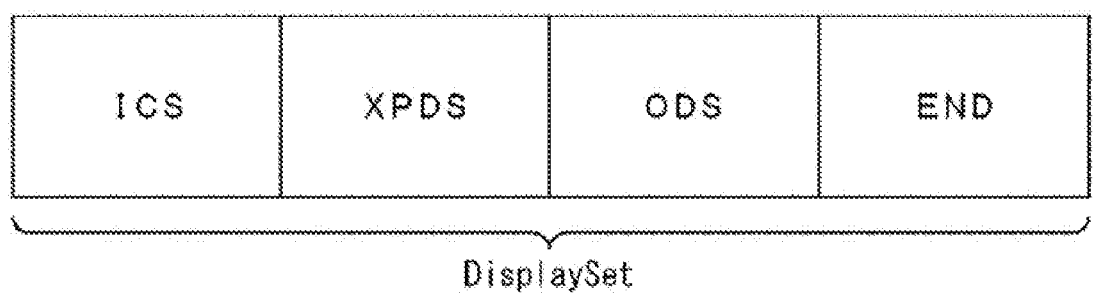

FIGS. 19A and 19B are diagrams illustrating a configuration example of a display set of a PG stream and an IG stream.

As illustrated in FIG. 19A, a display set of the PG stream is configured to include a presentation composition segment (PCS), a window definition segment (WDS), an extended palette definition segment (XPDS), an object definition segment (ODS), and an end of display set segment (END) which are segments of subtitles corresponding to one screen.

In the PCS, an ID or the like assigned to the subtitles corresponding to each ODS is described. In the WDS, information or the like indicating a structure such as the position, size, or the like of a window indicating a subtitles display range is described. In the XPDS, information regarding colors which can be used as colors of subtitles is described. In the ODS, information indicating the shape of the subtitles is described. The END is a segment indicating the end of the display set.

As illustrated in FIG. 19B, a display set of the IG stream is configured to include an interactive composition segment (ICS), an XPDS, an ODS, and an END which are segments of a menu button corresponding to one screen.

In the ICS, a command executed by a manipulation of the menu button and an ID or the like unique to the menu button corresponding to each ODS are described. In the XPDS, information regarding colors which can be used as colors of the menu button is described. In the ODS, information indicating the shape of the menu button is described. The END is a segment indicating the end of the display set.

(Syntax of XPDS)

FIG. 20 is a diagram illustrating the syntax of the XPDS. In the 5th line of FIG. 20, color_depth indicates the number of bits of Y_value, Cr_value, Cb_value, and T_value in the 9th to 12th lines. Y_value indicates a luminance component of a color, Cr_value and Cb_value indicate a color difference component of the color, and T_value indicates transparency of the color.

In the Text-ST stream, although not illustrated, color_depth is described in a dialog style segment (DSS).

Here, the configuration of each device will be described.

(Configuration of Recording Device 1)

Figure 21:
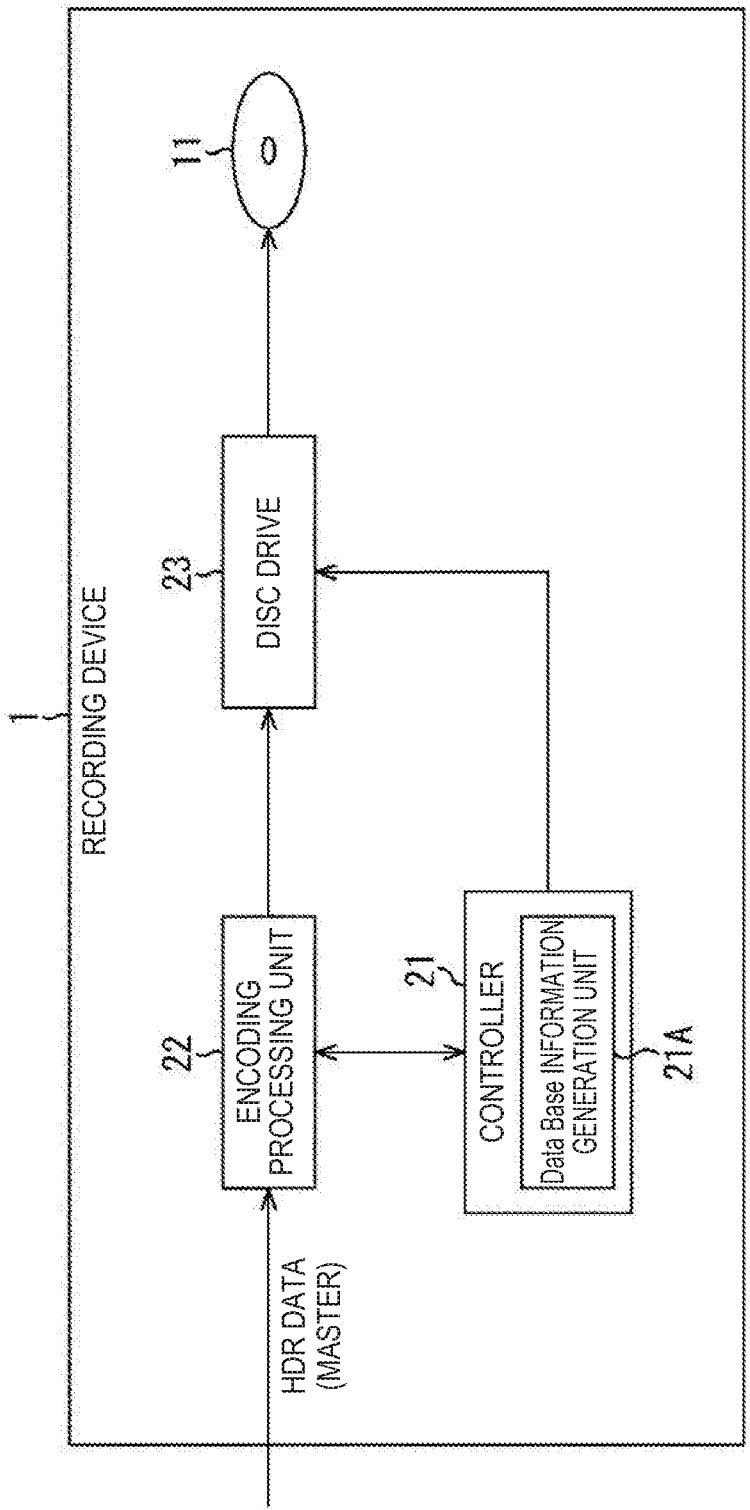
FIG. 21 is a block diagram illustrating a configuration example of a recording device of the first embodiment of the recording and reproduction system to which the present technology is applied.

FIG. 21 is a block diagram illustrating a configuration example of the recording device 1.

The recording device 1 is configured to include a controller 21, an encoding processing unit 22, and a disc drive 23. The master HDR data is input to the encoding processing unit 22.

The controller 21 is configured to include a central processing unit (CPU), a read-only memory (ROM), and a random access memory (RAM). The controller 21 executes a predetermined program to control an operation of the entire recording device 1.

In the controller 21, a Data Base information generation unit 21A is realized by executing a predetermined program. The Data Base information generation unit 21A describes the number of pieces of tone_mapping_info of a video stream supplied from the encoding processing unit 22 as number_of_tone_mapping_info_ref of the video stream of a main video of STN_table (FIG. 16) of PlayList and describes tone_map_id as tone_mapping_info_ref.

Further, the Data Base information generation unit 21A describes the number of pieces of tone_mapping_info of a graphics stream supplied from the encoding processing unit 22 as number_of_tone_mapping_info_ref of the graphics stream of PlayList and describes tone_map_id as tone_mapping_info_ref.

Further, the Data Base information generation unit 21A describes the number of pieces of tone_mapping_info inserted into the video stream supplied from the encoding processing unit 22 as number_of_tone_mapping_info_ref of [Video Block] (FIGS. 18A and 18B) of Clip Information and describes tone_map_id as tone_mapping_info_ref. The Data Base information generation unit 21A generates PlayList and Clip Information which are Data Base information by describing the various kinds of information, as described above, and outputs PlayList and Clip Information to the disc drive 23.

The encoding processing unit 22 encodes the master HDR data. The encoding processing unit 22 outputs the video stream and the graphics stream obtained by encoding the master HDR data to the disc drive 23. The encoding processing unit 22 supplies the controller 21 with tone_map_id and the number of pieces of tone_mapping_info of the video stream, tone_map_id and the number of pieces of tone_mapping_info of the graphics, and tone_map_id and the number of pieces of tone_mapping_info inserted into the video stream.

The disc drive 23 records a file that stores the Data Base information supplied from the controller 21 and video stream and the graphics stream supplied from the encoding processing unit 22 on the optical disc 11 according to the directory structure in FIG. 15.

(Configuration of Encoding Processing Unit 22)

Figure 22:
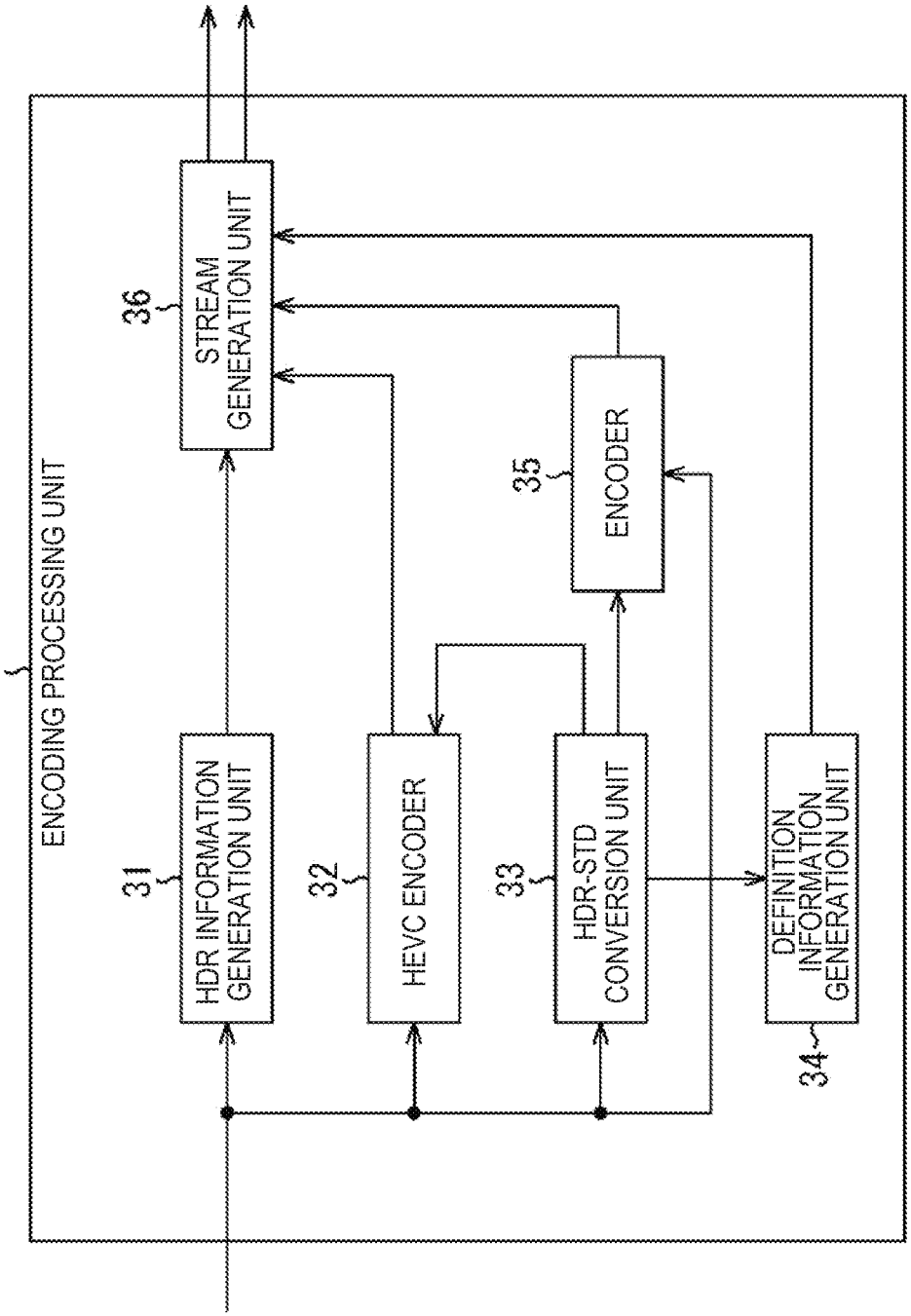
FIG. 22 is a block diagram illustrating a configuration example of an encoding processing unit in FIG. 21.

FIG. 22 is a block diagram illustrating a configuration example of the encoding processing unit in FIG. 21.

The encoding processing unit 22 is configured to include an HDR information generation unit 31, an HEVC encoder 32, an HDR-STD conversion unit 33, a definition information generation unit 34, an encoder 35, and a stream generation unit 36.

The HDR information generation unit 31 detects luminance of the input master HDR data and generates HDR information including each piece of information described with reference to FIG. 12. The HDR information generation unit 31 outputs the generated HDR information to the stream generation unit 36.

When the recording mode is mode-i, the HEVC encoder 32 encodes the input master HDR video in accordance with the HEVC scheme. When the recording mode is mode-ii, the HEVC encoder 32 encodes the STD video supplied from the HDR-STD conversion unit 33 in accordance with the HEVC scheme. The HEVC encoder 32 outputs the encoded data of the HDR video or the encoded data of the STD data to the stream generation unit 36.

The HDR-STD conversion unit 33 converts the input master HDR data into the STD data. The conversion performed by the HDR-STD conversion unit 33 is appropriately performed according to conversion parameters input by the author. The HDR-STD conversion unit 33 outputs, to the definition information generation unit 34, information indicating a correspondence relation between input data and output data in which RGB signals of the HDR data are set as the input data and RGB signals of the STD data are set as the output data.

(Signal Processing by HDR-STD Conversion Unit 33)

Figure 23:
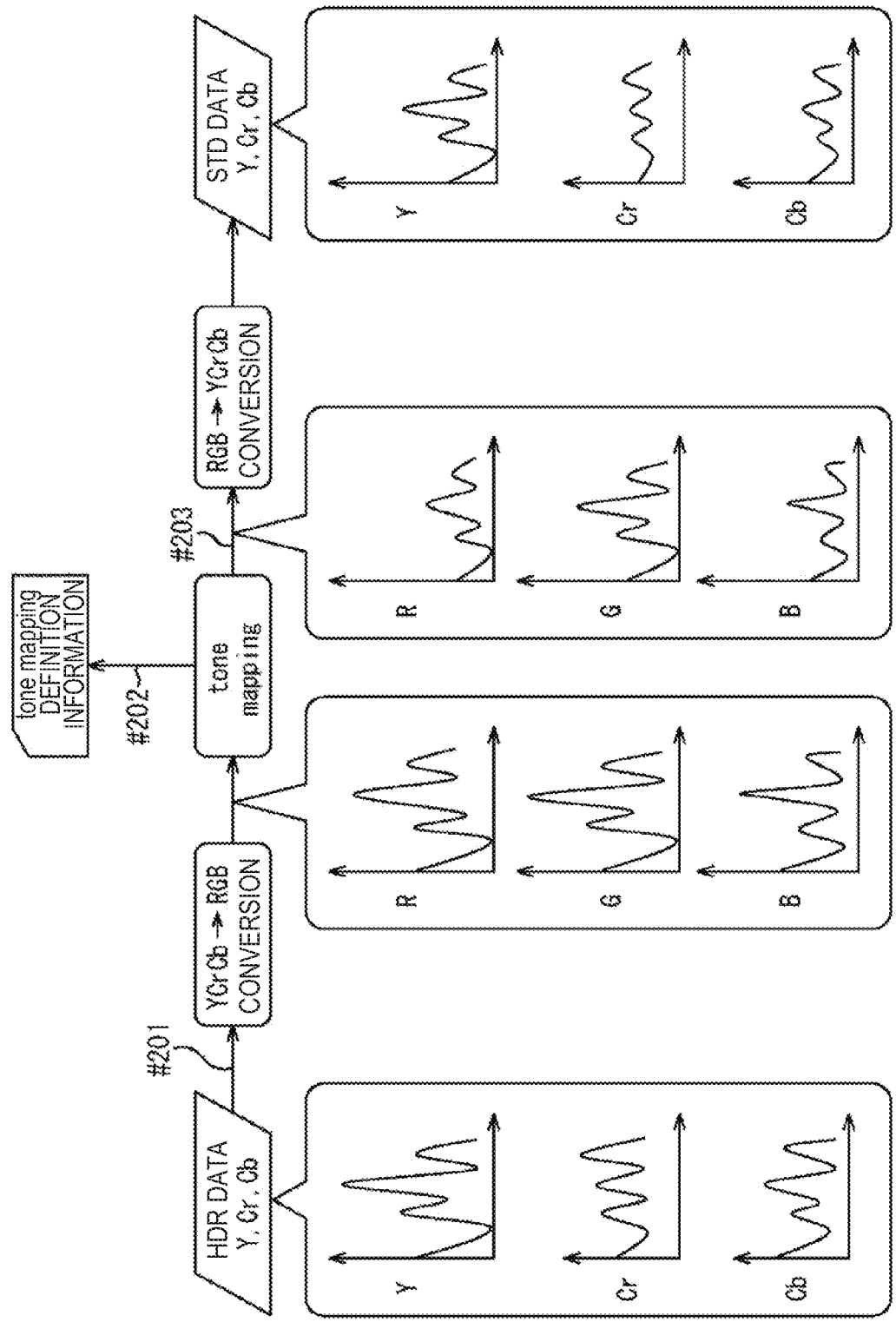
FIG. 23 is a block diagram illustrating an example of signal processing by an HDR-STD conversion unit.

FIG. 23 is a block diagram illustrating an example of signal processing by the HDR-STD conversion unit 33.

As indicated by the tip of arrow #201, the HDR-STD conversion unit 33 converts YCrCb signals of the input master HDR data into RGB signals and performs conversion (tone mapping) on each of the RGB signals to convert each of the RGB signals into each of the RGB signals of the STD data.

The HDR-STD conversion unit 33 outputs, to the definition information generation unit 34, information indicating a correspondence relation between the RGB signals of the HDR data, which is the input data, and the RGB signals of the STD data, which is the output data. The information output to the definition information generation unit 34 is used to generate the tone mapping definition information, as indicated by the tip of arrow #202.

The HDR-STD conversion unit 33 converts the RGB signals of the STD data into the YCrCb signals, as indicated by the tip of arrow #203, and outputs the YCrCb signals.

Figure 24:
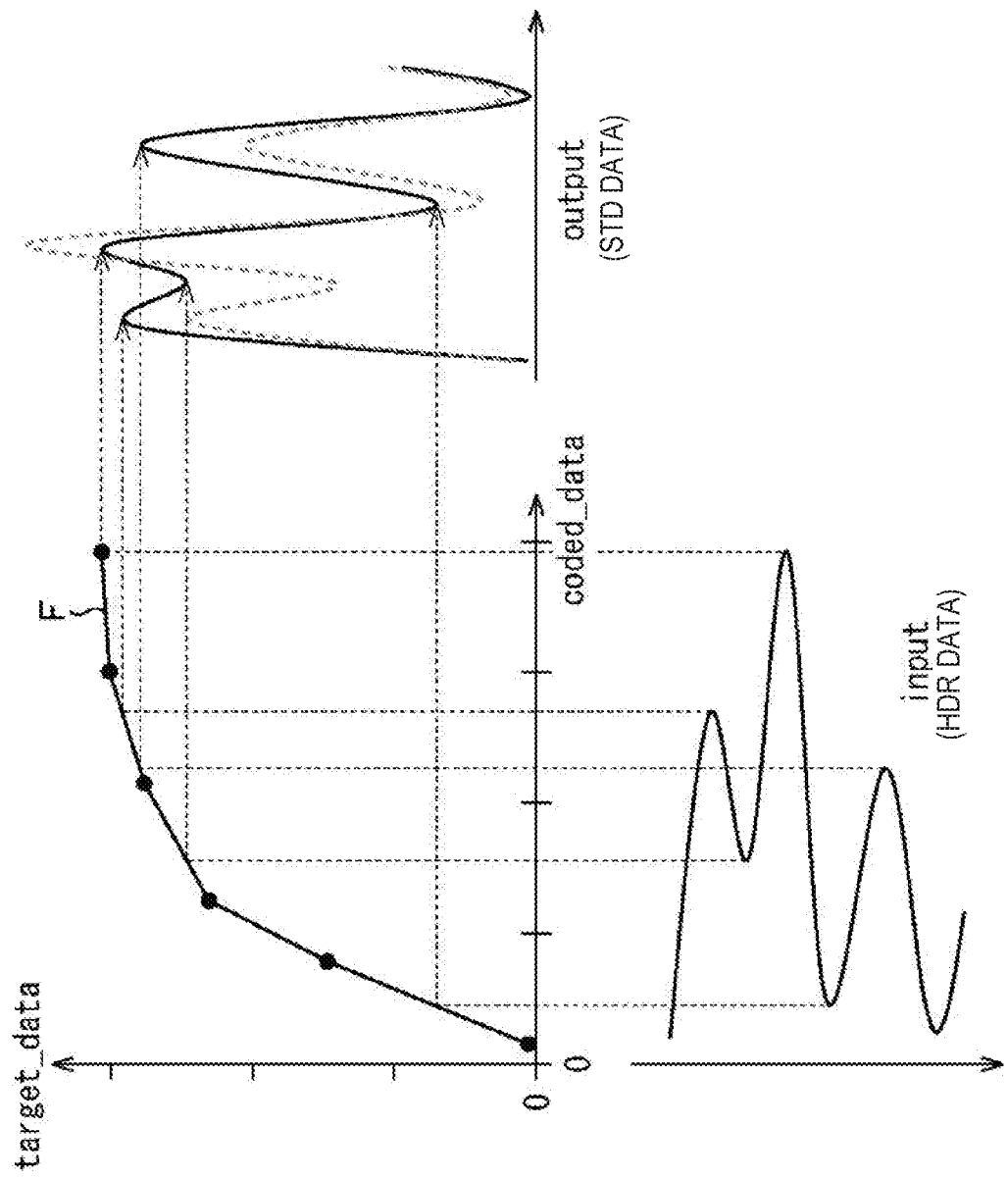
FIG. 24 is a diagram illustrating an example of tone mapping.

FIG. 24 is a diagram illustrating an example of tone mapping.

The RGB signals of the HDR data are converted into the RGB signals of the STD data, for example, as illustrated in FIG. 24, such that a high-luminance component is compressed and intermediate and low band luminance components are expanded. Information indicating a function F associating the RGB signals of the HDR data with the RGB signals of the STD data, as illustrated in FIG. 24, is generated by the definition information generation unit 34. The tone mapping definition information generated using the information indicating the function F illustrated in FIG. 24 is tone_mapping_info of tone_map_model_id=3 in which the relation between coded_data and target_data is indicated by the polygonal line function, as described with reference to FIG. 11.

Referring back to FIG. 22 for description, when the recording mode is mode-ii, the HDR-STD conversion unit 33 outputs the STD video obtained by converting the HDR video to the HEVC encoder 32 and supplies the STD graphics obtained by converting the HDR graphics to the encoder 35.

The definition information generation unit 34 generates the tone mapping definition information for HDR-STD conversion based on the information supplied from the HDR-STD conversion unit 33.

For example, when tone_map_model_id=0 is used, the definition information generation unit 34 generates tone_mapping_info including the values of min_value and max_value in FIG. 9 as the tone mapping definition information for HDR-STD conversion.

When tone_map_model_id=2 is used, the definition information generation unit 34 generates tone_mapping_info including start_of_coded_interval[i] in FIG. 10 as the tone mapping definition information for HDR-STD conversion.

Further, when tone_map_model_id=3 is used, the definition information generation unit 34 generates tone_mapping_info including the number of pieces of coded_pivot_value[i] and the number of pieces of target_pivot_value[i] designated by num_pivots in FIG. 11 as the tone mapping definition information for HDR-STD conversion.

When the recording mode is mode-i, the encoder 35 encodes the input master HDR graphics. When the recording mode is mode-ii, the encoder 35 encodes the STD graphics supplied from the HDR-STD conversion unit 33. The encoder 35 outputs the graphics stream of the HDR graphics or the STD graphics obtained as the encoding result to the stream generation unit 36.

The stream generation unit 36 supplies the controller 21 in FIG. 21 with the number of pieces of tone_mapping_info including the HDR information of the video stream supplied from the HDR information generation unit 31 and the number of pieces of tone_mapping_info which is the tone mapping definition information of the video stream supplied from the definition information generation unit 34. The stream generation unit 36 supplies the controller 21 with tone_map_id of tone_mapping_info.

The stream generation unit 36 supplies the controller 21 with the number of pieces of tone_mapping_info including the HDR information of the graphics stream supplied from the HDR information generation unit 31 and the number of pieces of tone_mapping_info which is the tone mapping definition information of the graphics stream supplied from the definition information generation unit 34. The stream generation unit 36 supplies the controller 21 with tone_map_id of tone_mapping_info.

The stream generation unit 36 supplies the controller 21 with tone_map_id and the number of pieces of tone_mapping_info of the video stream and the graphics stream as tone_map_id and the number of pieces of tone_mapping_info inserted into the video stream. The stream generation unit 36 inserts tone_mapping_info of the video stream and the graphics stream as the SEI into the encoded data to generate the video stream. The stream generation unit 36 outputs the generated video stream and the graphics stream supplied from the encoder 35 to the disc drive 23 in FIG. 21.

(Configuration of Reproduction Device 2)

Figure 25:
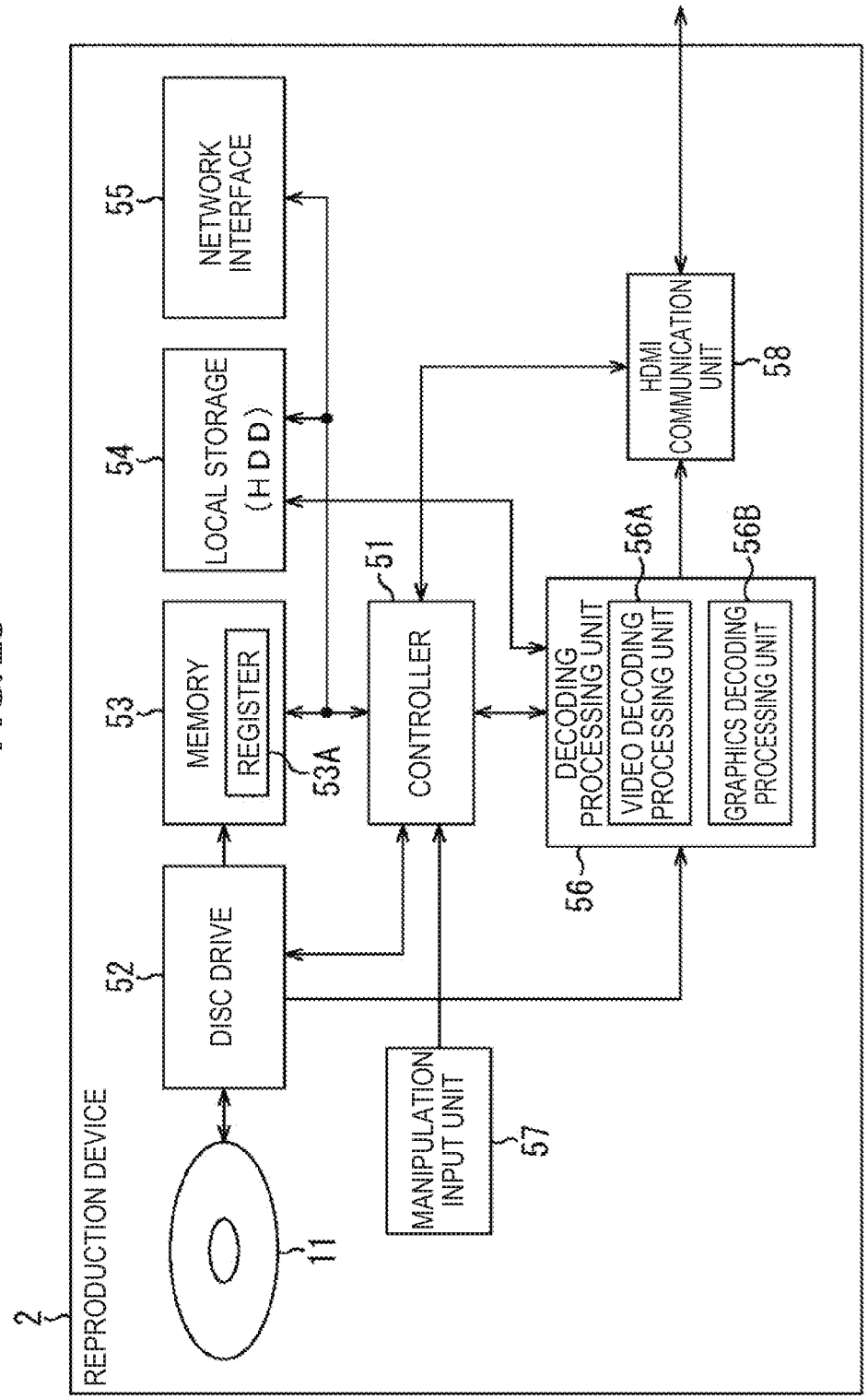
FIG. 25 is a block diagram illustrating a configuration example of a reproduction device of the first embodiment of the recording and reproduction system to which the present technology is applied.

FIG. 25 is a block diagram illustrating a configuration example of the reproduction device 2.

The reproduction device 2 is configured to include a controller 51, a disc drive 52, a memory 53, a local storage 54, a network interface 55, a decoding processing unit 56, a manipulation input unit 57, and an HDMI communication unit 58.

The controller 51 is configured to include a CPU, a ROM, and a RAM. The controller 51 executes a predetermined program to control an operation of the entire reproduction device 2. For example, the controller 51 supplies the decoding processing unit 56 with tone_mapping_info_ref of the video stream and the graphics stream described in PlayList supplied from the disc drive 52.

The disc drive 52 reads data from the optical disc 11 and outputs the read data to the controller 51, the memory 53, or the decoding processing unit 56. For example, the disc drive 52 outputs the Data Base information read from the optical disc 11 to the controller 51 and outputs the video stream and the graphics stream to the decoding processing unit 56.

The memory 53 stores data or the like necessary for the controller 51 to perform various processes. In the memory 53, a register 53A which is a player status register (PSR) is formed. The register 53A stores various kinds of information referred to at the time of reproduction of the optical disc 11 by the reproduction device 2 which is a BD player.

The local storage 54 is configured to include, for example, a hard disk drive (HDD). The local storage 54 records a stream or the like downloaded from a server. The network interface 55 communicates with the server via a network such as the Internet and supplies data downloaded from the server to the local storage 54.

The decoding processing unit 56 is configured to include a video decoding processing unit 56A and a graphics decoding processing unit 56B. The video decoding processing unit 56A extracts tone_mapping_info including the HDR information and tone_mapping_info which is the tone mapping definition information from the SEI of the video stream supplied from the disc drive 52 and supplies tone_mapping_info to the graphics decoding processing unit 56B.

The video decoding processing unit 56A decodes the encoded data included in the video stream in accordance with the HEVC scheme. The video decoding processing unit 56A selects tone_mapping_info_ref of the video stream based on tone_mapping_info_ref of the video stream supplied from the controller 51. The video decoding processing unit 56A converts the HDR video or the STD video obtained as the decoding result into the STD video or the HDR video with reference to the tone mapping definition information which is the selected tone_mapping_info and outputs the STD video or the HDR video to the HDMI communication unit 58, as necessary. When the video decoding processing unit 56A outputs the HDR video, the video decoding processing unit 56A outputs the HDR information included in the selected tone_mapping_info to the HDMI communication unit 58 along with the HDR video.

The graphics decoding processing unit 56B decodes the graphics stream. The graphics decoding processing unit 56B selects tone_mapping_info supplied from the video decoding processing unit 56A based on tone_mapping_info_ref of the graphics stream supplied from the controller 51. The graphics decoding processing unit 56B converts the HDR graphics or the STD graphics obtained as the decoding result into the STD graphics or the HDR graphics with reference to the tone mapping definition information which is the selected tone_mapping_info and outputs the STD graphics or the HDR graphics to the HDMI communication unit 58, as necessary. When the graphics decoding processing unit 56B outputs the HDR graphics, the graphics decoding processing unit 56B outputs the HDR information which is the selected tone_mapping_info to the HDMI communication unit 58 along with the HDR graphics.

The manipulation input unit 57 is configured to include an input device such as a button, a key, or a touch panel or a reception unit receiving a signal of infrared light or the like transmitted from a predetermined remote commander. The manipulation input unit 57 detects a manipulation of a user and supplies a signal indicating content of the detected manipulation to the controller 51.

The HDMI communication unit 58 communicates with the display device 3 via the HDMI cable 4. For example, the HDMI communication unit 58 acquires information regarding the performance of the monitor included in the display device 3 and outputs the information to the controller 51. The HDMI communication unit 58 outputs the HDR video or the STD video supplied from the video decoding processing unit 56A to the display device 3 and outputs the HDR graphics or the STD graphics supplied from the graphics decoding processing unit 56B to the display device 3. The HDMI communication unit 58 outputs the HDR information supplied from the video decoding processing unit 56A and the graphics decoding processing unit 56B to the display device 3.

(Configuration of Graphics Decoding Processing Unit)

Figure 26:
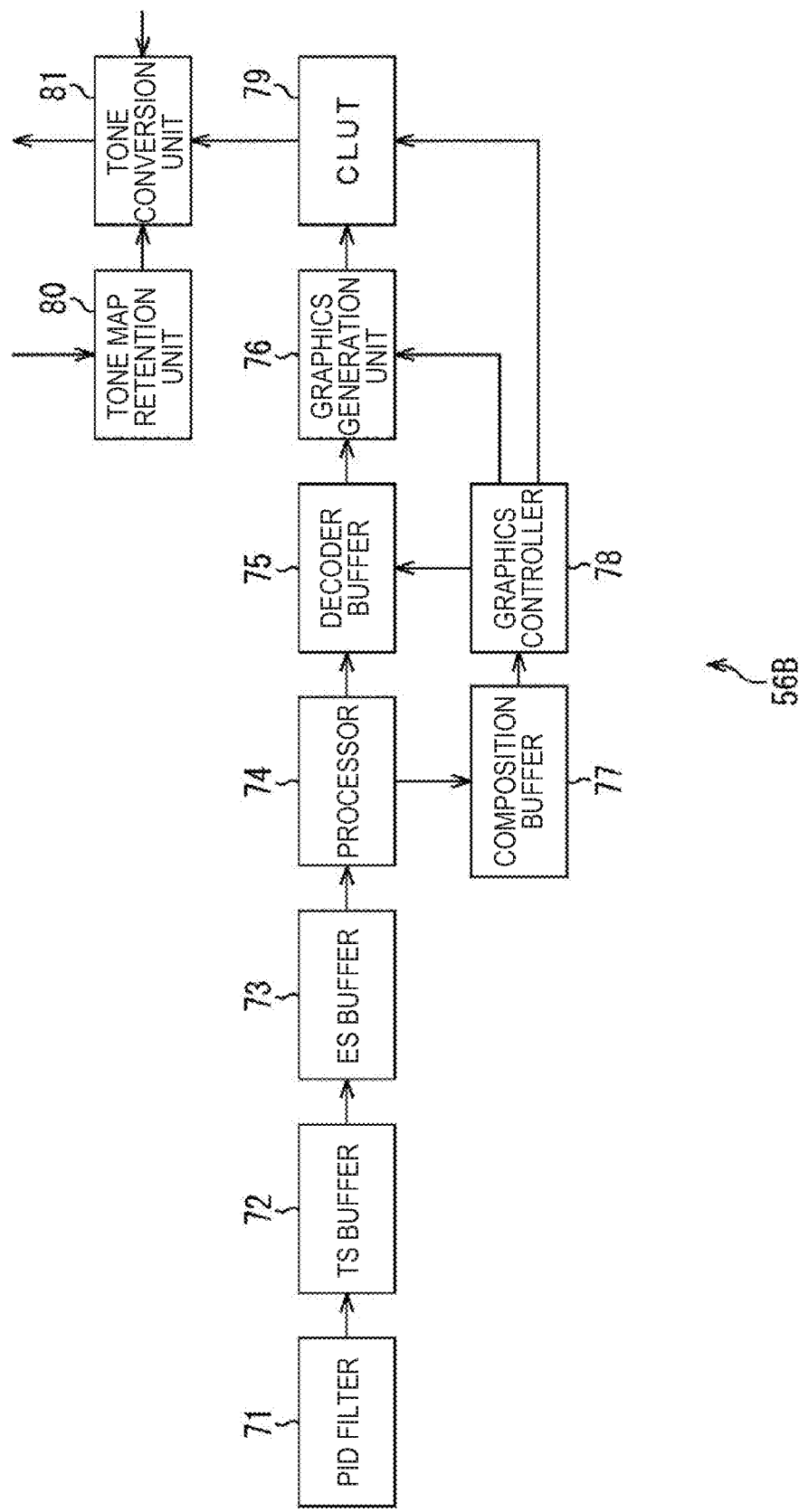
FIG. 26 is a block diagram illustrating a configuration example of a graphics decoding processing unit in FIG. 25.

FIG. 26 is a block diagram illustrating a configuration example of the graphics decoding processing unit 56B in FIG. 25.

The graphics decoding processing unit 56B is configured to include a PID filter 71, a TS buffer 72, an ES buffer 73, a processor 74, a decoder buffer 75, a graphics generation unit 76, a composition buffer 77, a graphics controller 78, a CLUT 79, a tone map retention unit 80, and a tone conversion unit 81.

The PID filter 71 extracts packets of the graphics stream based on a packet ID (PID) of each packet of the video stream and the graphics stream supplied from the disc drive 52. The PID is an ID unique to kinds of data that form the packets and is added to the packet.

The PID filter 71 supplies extracted transport stream (TS) packets of the graphics stream to the TS buffer 72 and allows the TS buffer 72 to retain the TS packets. The TS buffer 72 supplies an elementary stream (ES) formed by the retained TS packets to the ES buffer 73 and allows the ES buffer 73 to retain the ES.

The processor 74 reads the ES from the ES buffer 73 and supplies control data of the graphics included in the ES to the composition buffer 77. For example, when the ES is the PG stream, the processor 74 supplies the PCS, the WDS, and the XPDS included in the PG stream to the composition buffer 77. On the other hand, when the ES is the IG stream, the processor 74 supplies the ICS and the XPDS included in the IG stream to the composition buffer 77.

The processor 74 decodes actual data included in the ES, supplies the decoded data, and allows the decoder buffer 75 to retain the data. For example, when the ES is the PG stream or the IG stream, the processor 74 decodes the ODS and supplies the decoded ODS to the decoder buffer 75.

The graphics generation unit 76 generates and retains graphics in units of screens based on the ODS read and supplied from the decoder buffer 75 at a timing controlled by the graphics controller 78. The graphics generation unit 76 supplies the retained graphics in units of screens to the CLUT 79 at a timing controlled by the graphics controller 78.

The composition buffer 77 retains the control data supplied from the processor 74.

The graphics controller 78 reads the control data from the composition buffer 77. The graphics controller 78 controls a reading timing in the decoder buffer 75 and the graphics generation unit 76 based on the PCS or the WDS in the control data. The graphics controller 78 supplies the XPDS to the CLUT 79.

The CLUT 79 stores a table in which index colors and the values of Y, Cr, and Cb are associated with each other based on the XPDS supplied from the graphics controller 78. The CLUT 79 converts the index colors of the graphics supplied from the graphics generation unit 76 into the values of Y, Cr, and Cb based on the stored table and supplies these values to the tone conversion unit 81.

The tone map retention unit 80 retains tone_mapping_info supplied from the video decoding processing unit 56A.

The tone conversion unit 81 reads tone_mapping_info in which tone_mapping_info_ref is described as tone_map_id from the tone map retention unit 80 based on tone_mapping_info_ref of the graphics stream supplied from the controller 51.

For example, information indicating a recording mode specified by mode_flag included in Clip Information and information which is information regarding the performance of the monitor included in the display device 3 and is specified by the information acquired from the display device 3 are supplied from the controller 51 to the tone conversion unit 81.

When the HDR graphics are output to the display device 3, the tone conversion unit 81 outputs the HDR information included in the read tone_mapping_info to the HDMI communication unit 58. When the recording mode is mode-i and the STD graphics are output to the display device 3, the tone conversion unit 81 converts the HDR graphics which are the graphics supplied from the CLUT 79 into the STD graphics based on the tone mapping definition information for HDR-STD conversion which is the read tone_mapping_info. Then, the tone conversion unit 81 outputs the STD graphics to the HDMI communication unit 58.

On the other hand, when the recording mode is mode-ii and the HDR graphics are output to the display device 3, the tone conversion unit 81 converts the STD graphics which are the graphics supplied from the CLUT 79 into the HDR graphics based on the tone mapping definition information for STD-HDR conversion which is the read tone_mapping_info. Then, the tone conversion unit 81 outputs the HDR graphics to the HDMI communication unit 58.

When the recording mode is mode-i and the HDR graphics are output to the display device 3 or when the recording mode is mode-ii and the STD graphics are output to the display device 3, the tone conversion unit 81 outputs the graphics supplied from the CLUT 79 to the HDMI communication unit 58 without conversion.

(Configuration of Display Device 3)

Figure 27:
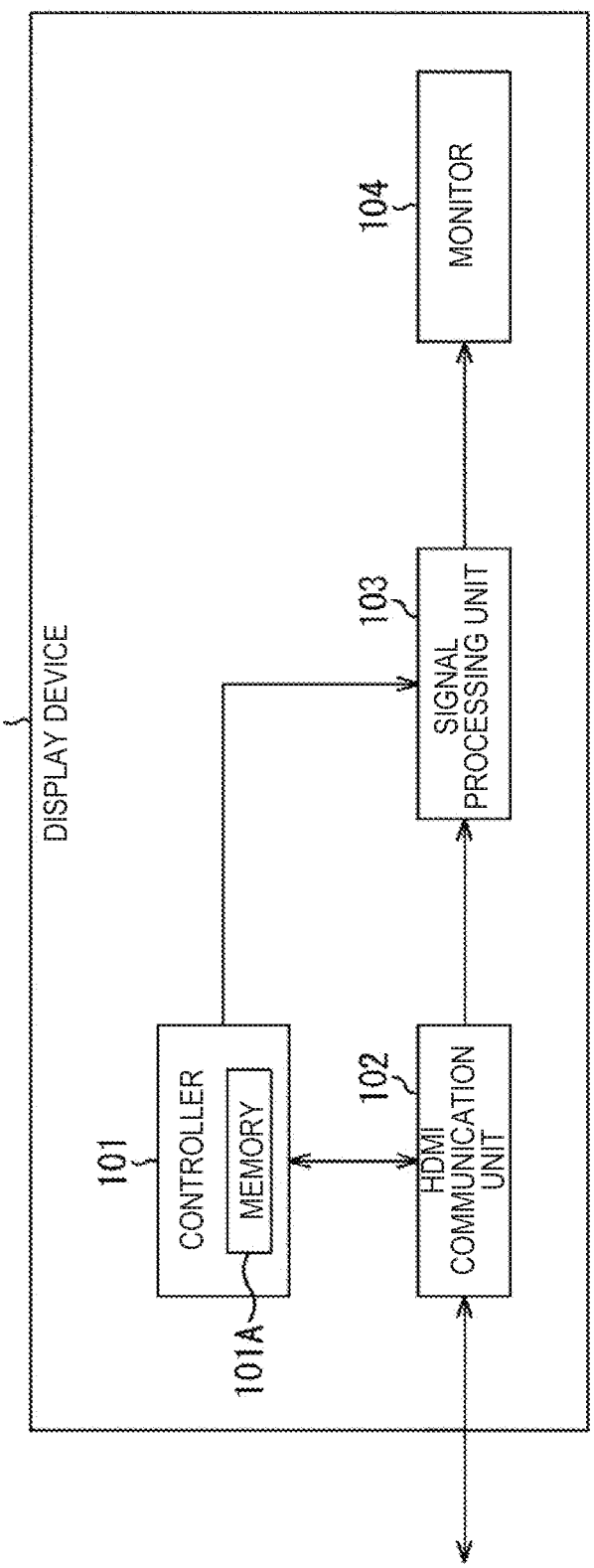
FIG. 27 is a block diagram illustrating a configuration example of a display device.

FIG. 27 is a block diagram illustrating a configuration example of the display device 3.

The display device 3 is configured to include a controller 101, an HDMI communication unit 102, a signal processing unit 103, and a monitor 104. The controller 101 includes a memory 101A.

The controller 101 is configured to include a CPU, a ROM, and a RAM. The controller 101 executes a predetermined program to control an operation of the entire display device 3.

For example, the controller 101 stores extended display identification data (EDID) indicating the performance of the monitor 104 in the memory 101A for management. At the time of authentication with the reproduction device 2, the controller 101 outputs the EDID stored in the memory 101A to the HDMI communication unit 102 and allows the HDMI communication unit 102 to transmit the EDID to the reproduction device 2. Based on the EDID, the performance of the monitor 104 of the display device 3 is specified by the reproduction device 2.

The HDMI communication unit 102 communicates with the reproduction device 2 via the HDMI cable 4. The HDMI communication unit 102 receives the HDR data or the STD data transmitted from the reproduction device 2 and outputs the HDR data or the STD data to the signal processing unit 103. The HDMI communication unit 102 transmits the EDID supplied from the controller 101 to the reproduction device 2.

The signal processing unit 103 performs a process on the HDR data or the STD data supplied from the HDMI communication unit 102 and allows the monitor 104 to display a video.

Here, an operation of each device having the above-described configuration will be described.

(Recording Process)

First, a recording process of the recording device 1 will be described with reference to the flowchart of FIG. 28. The recording process in FIG. 28 starts when the master HDR data is input to the recording device 1.

In step S1, the controller 21 of the recording device 1 determines whether the recording mode is mode-i. The recording mode is set by, for example, an author.

When it is determined in step S1 that the recording mode is mode-i, the encoding processing unit 22 performs the encoding process of mode-i in step S2. The video stream and the graphics stream generated through the encoding process of mode-i are supplied to the disc drive 23.

On the other hand, when it is determined in step S1 that the recording mode is mode-ii, the encoding processing unit 22 performs the encoding process of mode-ii in step S3. The video stream and the graphics stream generated through the encoding process of mode-ii are supplied to the disc drive 23.

In step S4, the Data Base information generation unit 21A performs a Data Base information generation process. The Data Base information generated through the Data Base information generation process is supplied to the disc drive 23.

In step S5, the disc drive 23 records a file in which the video stream, the graphics stream, and the Data Base information are stored on the optical disc 11. Thereafter, the process ends.

Next, the encoding process of mode-i performed in step S2 of FIG. 28 will be described with reference to the flowchart of FIG. 29.

In step S11, the HDR information generation unit 31 of the encoding processing unit 22 detects the luminance of the master HDR data and generates the HDR information.

In step S12, the HEVC encoder 32 encodes the master HDR video in accordance with the HEVC scheme to generate the encoded data of the HDR video.

In step S13, the encoder 35 encodes the master HDR graphics to generate the graphics stream of the HDR graphics. The encoder 35 supplies the graphics stream to the stream generation unit 36.

In step S14, the HDR-STD conversion unit 33 converts the input master HDR data into the STD data. The definition information generation unit 34 is supplied with the information indicating the correspondence relation between the input data and the output data in which the RGB signals of the HDR data are set as the input data and the RGB signals of the STD data are set as the output data.

In step S15, the definition information generation unit 34 generates the tone mapping definition information for HDR-STD conversion based on the information supplied from the HDR-STD conversion unit 33.

In step S16, the stream generation unit 36 inserts tone_mapping_info including the HDR information generated by the HDR information generation unit 31 and tone_mapping_info which is the tone mapping definition information generated by the definition information generation unit 34 as the SEI of the encoded data into the encoded data to generate the video stream.

The stream generation unit 36 supplies the controller 21 with the number of pieces of tone_mapping_info including the HDR information of the video stream and the number of pieces of tone_mapping_info which is the tone mapping definition information, and tone_map_id of tone_mapping_info. The stream generation unit 36 further supplies the controller 21 with the number of pieces of tone_mapping_info including the HDR information of the graphics stream and the number of pieces of tone_mapping_info which is the tone mapping definition information, and tone_map_id of tone_mapping_info. The stream generation unit 36 further supplies the controller 21 with tone_map_id and the number of pieces of tone_mapping_info of the video stream and the graphics stream as tone_map_id and the number of pieces of tone_mapping_info inserted into the video stream. Thereafter, the process returns to step S2 of FIG. 28 and the subsequent process is performed.

Next, the encoding process of mode-ii performed in step S3 of FIG. 28 will be described with reference to the flowchart of FIG. 30.

In step S21, the HDR information generation unit 31 of the encoding processing unit 22 detects the luminance of the master HDR data and generates the HDR information.

In step S22, the HDR-STD conversion unit 33 converts the input master HDR data into the STD data. The definition information generation unit 34 is supplied with the information indicating the correspondence relation between the input data and the output data in which the RGB signals of the HDR data are set as the input data and the RGB signals of the STD data are set as the output data.

In step S23, the definition information generation unit 34 generates the tone mapping definition information for STD-HDR conversion based on the information supplied from the HDR-STD conversion unit 33.

In step S24, the HEVC encoder 32 encodes the STD video obtained by converting the master HDR video in accordance with the HEVC scheme to generate the encoded data of the STD video.

In step S25, the encoder 35 encodes the STD graphics obtained by converting the master HDR graphics to generate the graphics stream of the STD graphics.

In step S26, the stream generation unit 36 inserts tone_mapping_info including the HDR information generated by the HDR information generation unit 31 and tone_mapping_info which is the tone mapping definition information generated by the definition information generation unit 34 as the SEI of the encoded data to generate the video stream. Thereafter, the process returns to step S3 of FIG. 28 and the subsequent process is performed.

Next, the Data Base information generation process performed in step S4 of FIG. 28 will be described with reference to the flowchart of FIG. 31.

In step S31, the Data Base information generation unit 21A of the controller generates PlayList including number_of_tone_mapping_info_ref and tone_mapping_info_ref of the video stream and the graphics stream described with reference to FIG. 16. Specifically, the Data Base information generation unit 21A describes the number of pieces of tone_mapping_info of the video stream and the graphics stream supplied from the encoding processing unit 22 as number_of_tone_mapping_info_ref in PlayList. The Data Base information generation unit 21A describes tone_map_id of the video stream and the graphics stream supplied from the encoding processing unit 22 as tone_mapping_info_ref in PlayList.

In step S32, the Data Base information generation unit 21A generates Clip Information in which number_of_tone_mapping_info_ref and tone_mapping_info_ref are included in [Video Block] described with reference to FIGS. 17, 18A, and 18B.

Specifically, the Data Base information generation unit 21A describes the number of pieces of tone_mapping_info inserted into the video stream supplied from the encoding processing unit 22 as number_of_tone_mapping_info_ref in [Video Block] of Clip Information. The Data Base information generation unit 21A describes tone_map_id of tone_mapping_info inserted into the video stream supplied from the encoding processing unit 22 as tone_mapping_info_ref in [Video Block] of Clip Information. Clip Information also includes HDR_flag and mode_flag. In this example, since the master data is the HDR data, 1 which is a value indicating HDR data is set as the value of HDR_flag.

Figure 28:
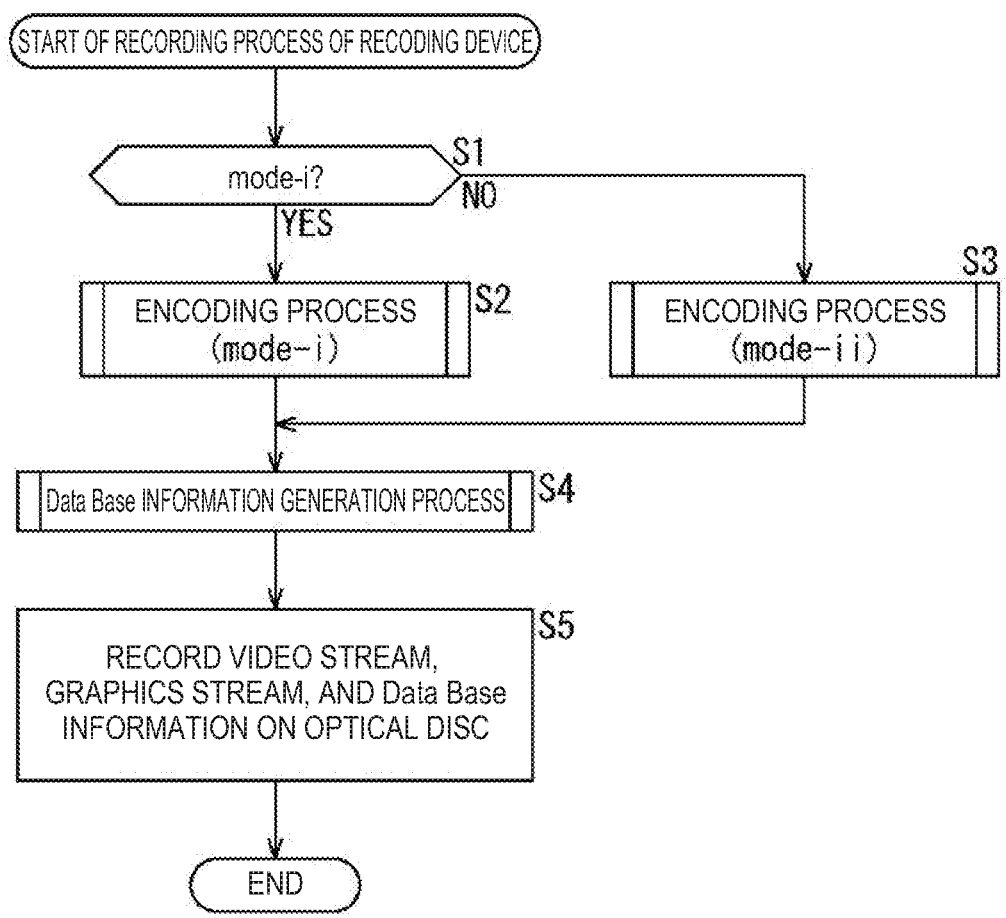
FIG. 28 is a flowchart for describing a recording process of the recording device in FIG. 21.

When the encoding process of mode-i is performed in step S2 of FIG. 28, the Data Base information generation unit 21A sets 1 which is the value indicating that the recording mode is mode-i as a value of mode_flag. On the other hand, when the encoding process of mode-ii is performed in step S3 of FIG. 28, the Data Base information generation unit 21A sets 0 which is a value indicating that the recording mode is mode-ii as the value of mode_flag. Thereafter, the process returns to step S4 of FIG. 28 and the subsequent process is performed.

The recording device 1 records the video stream, the graphics stream, and the Data Base information generated through the foregoing processes on the optical disc 11.

(Reproduction Process)

Next, a reproduction process of the reproduction device 2 will be described with reference to the flowchart of FIG. 32.

At a predetermined timing such as a timing before reproduction start of the optical disc 11, the controller 51 of the reproduction device 2 communicates with the display device 3 by controlling the HDMI communication unit 58 and reads the EDID from the memory 101A of the display device 3. The controller 51 allows the register 53A to store the information indicating the performance of the monitor included in the display device 3 for management.

In step S41, the controller 51 reads PlayList which is the Data Base information and Clip Information from the optical disc 11 by controlling the disc drive 52. The controller 51 specifies the video stream and the graphics stream to be reproduced based on the information included in PlayList and reads the specified video stream and graphics stream from the optical disc 11 by controlling the disc drive 52.

In step S42, the controller 51 refers to HDR_flag and mode_flag included in Clip Information. In this example, a value indicating recording in which the master is the HDR data is set in HDR_flag. Thus, the recording device 1 is in a state in which the recording device 1 reproduces the HDR data or the STD data obtained by converting the HDR data.

In step S43, the controller 51 determines whether the recording mode is mode-i based on the value of mode_flag.

When it is determined in step S43 that the recording mode is mode-i, the decoding processing unit 56 performs the decoding process of mode-i in step S44.

On the other hand, when it is determined in step S43 that the recording mode is mode-ii, the decoding processing unit 56 performs the decoding process of mode-ii in step S45.

After the decoding process is performed in step S44 or step S45, the process ends.

Next, the decoding process of mode-i performed in step S44 of FIG. 32 will be described with reference to the flowchart of FIG. 33.

In step S61, the video decoding processing unit 56A extracts tone_mapping_info from the SEI of the video stream and supplies tone_mapping_info to the graphics decoding processing unit 56B. The tone map retention unit 80 of the graphics decoding processing unit 56B retains tone_mapping_info supplied from the video decoding processing unit 56A.

In step S62, the video decoding processing unit 56A decodes the encoded data included in the video stream in accordance with the HEVC scheme to generate the HDR video.

In step S63, the graphics decoding processing unit 56B decodes the graphics stream. Specifically, in the graphics decoding processing unit 56B, the PID filter 71 extracts the graphics stream. Then, the graphics decoding processing unit 56B generates the values of Y, Cr, and Cb of the HDR graphics via the TS buffer 72, the ES buffer 73, the processor 74, the decoder buffer 75, the graphics generation unit 76, the composition buffer 77, the graphics controller 78, and the CLUT 79 from the graphics stream. The values of Y, Cr, and Cb of the HDR graphics are supplied to the tone conversion unit 81.

In step S64, the controller 51 determines whether the monitor included in the display device 3 is the HDR monitor based on the information stored in the register 53A. As described above, the register 53A stores the information regarding the performance of the monitor included in the display device 3 based on the EDID of the HDMI read from the display device 3.

When it is determined in step S64 that the monitor included in the display device 3 is the HDR monitor, the process proceeds to step S65.

In step S65, the video decoding processing unit 56A selects tone_mapping_info which includes tone_mapping_info_ref of the video stream described in PlayList supplied from the controller 51 as tone_map_id and includes the HDR information from the extracted tone_mapping_info. The tone conversion unit 81 of the graphics decoding processing unit 56B selects tone_mapping_info which includes tone_mapping_info_ref of the graphics stream described in PlayList as tone_map_id and includes the HDR information from tone_mapping_info, and reads tone_mapping_info retained in the tone map retention unit 80.

In step S66, the video decoding processing unit 56A outputs the HDR video along with the HDR information of the selected video stream. The tone conversion unit 81 of the graphics decoding processing unit 56B outputs the HDR graphics along with the HDR information of the selected graphics stream.

Conversely, when it is determined in step S64 that the monitor included in the display device 3 is not the HDR monitor but the STD monitor, the process proceeds to step S67.

In step S67, the video decoding processing unit 56A selects tone_mapping_info which is the tone mapping definition information including tone_mapping_info_ref of the video stream described in PlayList supplied from the controller 51 as tone_map_id from the extracted tone_mapping_info. The tone conversion unit 81 of the graphics decoding processing unit 56B selects and reads tone_mapping_info which is the tone mapping definition information including tone_mapping_info_ref of the graphics stream described in PlayList as tone_map_id from tone_mapping_info retained in the tone map retention unit 80.

In step S68, the video decoding processing unit 56A converts the HDR video obtained as the decoding result into the STD video based on the tone mapping definition information for HDR-STD conversion of the selected video stream. The tone conversion unit 81 of the graphics decoding processing unit 56B converts the HDR graphics obtained as the decoding result into the STD graphics based on the tone mapping definition information for HDR-STD conversion of the selected graphics stream.

In step S69, the video decoding processing unit 56A outputs the STD video obtained through the conversion. The tone conversion unit 81 of the graphics decoding processing unit 56B outputs the STD graphics obtained through the conversion. After the HDR data is output in step S66 or the STD data is output in step S69, the controller 51 determines in step S70 whether the reproduction ends.

When the controller 51 determines in step S70 that the reproduction does not end, the process returns to step S61 and the controller 51 repeatedly performs the foregoing processes. When the controller 51 determines in step S70 that the reproduction ends, the process returns to step S44 of FIG. 32 and the subsequent process is performed.

Next, the decoding process of mode-ii performed in step S45 of FIG. 32 will be described with reference to the flowchart of FIG. 34.

In step S81, the video decoding processing unit 56A extracts tone_mapping_info from the SEI of the video stream and supplies tone_mapping_info to the graphics decoding processing unit 56B. The tone map retention unit 80 of the graphics decoding processing unit 56B retains tone_mapping_info supplied from the video decoding processing unit 56A.

In step S82, the video decoding processing unit 56A decodes the encoded data included in the video stream in accordance with the HEVC scheme to generate the STD video.

In step S83, the graphics decoding processing unit 56B decodes the graphics stream. The values of Y, Cr, and Cb of the STD graphics obtained as the decoding result are supplied to the tone conversion unit 81.

In step S84, the controller 51 determines whether the monitor included in the display device 3 is the HDR monitor based on the information stored in the register 53A.

When it is determined in step S84 that the monitor included in the display device 3 is the HDR monitor, the process proceeds to step S85.

In step S85, the video decoding processing unit 56A selects tone_mapping_info which includes tone_mapping_info_ref of the video stream described in PlayList supplied from the controller 51 as tone_map_id and includes the HDR information and tone_mapping_info which is the tone mapping definition information from the extracted tone_mapping_info. The tone conversion unit 81 selects and reads tone_mapping_info which includes tone_mapping_info_ref of the graphics stream described in PlayList as tone_map_id and includes the HDR information and tone_mapping_info which is the tone mapping definition information from the extracted tone_mapping_info retained in the tone map retention unit 80.

In step S86, the video decoding processing unit 56A converts the STD video obtained as the decoding result into the HDR video based on the tone mapping definition information for STD-HDR conversion of the selected video stream. The tone conversion unit 81 converts the STD graphics obtained as the decoding result into the HDR graphics based on the tone mapping definition information for STD-HDR conversion of the selected graphics stream.

In step S87, the video decoding processing unit 56A outputs the HDR video obtained through the conversion along with the HDR information of the selected video stream. The tone conversion unit 81 outputs the HDR graphics obtained through the conversion along with the HDR information of the selected graphics stream.

On the other hand, when it is determined in step S84 that the monitor included in the display device 3 is the STD monitor, the process proceeds to step S88. In step S88, the video decoding processing unit 56A outputs the STD video obtained as the decoding result and the tone conversion unit 81 outputs the STD graphics obtained through the decoding result.

After the HDR data is output in step S87 or the STD data is output in step S88, the controller 51 determines in step S89 whether the reproduction ends.

When the controller 51 determines in step S89 that the reproduction does not end, the process returns to step S81 and the controller 51 repeatedly performs the foregoing processes. When the controller 51 determines in step S89 that the reproduction ends, the process returns to step S45 of FIG. 32 and the subsequent process is performed.

(Display Process)

Figure 35:
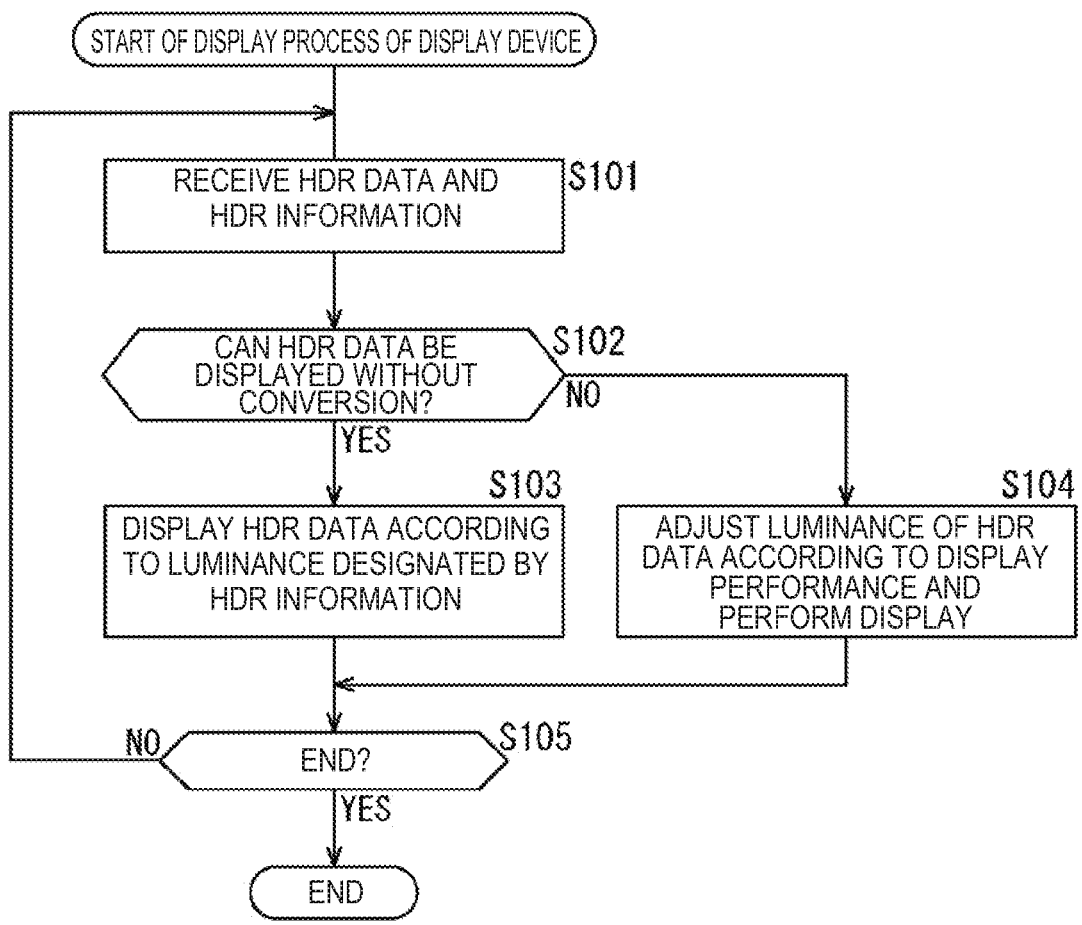
FIG. 35 is a flowchart for describing a display process of the display device in FIG. 27.

Next, a display process of the display device 3 will be described with reference to the flowchart of FIG. 35.

Here, a case in which the monitor 104 included in the display device 3 is the HDR monitor will be described. The HDR data to which the HDR information is added is transmitted from the reproduction device 2 to the display device 3 including the HDR monitor.

In step S101, the HDMI communication unit 102 of the display device 3 receives the HDR data and the HDR information transmitted from the reproduction device 2.

In step S102, referring to the HDR information, the controller 101 determines whether the HDR data transmitted from the reproduction device 2 can be displayed without conversion. The HDR information includes the information indicating the luminance characteristics of the master HDR data, that is, the HDR data transmitted from the reproduction device 2. The determination of step S102 is performed by comparing the luminance characteristics of the HDR data specified by the HDR information to the display performance of the monitor 104.

For example, when the dynamic range of the HDR data specified by the HDR information is a range of 0% to 400% and the dynamic range of the monitor 104 is a range of 0% to 500% (for example, 500 cd/m2 when the brightness of 100% is assumed to be 100 cd/m2), it is determined that the HDR data can be displayed without conversion. On the other hand, when the dynamic range of the HDR data specified by the HDR information is a range of 0% to 400% and the dynamic range of the monitor 104 is a range of 0% to 300%, it is determined that the HDR data cannot be displayed without conversion.

When it is determined in step S102 that the HDR data can be displayed without conversion, the signal processing unit 103 allows the monitor 104 to display the video of the HDR data according to the luminance designated by the HDR information in step S103. For example, when the luminance characteristics indicated by the curved line L12 in FIG. 12 are designated by the HDR information, each luminance value indicates the brightness in the range of 0% to 400% indicated by the curved line L12.

Conversely, when it is determined in step S102 that the HDR data cannot be displayed without conversion, the signal processing unit 103 adjusts the luminance according to the display performance of the monitor 104 and displays the video of the HDR data having the adjusted luminance in step S104. For example, when the luminance characteristics indicated by the curved line L12 in FIG. 12 are designated by the HDR information and the dynamic range of the monitor 104 is in the range of 0% to 300%, each luminance value is compressed so that the brightness of the range of 0% to 300% is indicated.

After the video of the HDR data is displayed in step S103 or step S104, the controller 101 determines in step S105 whether the display ends. When it is determined that the display does not end, the processes subsequent to step S101 are repeated. When it is determined in step S105 that the display ends, the controller 101 ends the process.

Through the foregoing series of processes, the recording device 1 can record the master HDR data as the HDR data on the optical disc 11, can allow the reproduction device 2 to reproduce the HDR data, and can allow the display device 3 to display the video of the HDR data.

The recording device 1 can convert the master HDR data into the STD data, record the STD data on the optical disc 11, allow the reproduction device 2 to restore the STD data to the HDR data, and allow the display device 3 to display the video of the HDR data.

The luminance characteristics of the master HDR data can be set to be designated by the HDR information when the HDR data is reproduced. Thus, a content author can display the video of the HDR data with the intended luminance.

The recording device 1 describes tone_map_id for identifying tone_mapping_info of the graphics stream as tone_mapping_info_ref in PlayList. Accordingly, the reproduction device 2 can specify tone_mapping_info of the graphics stream among tone_mapping_info inserted into the video stream based on tone_map_id.

Second Embodiment (Configuration Example of AV Stream)

Figure 36:
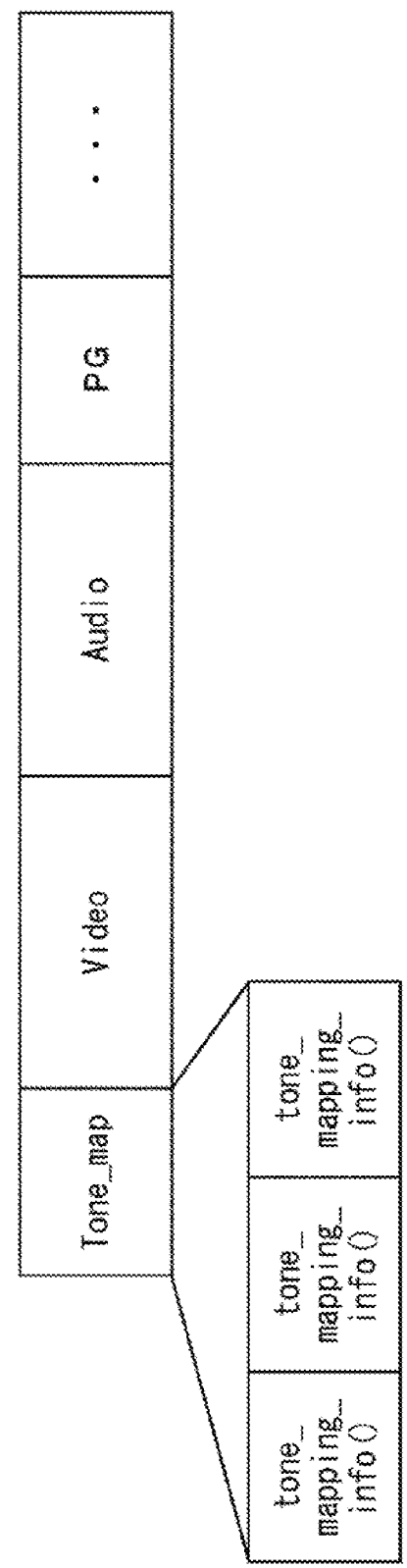
FIG. 36 is a diagram illustrating a configuration example of an AV stream in a second embodiment of the recording and reproduction system to which the present technology is applied.

FIG. 36 is a diagram illustrating a configuration example of an AV stream in a second embodiment of the recording and reproduction system to which the present technology is applied.

In the second embodiment, as illustrated in FIG. 36, tone_mapping_info is not included in a video stream, but included in an AV stream which is a new stream. That is, not only a video stream of a main video, an audio stream reproduced in synchronization with the video stream of the main video, a video stream of a sub-video, a PG stream, a Text-ST stream, and an IG stream but also a stream of tone_mapping_info are multiplexed to the AV stream according to the second embodiment.

At least one piece of tone_mapping_info is included in the Tone_map stream which is the stream of the tone_mapping_info. Here, tone_mapping_info included in the Tone_map stream is used when a video stream or a graphics stream multiplexed to the Tone_map stream is reproduced.

The configurations of the PG stream, the Text-ST stream, and the IG stream according to the second embodiment are the same as the configurations of the PG stream, the Text-ST stream, and the IG stream according to the first embodiment.

(Syntax of Tone_map Stream)

FIG. 37 is a diagram illustrating the syntax of the Tone_map stream.

As illustrated in the 4th line of FIG. 37, number_of_tone_mapping_info indicating the number of pieces of tone_mapping_info included in the Tone_map stream is described in the Tone_map stream. As illustrated in the 6th to 9th lines, at least one piece of tone_mapping_info is described in the Tone_map stream. The syntax of tone_mapping_info is the same as that illustrated in FIG. 7.

(Syntax of Clip Information File)

FIGS. 38A and 38B are diagrams illustrating the syntax of StreamCodingInfo of a Clip Information file in the second embodiment.

As illustrated in FIG. 38A, [ToneMap Block] in the 7th line is described in StreamCodingInfo according to the second embodiment in addition to [Video Block], [Audio Block], and [Graphics Block] described in FIG. 17. That is, since the Tone_map stream is included in the AV stream in the second embodiment, [ToneMap Block] indicating information regarding encoding of the Tone_map stream is described.

As illustrated in the 6th line of FIG. 38B, number_of_tone_mapping_info_ref indicating the number of pieces of tone_mapping_info included in the Tone_map stream is described in [ToneMap Block]. As illustrated in the 7th to 10th lines, tone_mapping_info_ref indicating tone_map_id of tone_mapping_info included in the Tone_map stream is also described in [ToneMap Block].

In this way, by describing the number of pieces of tone_mapping_info included in the Tone_map stream in the Clip Information file, the reproduction device 2 can recognize whether there is Tone_map stream before reproduction of the video stream or the graphics stream.

The syntax of STN_table of a PlayList file according to the second embodiment is the same as the syntax of STN_table in FIG. 16.

(Configuration of Encoding Processing Unit 22)

FIG. 39 is a diagram illustrating a configuration example of the encoding processing unit 22 of the recording device 1 in the second embodiment of the recording and reproduction system to which the present technology is applied.

In the configuration illustrated in FIG. 39, the same reference numerals are given to the same configurations as the configurations in FIG. 22. The redundant description will be appropriately omitted.

The configuration of the encoding processing unit 22 in FIG. 39 is different from the configuration in FIG. 22 in that a stream generation unit 121 is provided instead of the stream generation unit 36.

The stream generation unit 121 supplies the controller 21 with the number of pieces of tone_mapping_info including the HDR information of the video stream supplied from the HDR information generation unit 31 and the number of pieces of tone_mapping_info which is the tone mapping definition information of the video stream supplied from the definition information generation unit 34. The stream generation unit 121 supplies the controller 21 with tone_map_id of tone_mapping_info.

The number of pieces of tone_mapping_info of the video stream is described as number_of_tone_mapping_info_ref of the video stream of the main video of STN_table (FIG. 16) of the PlayList file by the Data Base information generation unit 21A. Further, tone_map_id of the video stream is described as tone_mapping_info_ref of the video stream of STN_table by the Data Base information generation unit 21A.

The stream generation unit 121 supplies the controller 21 with the number of pieces of tone_mapping_info including the HDR information of the graphics stream supplied from the HDR information generation unit 31 and the number of pieces of tone_mapping_info which is the tone mapping definition information of the graphics stream supplied from the definition information generation unit 34. The stream generation unit 121 supplies the controller 21 with tone_map_id of tone_mapping_info.

The number of pieces of tone_mapping_info of the graphics stream is described as number_of_tone_mapping_info_ref of the graphics stream of STN_table of the PlayList file by the Data Base information generation unit 21A. Further, tone_map_id of the graphics stream is described as tone_mapping_info_ref of the graphics stream of STN_table by the Data Base information generation unit 21A.

The stream generation unit 121 supplies the controller 21 with tone_map_id and the number of pieces of tone_mapping_info of the video stream and the graphics stream as tone_map_id and the number of pieces of tone_mapping_info inserted into the Tone_map stream. The number of pieces of tone_mapping_info inserted into the video stream is described as number_of_tone_mapping_info_ref of [ToneMap Block] (FIGS. 38A and 38B) of the Clip Information file by the Data Base information generation unit 21A. Further, tone_map_id of tone_mapping_info inserted into the video stream is described as tone_mapping_info_ref of [ToneMap Block] by the Data Base information generation unit 21A.

The stream generation unit 121 generates the Tone_map stream including tone_mapping_info of the video stream and the graphics stream and generates the video stream including the encoded data supplied from the HEVC encoder 32. The stream generation unit 121 outputs the generated Tone_map stream and video stream and the graphics stream supplied from the encoder 35 to the disc drive 23.

Thus, a stream file in which the Tone_map stream, the video stream, and the graphics stream are stored is recorded on the optical disc 11 according to the directory structure in FIG. 15.

(Configuration of Reproduction Device 2)

Figure 40:
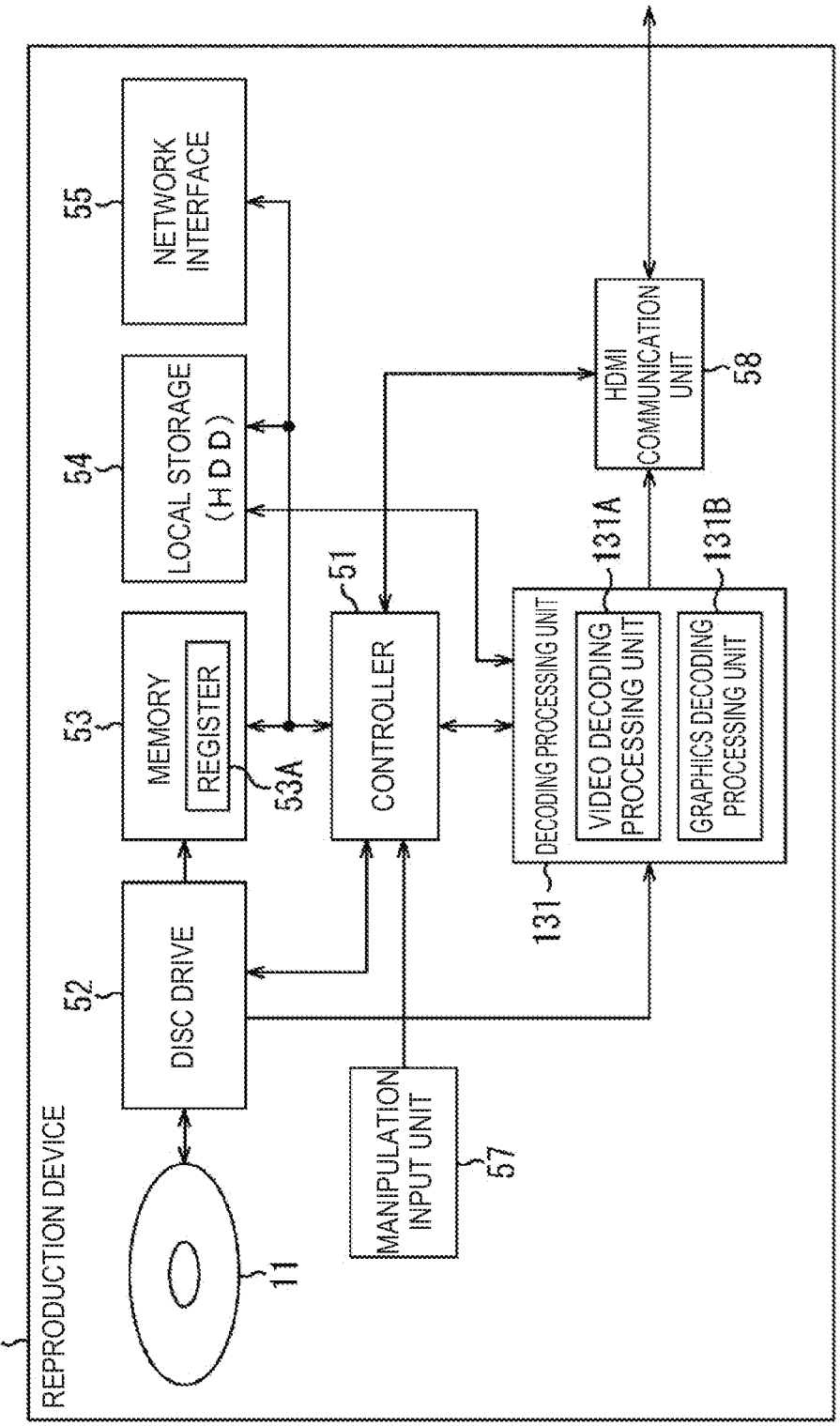
FIG. 40 is a diagram illustrating a configuration example of a reproduction device of the second embodiment of the recording and reproduction system to which the present technology is applied.

FIG. 40 is a diagram illustrating a configuration example of the reproduction device 2 of the second embodiment of the recording and reproduction system to which the present technology is applied.

In the configuration illustrated in FIG. 40, the same reference numerals are given to the same configurations as the configurations in FIG. 25. The redundant description will be appropriately omitted.

The configuration of the reproduction device 2 in FIG. 40 is different from the configuration in FIG. 25 in that a decoding processing unit 131 is provided instead of the decoding processing unit 56.

The decoding processing unit 131 is configured to include a video decoding processing unit 131A and a graphics decoding processing unit 131B. The video decoding processing unit 131A extracts a video stream in the AV streams read and supplied by the disc drive 52 and decodes the encoded data included in the video stream in accordance with the HEVC scheme.

The video decoding processing unit 131A extracts the Tone_map stream in the streams read and supplied by the disc drive 52. The video decoding processing unit 131A extracts tone_mapping_info of the video stream from the Tone_map stream based on tone_mapping_info_ref of the video stream supplied from the controller 51.

The video decoding processing unit 131A converts the HDR video or the STD video obtained as the decoding result into the STD video or the HDR video with reference to the tone mapping definition information which is the extracted tone_mapping_info and outputs the STD video or the HDR video to the HDMI communication unit 58, as necessary. When the video decoding processing unit 131A outputs the HDR video, the video decoding processing unit 131A outputs the HDR information included in the extracted tone_mapping_info to the HDMI communication unit 58 along with the HDR video.

The graphics decoding processing unit 131B extracts the graphics stream in the AV streams read and supplied by the disc drive 52 and decodes the graphics stream. The graphics decoding processing unit 131B extracts the Tone_map stream in the streams read and supplied by the disc drive 52.

The graphics decoding processing unit 131B extracts tone_mapping_info of the graphics stream from the Tone_map stream based on tone_mapping_info_ref of the graphics stream supplied from the controller 51. The graphics decoding processing unit 131B converts the HDR graphics or the STD graphics obtained as the decoding result into the STD graphics or the HDR graphics with reference to the tone mapping definition information which is the extracted tone_mapping_info and outputs the STD graphics or the HDR graphics to the HDMI communication unit 58, as necessary. When the graphics decoding processing unit 131B outputs the HDR graphics, the graphics decoding processing unit 131B outputs the HDR information included in the extracted tone_mapping_info to the HDMI communication unit 58 along with the HDR graphics.

(Configuration of Graphics Decoding Processing Unit 131B)

Figure 41:
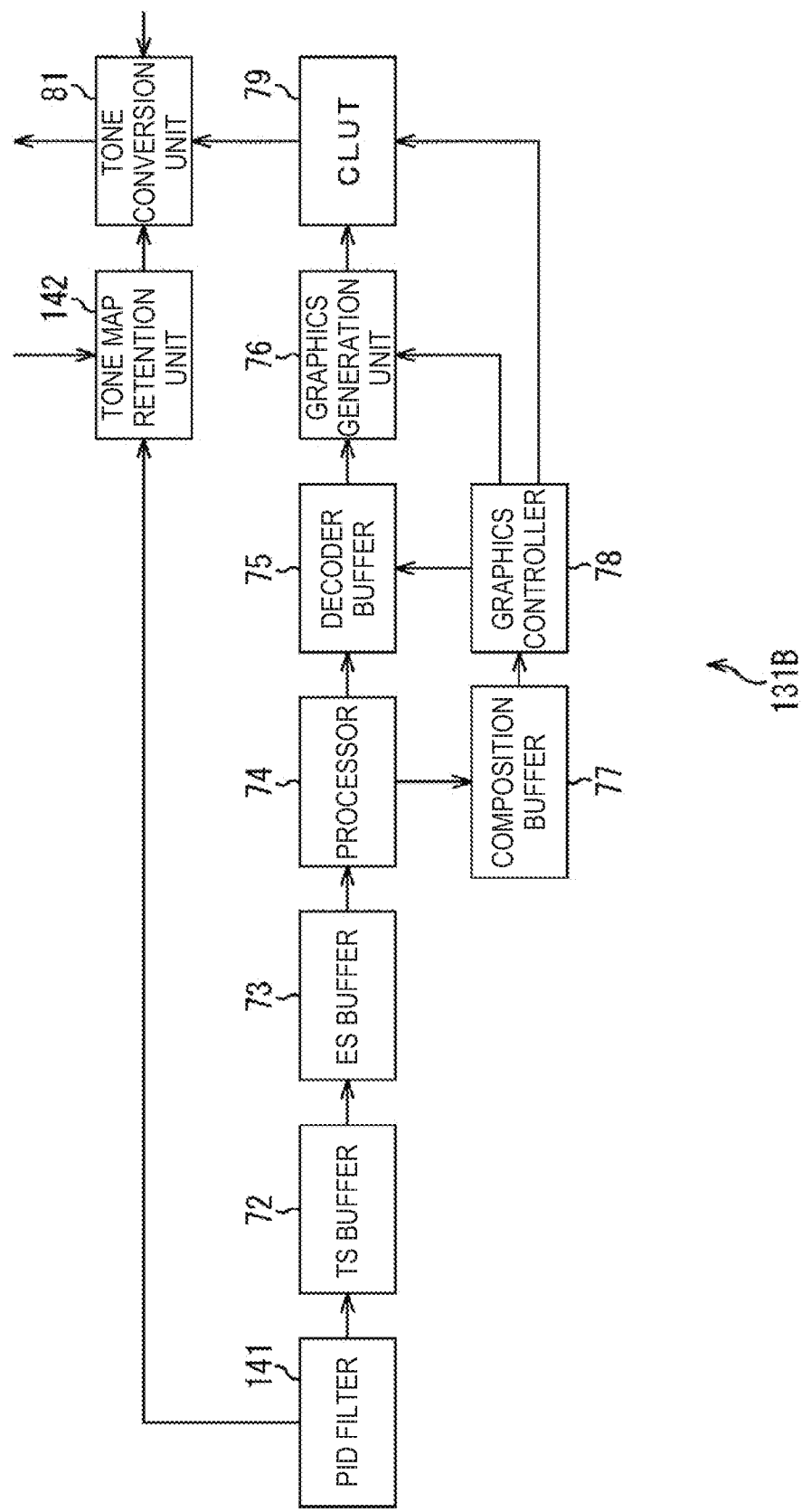
FIG. 41 is a block diagram illustrating a configuration example of a graphics decoding processing unit in FIG. 40.

FIG. 41 is a block diagram illustrating a configuration example of the graphics decoding processing unit 131B in FIG. 40.

In the configuration illustrated in FIG. 41, the same reference numerals are given to the same configurations as the configurations in FIG. 26. The redundant description will be appropriately omitted.

The configuration of the graphics decoding processing unit 131B in FIG. 41 is different from the configuration in FIG. 26 in that a PID filter 141 and a tone map retention unit 142 are provided instead of the PID filter 71 and the tone map retention unit 80.

The PID filter 141 extracts packets of the graphics stream and the Tone_map stream based on a packet ID of each packet of the video stream, the graphics stream, and the Tone_map stream supplied from the disc drive 52. As described above, the PID is an ID unique to the kinds of data that form the packets. Therefore, a different PID from the PID of the other AV streams such as the video stream and the graphics stream is added to the packets of the Tone_map stream.

The PID filter 141 supplies the TS packets of the graphics stream to the TS buffer 72 to retain the TS packets. The PID filter 141 supplies tone_mapping_info included in the extracted Tone_map stream to the tone map retention unit 142.

The tone map retention unit 142 retains tone_mapping_info supplied from the PID filter 141.

(Recording Process)

Figure 42:
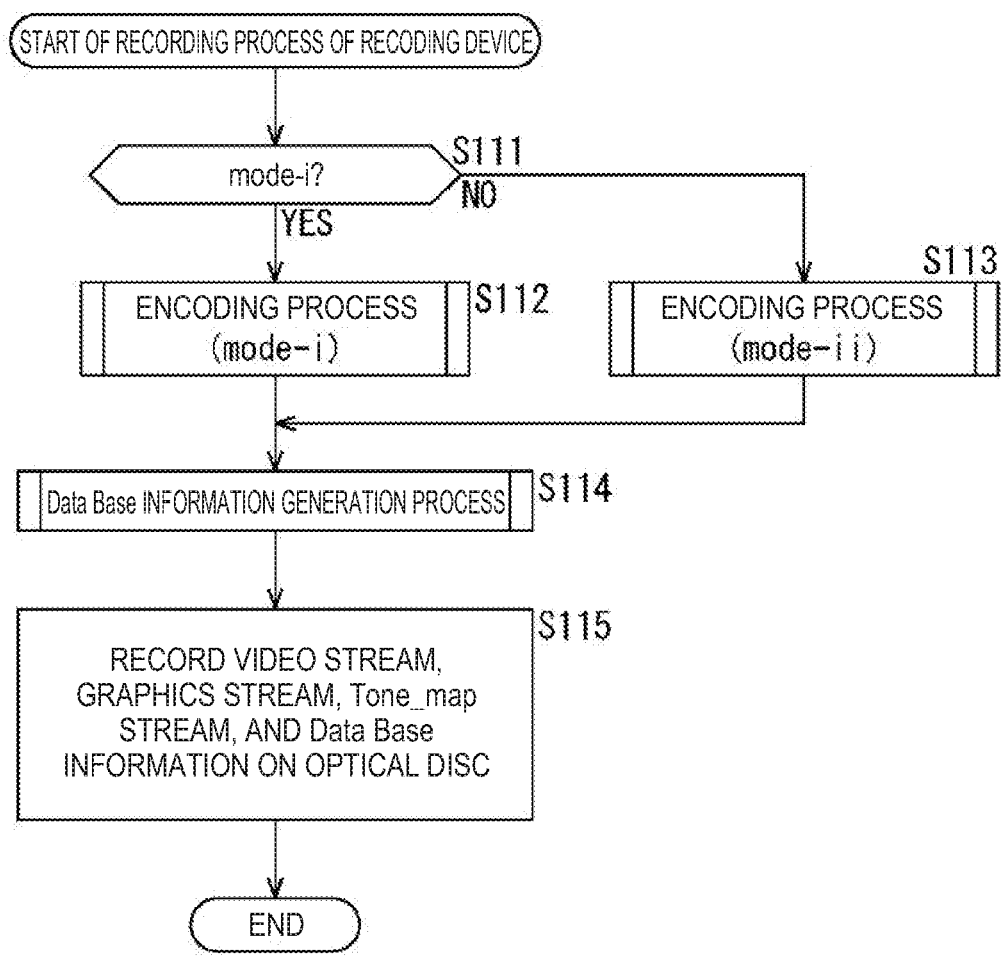
FIG. 42 is a flowchart for describing a recording process according to the second embodiment of the recording device.

FIG. 42 is a flowchart for describing a recording process according to the second embodiment of the recording device 1. The recording process in FIG. 42 starts when the master HDR data is input to the recording device 1.

In step S111, the controller 21 of the recording device 1 determines whether the recording mode is mode-i, as in the process of step S1 in FIG. 28.

When it is determined in step S111 that the recording mode is mode-i, the encoding processing unit 22 performs the encoding process of mode-i in step S112. The video stream, the graphics stream, and the Tone_map stream generated through the encoding process of mode-i are supplied to the disc drive 23.

On the other hand, when it is determined in step S111 that the recording mode is mode-ii, the encoding processing unit 22 performs the encoding process of mode-ii in step S113. The video stream, the graphics stream, and the Tone_map stream generated through the encoding process of mode-ii are supplied to the disc drive 23. In step S114, the Data Base information generation unit 21A performs a Data Base information generation process. The Data Base information generated through the Data Base information generation process is supplied to the disc drive 23.

In step S115, the disc drive 23 records a file in which the video stream, the graphics stream, the Tone_map stream, and the Data Base information are stored on the optical disc 11. Thereafter, the process ends.

Figure 43:
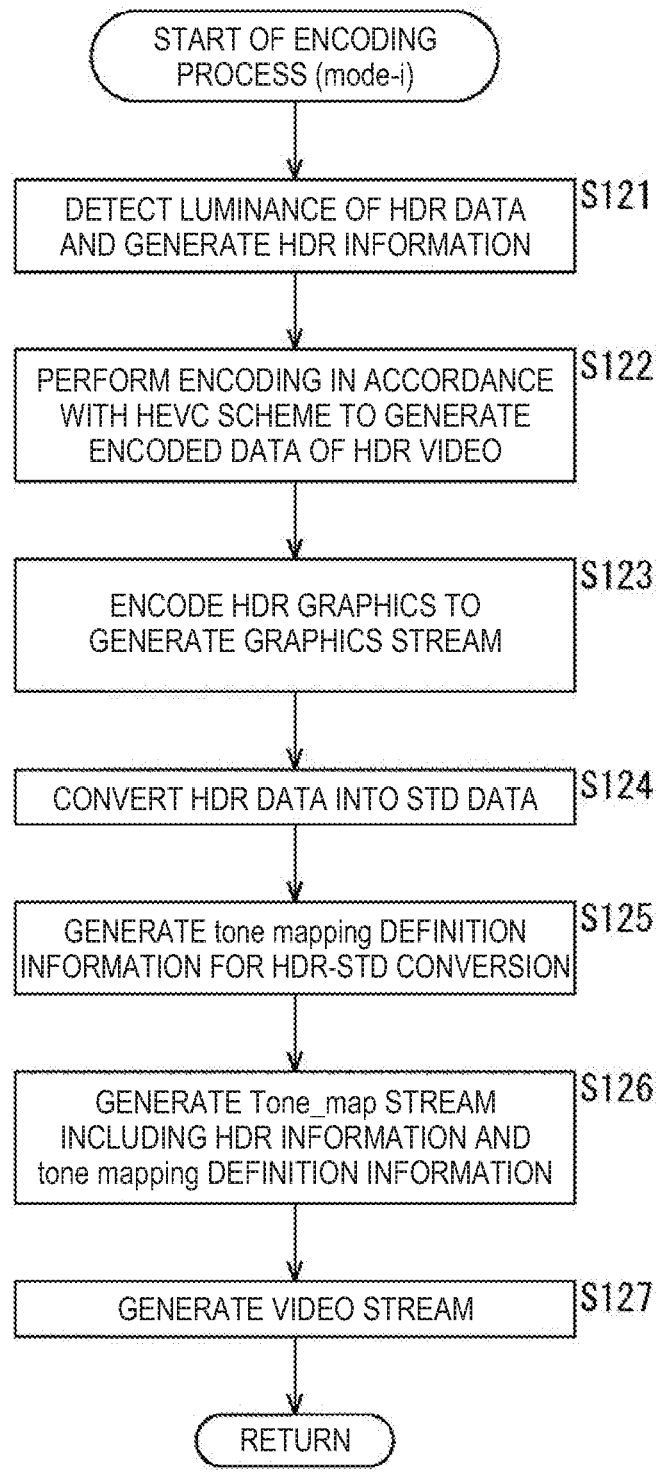
FIG. 43 is a flowchart for describing an encoding process of mode-i in FIG. 42.

FIG. 43 is a flowchart for describing the encoding process of mode-i performed in step S112 of FIG. 42.

Figure 29:
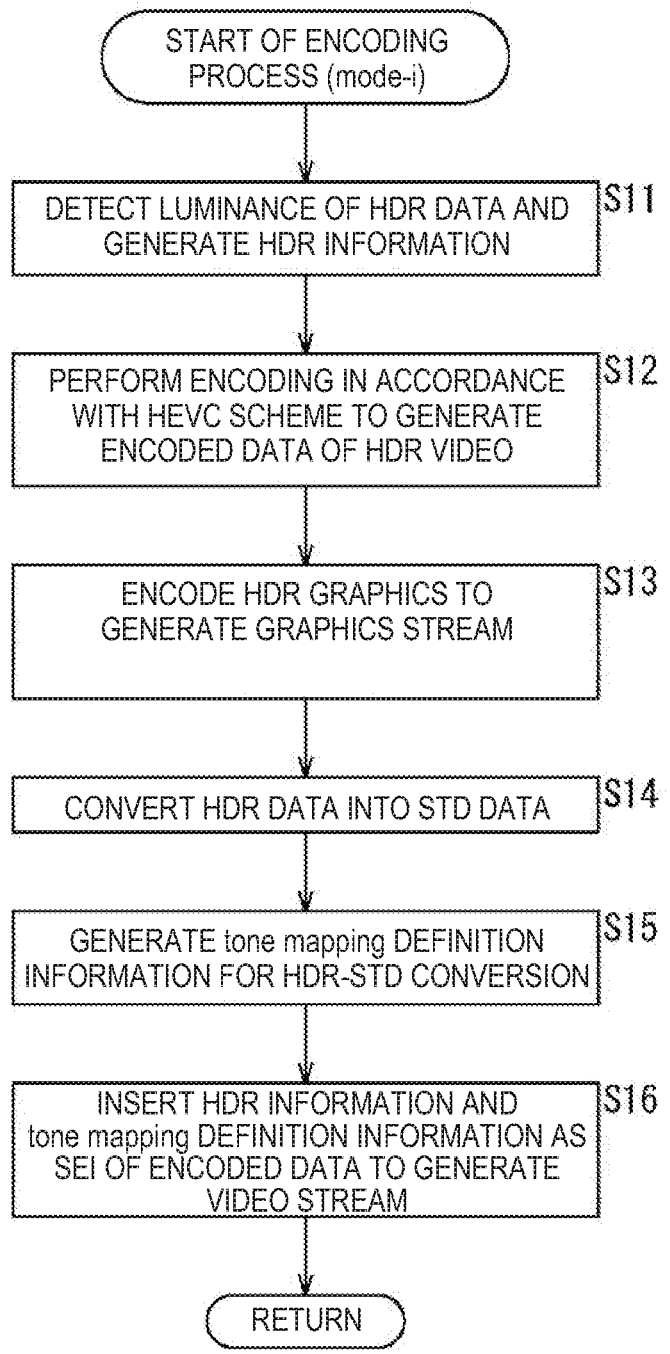
FIG. 29 is a flowchart for describing an encoding process of mode-i in FIG. 28.

Since the processes from steps S121 to S125 in FIG. 43 are similar to the processes of steps S11 to S15 in FIG. 29, the description thereof will be omitted.

In step S126, the stream generation unit 121 generates the Tone_map stream including tone_mapping_info that includes the HDR information generated by the HDR information generation unit 31 and tone_mapping_info which is the tone mapping definition information generated by the definition information generation unit 34. The stream generation unit 121 supplies the Tone_map stream to the disc drive 23.

The stream generation unit 121 supplies the controller 21 with the number of pieces of tone_mapping_info including the HDR information of the video stream and the number of pieces of tone_mapping_info which is the tone mapping definition information, and tone_map_id of tone_mapping_info. The stream generation unit 121 further supplies the controller 21 with the number of pieces of tone_mapping_info including the HDR information of the graphics stream and the number of pieces of tone_mapping_info which is the tone mapping definition information, and tone_map_id of tone_mapping_info. The stream generation unit 121 further supplies the controller 21 with tone_map_id and the number of pieces of tone_mapping_info of the video stream and the graphics stream as tone_map_id and the number of pieces of tone_mapping_info inserted into the Tone_map stream.

In step S127, the stream generation unit 121 generates the video stream including the encoded data supplied from the HEVC encoder 32 and supplies the video stream to the disc drive 23. Thereafter, the process returns to step S112 of FIG. 42 and the subsequent process is performed.

Figure 44:
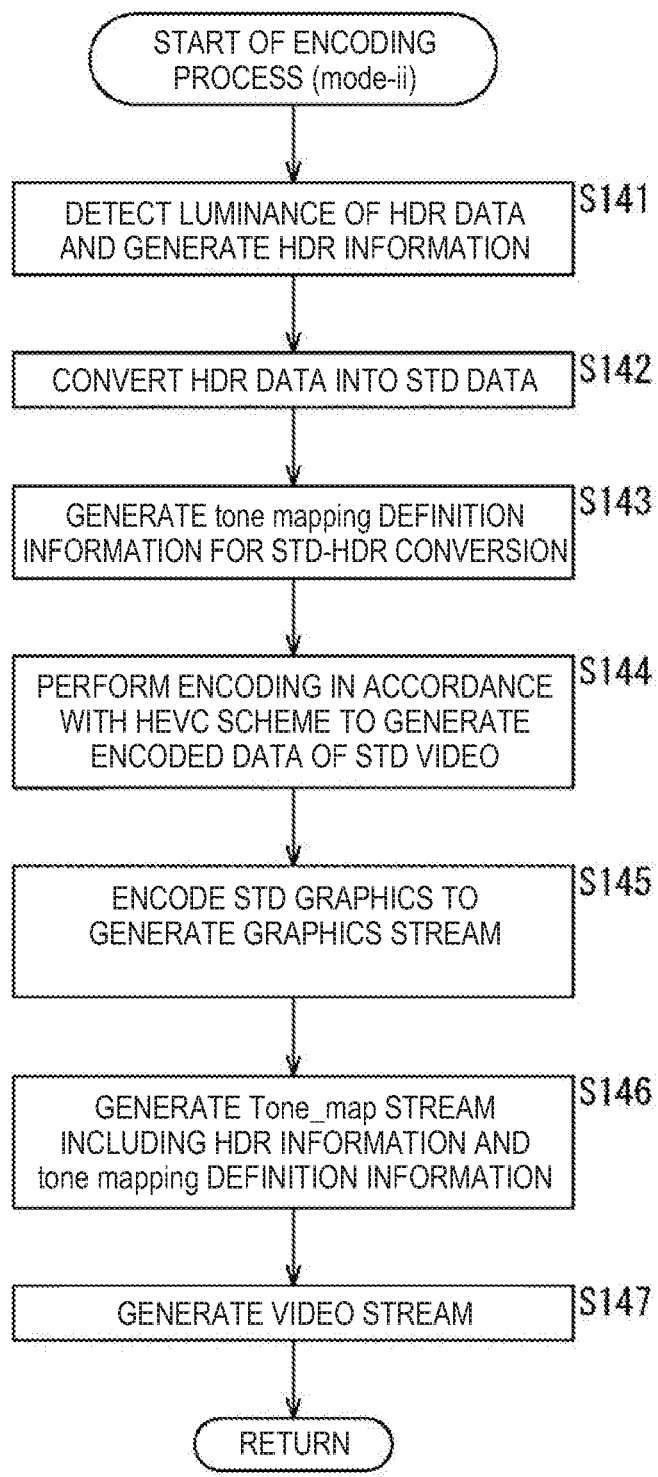
FIG. 44 is a flowchart for describing an encoding process of mode-ii in FIG. 42.

FIG. 44 is a flowchart for describing the encoding process of mode-ii performed in step S113 of FIG. 42.

Figure 30:
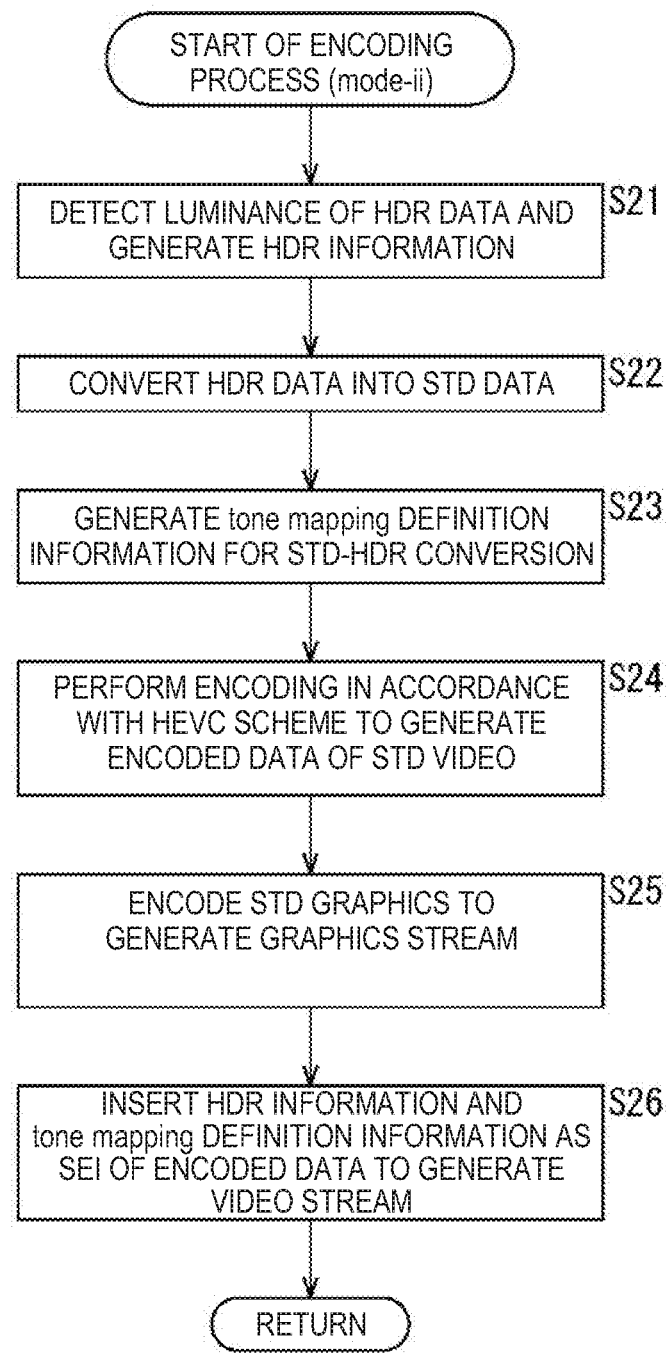
FIG. 30 is a flowchart for describing an encoding process of mode-ii in FIG. 28.

Since the processes from steps S141 to S145 in FIG. 44 are similar to the processes of steps S21 to S25 in FIG. 30, the description thereof will be omitted. Since the processes from steps S146 and S147 are similar to the processes of steps S126 and S127 in FIG. 43, the description thereof will be omitted.

Figure 45:
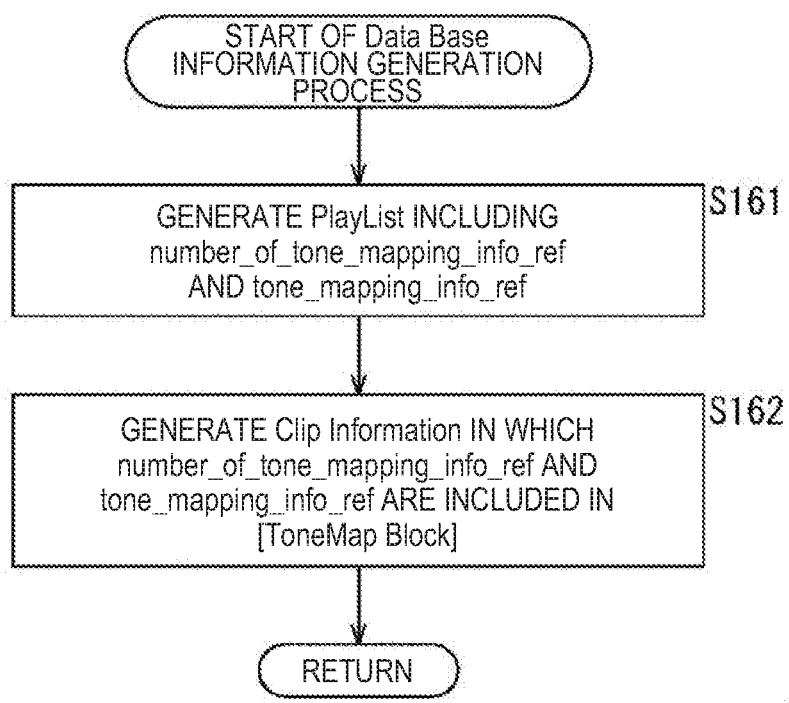
FIG. 45 is a flowchart for describing a Data Base generation process in FIG. 42.

FIG. 45 is a flowchart for describing the Data Base generation process performed in step S114 of FIG. 42.

Figure 31:
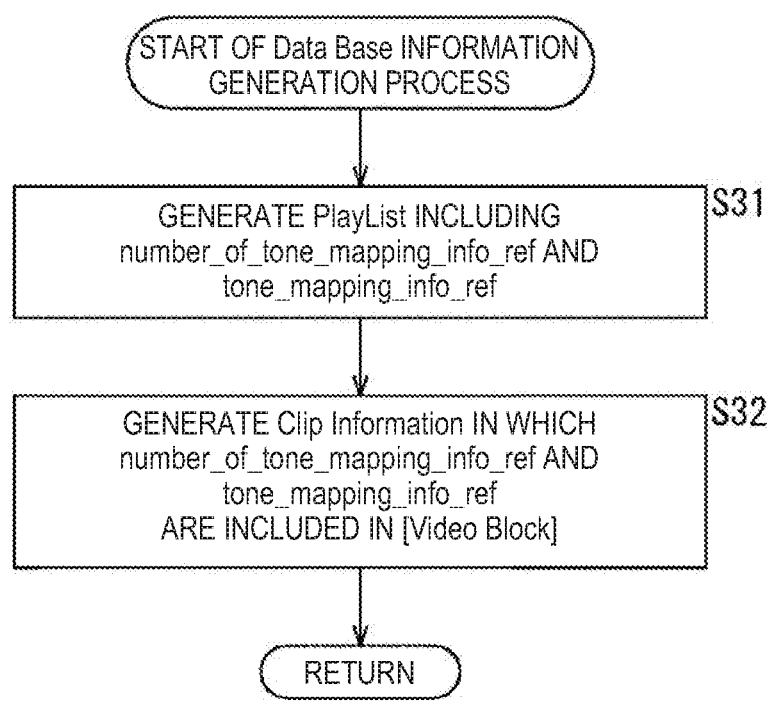
FIG. 31 is a flowchart for describing a Data Base information generation process in FIG. 28.

In step S161 of FIG. 45, the Data Base information generation unit 21A of the controller 21 generates PlayList including number_of_tone_mapping_info_ref and tone_mapping_info_ref of the video stream and the graphics stream, as in the process of step S31 in FIG. 31.

In step S162, the Data Base information generation unit 21A generates Clip Information in which number_of_tone_mapping_info_ref and tone_mapping_info_ref are included in [ToneMap Block] described with reference to FIGS. 38A and 38B.

Specifically, the Data Base information generation unit 21A describes the number of pieces of tone_mapping_info included in the Tone_map stream supplied from the encoding processing unit 22 as number_of_tone_mapping_info_ref in [ToneMap Block] of Clip Information. The Data Base information generation unit 21A describes tone_map_id of tone_mapping_info included in the Tone_map stream supplied from the encoding processing unit 22 as tone_mapping_info_ref in [ToneMap Block] of Clip Information. Clip Information also includes HDR_flag and mode_flag.

The recording device 1 records the video stream, the graphics stream, the Tone_map stream, and the Data Base information generated through the foregoing processes on the optical disc 11.

(Reproduction Process)

Figure 46:
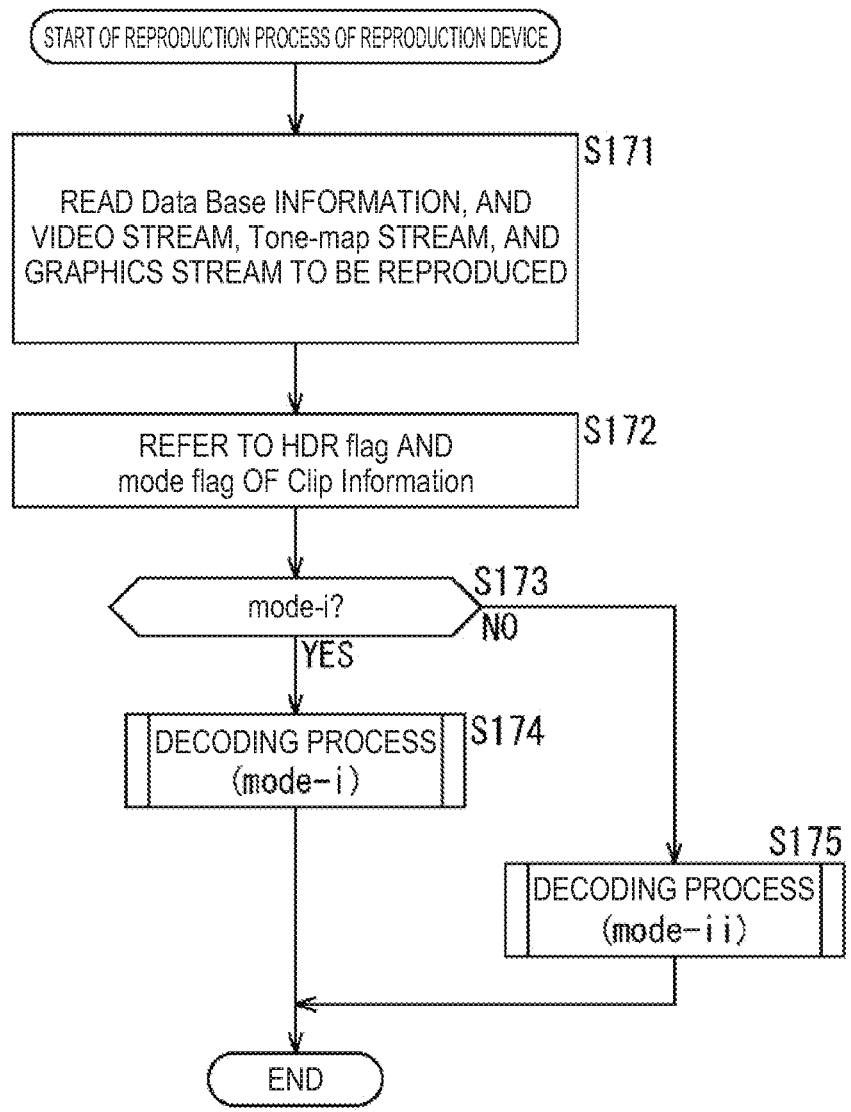
FIG. 46 is a flowchart for describing a reproduction process according to the second embodiment of the reproduction device.

FIG. 46 is a flowchart for describing a reproduction process according to the second embodiment of the reproduction device 2.

At a predetermined timing such as a timing before reproduction start of the optical disc 11, the controller 51 of the reproduction device 2 communicates with the display device 3 by controlling the HDMI communication unit 58 and reads the EDID from the memory 101A of the display device 3. The controller 51 allows the register 53A to store the information indicating the performance of the monitor included in the display device 3 for management.

In step S171, the controller 51 reads PlayList which is the Data Base information and Clip Information from the optical disc 11 by controlling the disc drive 52. The controller 51 specifies the video stream, the graphics stream, and the Tone_map stream to be reproduced based on the information included in PlayList. The controller 51 reads the specified video stream, graphics stream, and Tone_map stream from the optical disc 11 by controlling the disc drive 52.

Figure 32:
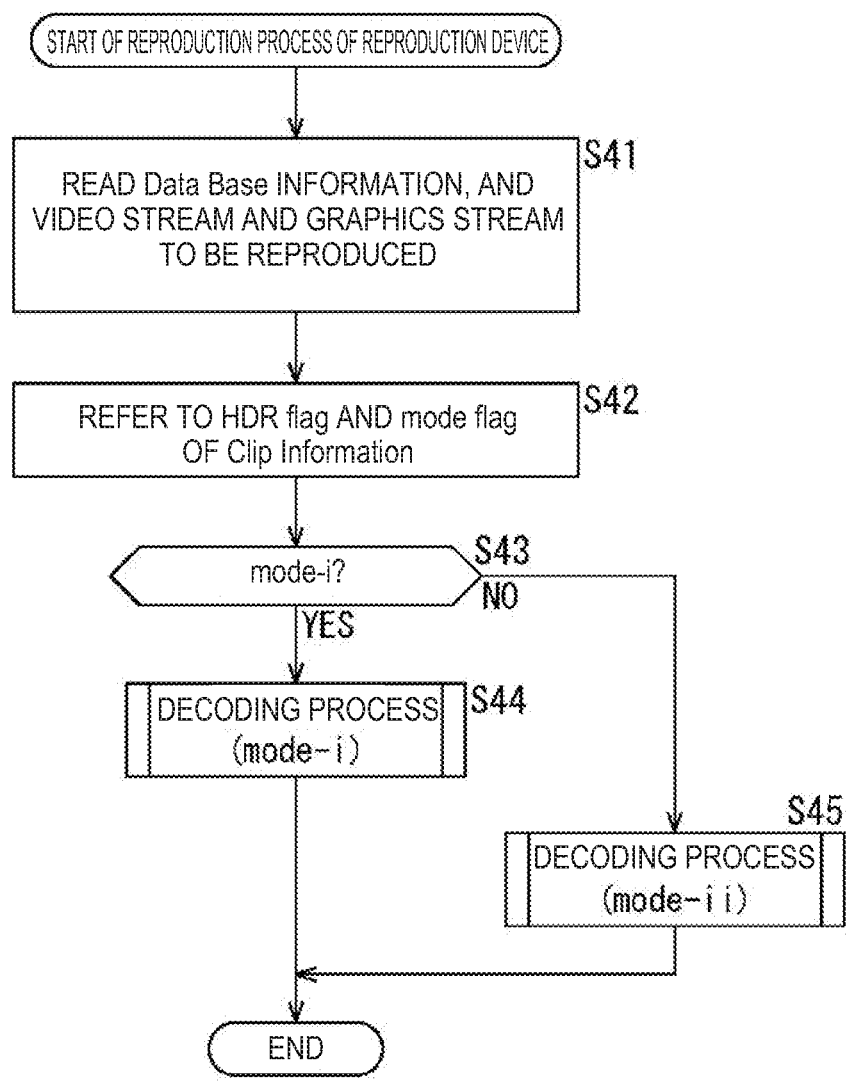
FIG. 32 is a flowchart for describing a reproduction process of the reproduction device in FIG. 25.

Since the processes from steps S172 and S173 are similar to the processes of steps S42 and S43 in FIG. 32, the description thereof will be omitted.

When it is determined in step S173 that the recording mode is mode-i, the decoding processing unit 131 performs the decoding process of mode-i in step S174. The details of the decoding process of mode-i will be described with reference to FIG. 47 to be described below.

On the other hand, when it is determined in step S173 that the recording mode is mode-ii, the decoding processing unit 131 performs the decoding process of mode-ii in step S175.

The details of the decoding process of mode-ii will be described with reference to FIG. 47 to be described below.

After the decoding process is performed in step S174 or step S175, the process ends.

Figure 47:
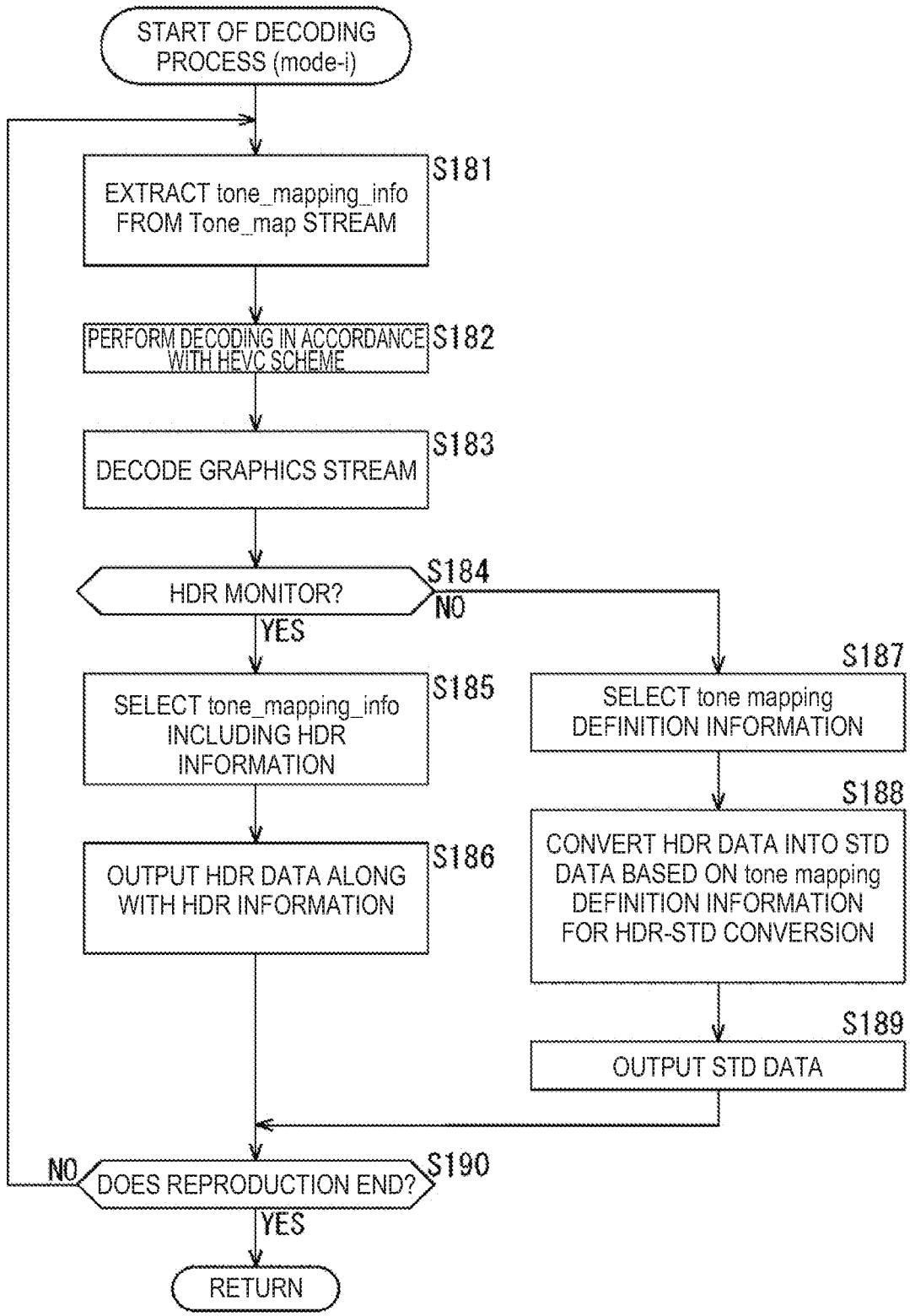
FIG. 47 is a flowchart for describing a decoding process of mode-i in FIG. 46.

FIG. 47 is a flowchart for describing a decoding process of mode-i in step S174 of FIG. 46.

In step S181, the video decoding processing unit 131A extracts tone_mapping_info from the Tone_map stream supplied from the disc drive 52. In the graphics decoding processing unit 131B, the PID filter 141 extracts the Tone_map stream and tone_mapping_info is extracted from the Tone_map stream to be retained in the tone map retention unit 142.

Figure 33:
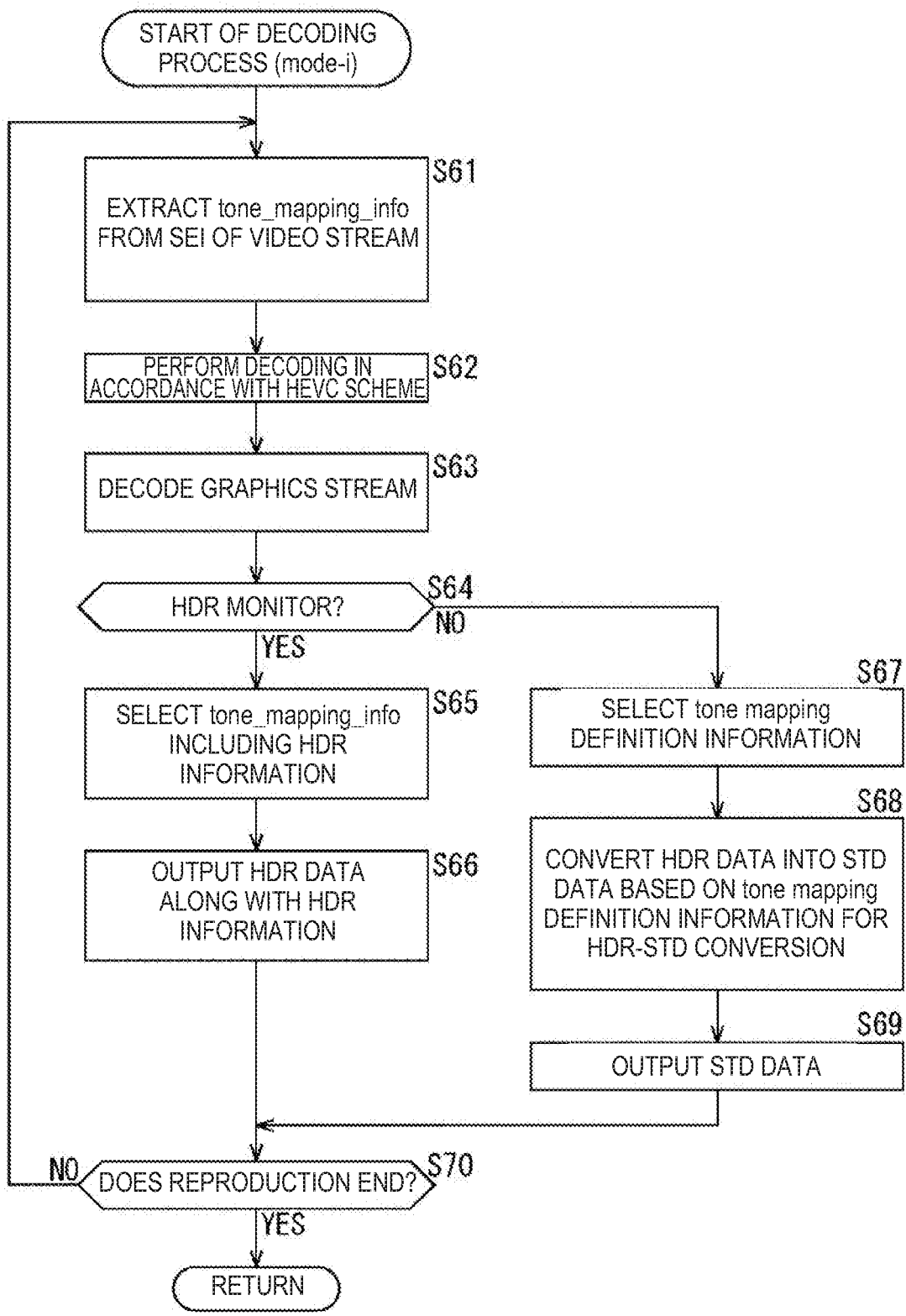
FIG. 33 is a flowchart for describing a decoding process of mode-i in FIG. 32.

Since the processes from steps S182 to S190 are similar to the processes of steps S62 to S70 in FIG. 33, the description thereof will be omitted. After the process of step S190, the process returns to step S174 of FIG. 46 and the subsequent process is performed.

Figure 48:
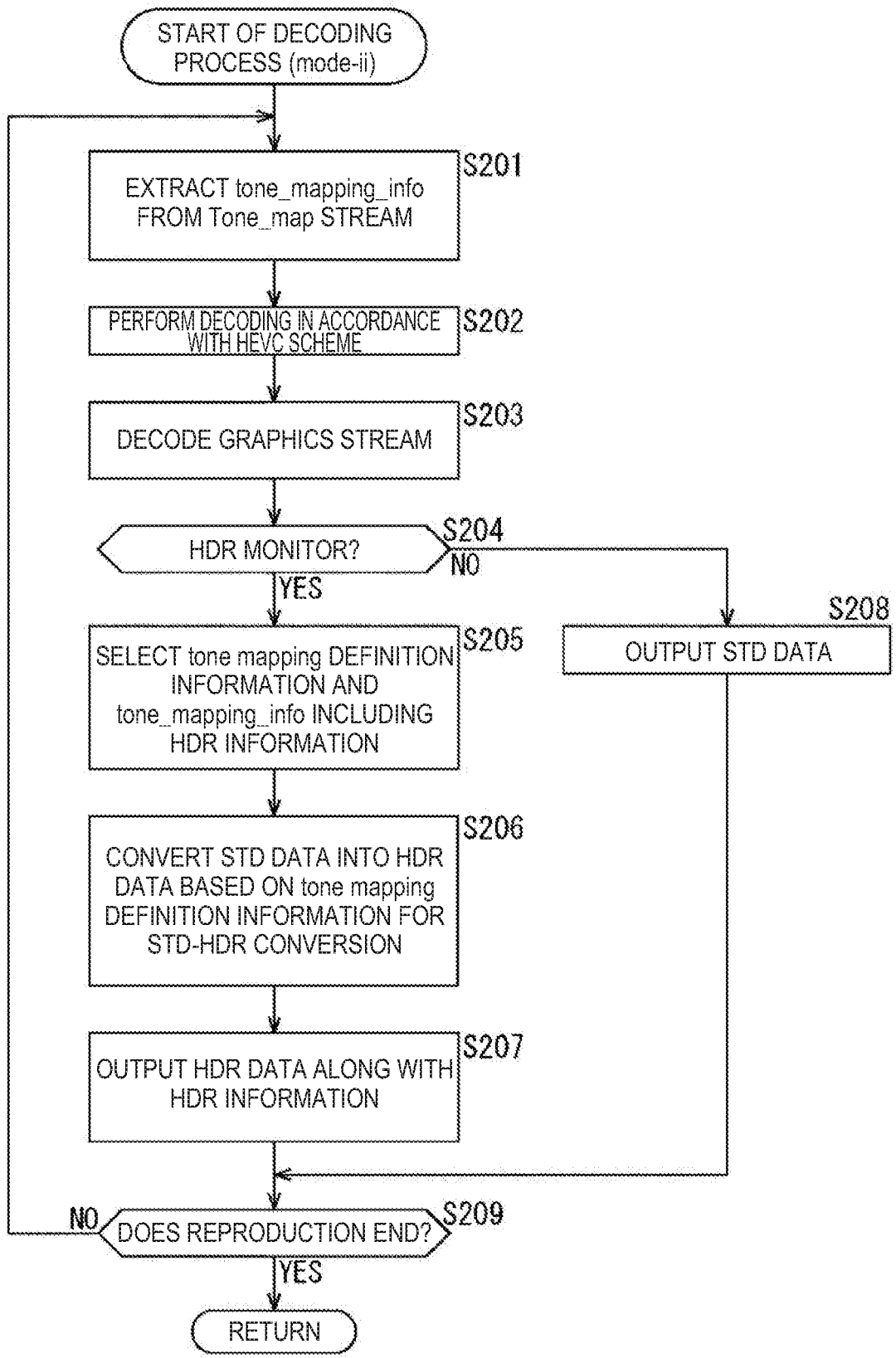
FIG. 48 is a flowchart for describing the details of the decoding process of mode-ii in FIG. 46.

FIG. 48 is a flowchart for describing details of a decoding process of mode-ii in step S175 of FIG. 46.

Figure 34:
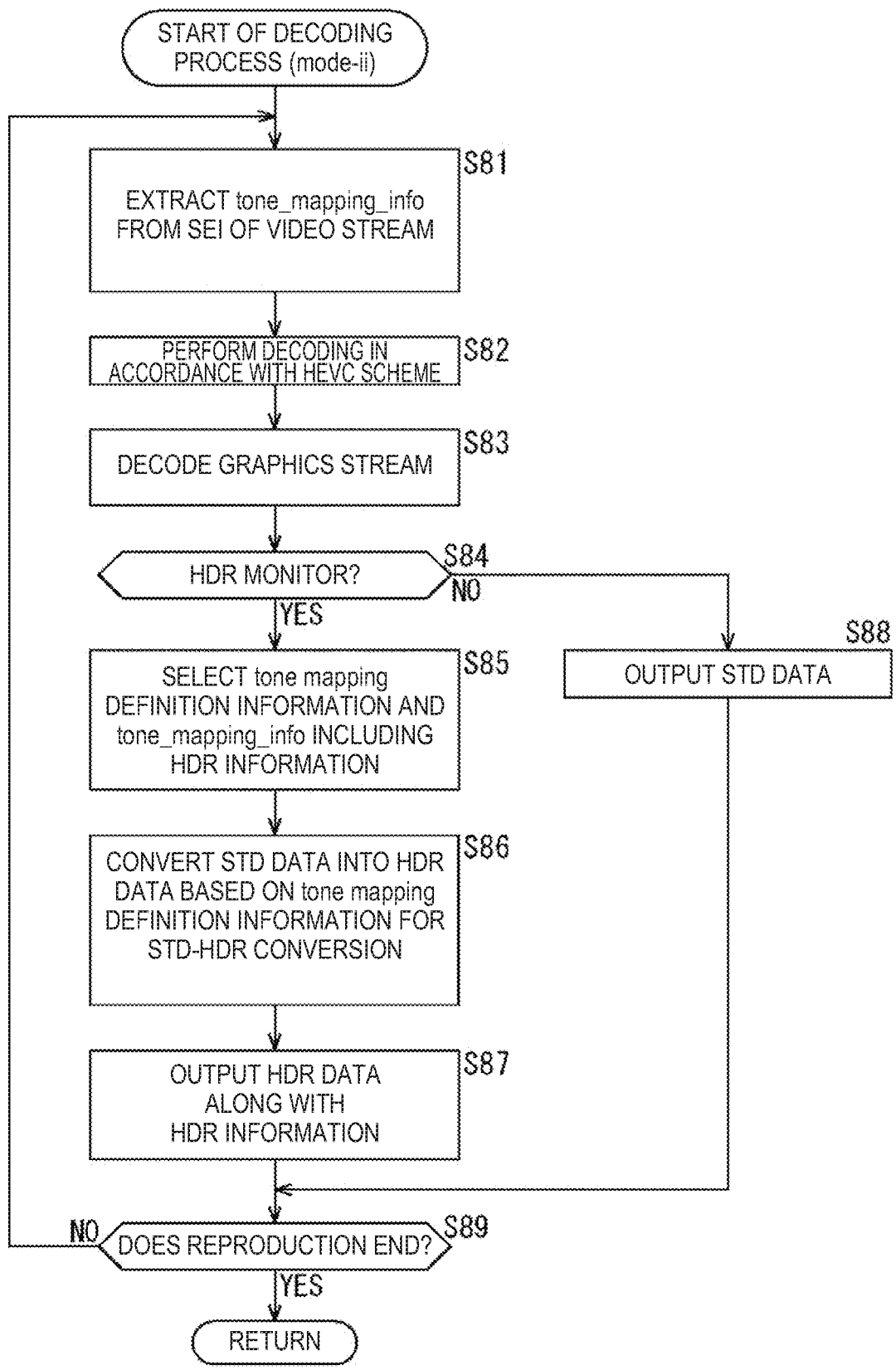
FIG. 34 is a flowchart for describing a decoding process of mode-ii in FIG. 32.

Since the process of step S201 is similar to the process of step S181 of FIG. 47 and the processes of steps S202 to S209 are similar to the processes of steps S82 to S89 in FIG. 34, the description thereof will be omitted.

Third Embodiment (Configurations of PG Stream and IG Stream)

Figure 49A:
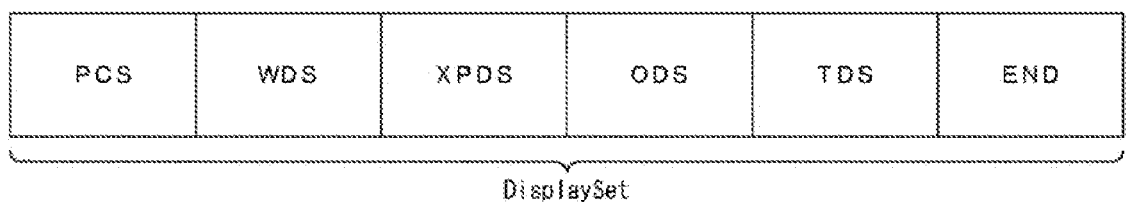
FIG. 49A is a diagram illustrating a configuration example of a display set of a PG stream and FIG. 49B is a diagram illustrating a configuration example of a display set of an IG stream in a third embodiment.
Figure 49B:
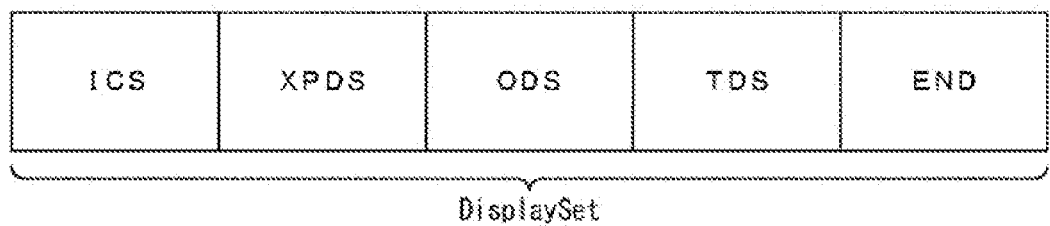

FIGS. 49A and 49B are diagrams illustrating a configuration example of a display set of a PG stream and an IG stream in a third embodiment.

In the third embodiment, tone_mapping_info of the PG stream and the IG stream is not included in the video stream or the Tone_map stream, but is included in the PG stream and the IG stream.

Specifically, as illustrated in FIG. 49A, a tone_mapping_info definition segment (TDS) which is a segment describing tone_mapping_info of subtitles corresponding to one screen is prepared as a segment of a display set of the PG stream. As illustrated in FIG. 49B, a TDS which is a segment describing tone_mapping_info of a menu button corresponding to one screen is prepared as a segment of a display set of the IG stream.

In the XPDS of the PG stream, the number of pieces of tone_mapping_info included in the TDS and tone_map_id for identifying tone_mapping_info of subtitles corresponding to the ODS are described in addition to the description of FIG. 20. The same also applies to the XPDS of the IG stream.

(Syntax of XPDS)

FIG. 50 is a diagram illustrating an example of the syntax of the XPDS in FIGS. 49A and 49B.

In the XPDS of FIG. 50, number_of_tone_mapping_info_ref in the 6th line and tone_mapping_info_ref in the 7th to 10th lines are described in addition to the description of FIG. 20. Here, number_of_tone_mapping_info_ref indicates the number of pieces of tone_mapping_info included in the TDS in the same display set as the XPDS including number_of_tone_mapping_info_ref. Further, tone_mapping_info_ref indicates tone_map_id for identifying tone_mapping_info corresponding to the ODS in the same display set as the XPDS including number_of_tone_mapping_info_ref.

In this way, in the third embodiment, tone_mapping_info is disposed in the IG stream or the PG stream. Therefore, number_of_tone_mapping_info_ref and tone_mapping_info_ref are also disposed in the graphics stream. Accordingly, it is not necessary to dispose number_of_tone_mapping_info_ref and tone_mapping_info_ref of the graphics stream in PlayList. Accordingly, although number_of_tone_mapping_info_ref and tone_mapping_info_ref of the graphics stream are assumed not to be disposed in PlayList in the third embodiment, they may be disposed therein.

(Syntax of TDS)

FIG. 51 is a diagram illustrating an example of the syntax of the TDS in FIGS. 49A and 49B.

As illustrated in the 4th line of FIG. 51, tone_mapping_info is described in the TDS. Here, the syntax of tone_mapping_info is the same as that illustrated in FIG. 7.

Although tone_mapping_info is assumed not to be included in the Text-ST stream in the third embodiment, it may be included therein. In this case, for example, number_of_tone_mapping_info_ref and tone_mapping_info_ref are described in the DSS of the Text-ST stream. The TDS is prepared in the Text-ST stream.

The syntax of PlayList according to the third embodiment is the same as the syntax of PlayList of the first embodiment including STN_table of FIG. 16. However, 0 is set in PG_text_ST_tone_mapping_flag and IG_tone_mapping_flag. When tone_mapping_info of the Text-ST stream is included in the video stream, 1 is set in PG_text_ST_tone_mapping_flag, and the number of pieces of tone_mapping_info and tone_map_id of tone_mapping_info are set.

StreamCodingInfo according to the third embodiment is the same as StreamCodingInfo of the first embodiment illustrated in FIGS. 17, 18A, and 18B. Accordingly, the reproduction device 2 can recognize whether tone_mapping_info is included in the graphics stream before reproduction of the graphics stream based on number_of_tone_mapping_info included in [Graphics Block].

(Configuration of Encoding Processing Unit 22)

Figure 52:
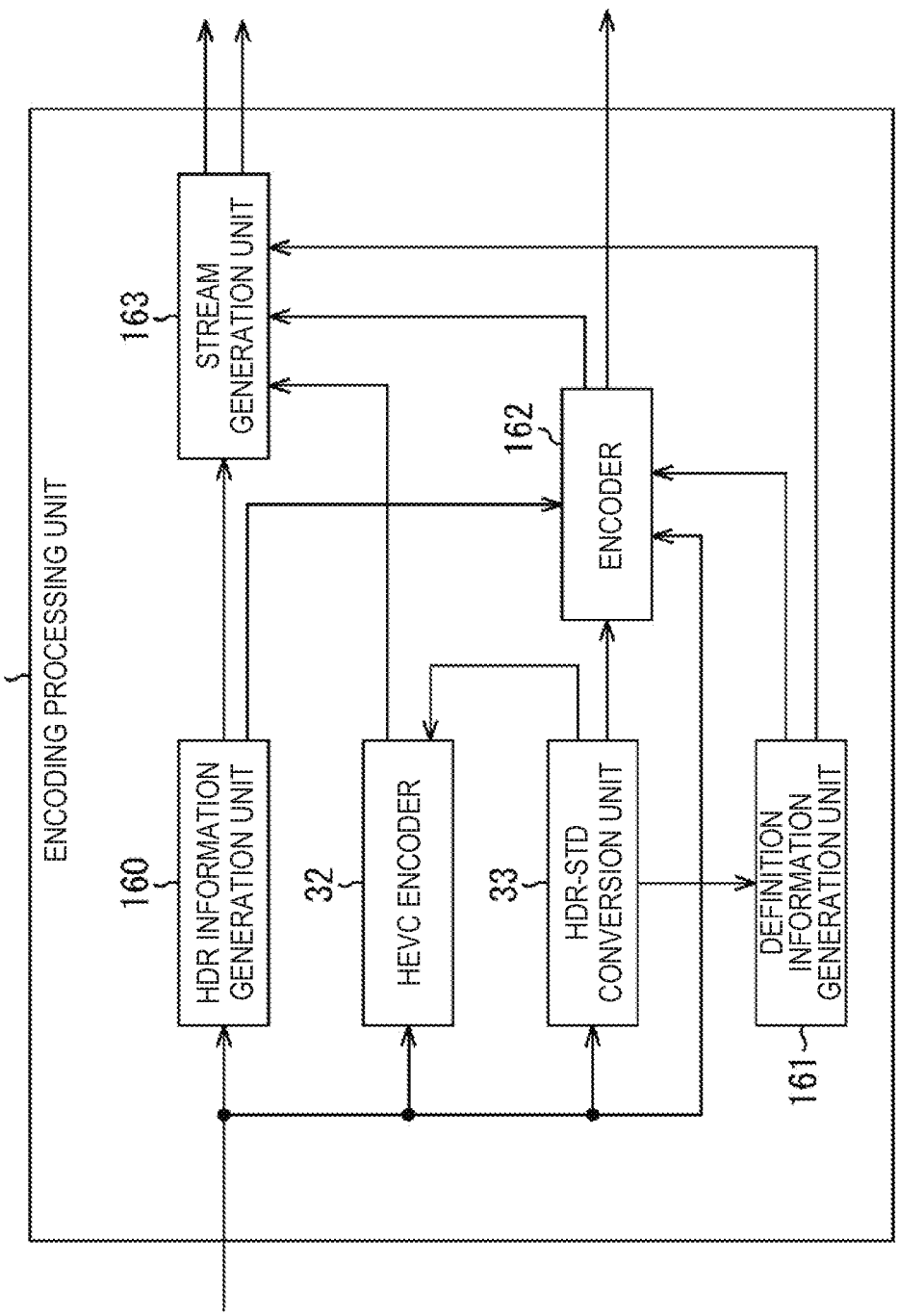
FIG. 52 is a diagram illustrating a configuration example of an encoding processing unit of the third embodiment of the recording and reproduction system to which the present technology is applied.

FIG. 52 is a diagram illustrating a configuration example of the encoding processing unit 22 of the recording device 1 in the third embodiment of the recording and reproduction system to which the present technology is applied.

In the configuration illustrated in FIG. 52, the same reference numerals are given to the same configurations as the configurations in FIG. 22. The redundant description will be appropriately omitted.

The configuration of the encoding processing unit 22 in FIG. 52 is different from the configuration in FIG. 22 in that an HDR information generation unit 160, a definition information generation unit 161, an encoder 162, and a stream generation unit 163 are provided instead of the HDR information generation unit 31, the definition information generation unit 34, the encoder 35, and the stream generation unit 36.

The HDR information generation unit 160 detects the luminance of the input master HDR data and generates the HDR information including each piece of information described with reference to FIG. 12. The HDR information generation unit 160 supplies the stream generation unit 163 with the HDR information of the video stream among the generated HDR information and outputs the HDR information of the graphics stream to the encoder 162.

The definition information generation unit 161 generates the tone mapping definition information for HDR-STD conversion of the video stream and the graphics stream based on the information supplied from the HDR-STD conversion unit 33, as in the definition information generation unit 34 in FIG. 22. The definition information generation unit 161 supplies the encoder 162 with the tone mapping definition information for HDR-STD conversion of the graphics stream and supplies the stream generation unit 163 with the tone mapping definition information for HDR-STD conversion of the video stream.

When the recording mode is mode-i, the encoder 162 encodes the input master HDR graphics to generate the graphics stream. When the recording mode is mode-ii, the encoder 162 encodes the STD graphics supplied from the HDR-STD conversion unit 33 to generate the graphics stream.

The encoder 162 generates the TDS including tone_mapping_info which is the tone mapping definition information for HDR-STD conversion of the graphics stream supplied from the definition information generation unit 161 and tone_mapping_info including the HDR information of the graphics stream supplied from the HDR information generation unit 160.

The encoder 162 inserts the TDS into the graphics stream of the HDR graphics or the STD graphics and outputs the HDR graphics or the STD graphics to the stream generation unit 163. The encoder 162 supplies the controller 21 with tone_map_id and the number of pieces of tone_mapping_info of the graphics stream.

The stream generation unit 163 supplies the controller 21 with the number of pieces of tone_mapping_info including the HDR information of the video stream supplied from the HDR information generation unit 160 and the number of pieces of tone_mapping_info which is the tone mapping definition information of the video stream supplied from the definition information generation unit 161. The stream generation unit 163 supplies the controller 21 with tone_map_id of tone_mapping_info.

The stream generation unit 163 inserts tone_mapping_info of the video stream as the SEI into the encoded data to generate the video stream. The stream generation unit 163 outputs the generated video stream and the graphics stream supplied from the encoder 162 to the disc drive 23.

(Configuration of Reproduction Device 2)

Figure 53:
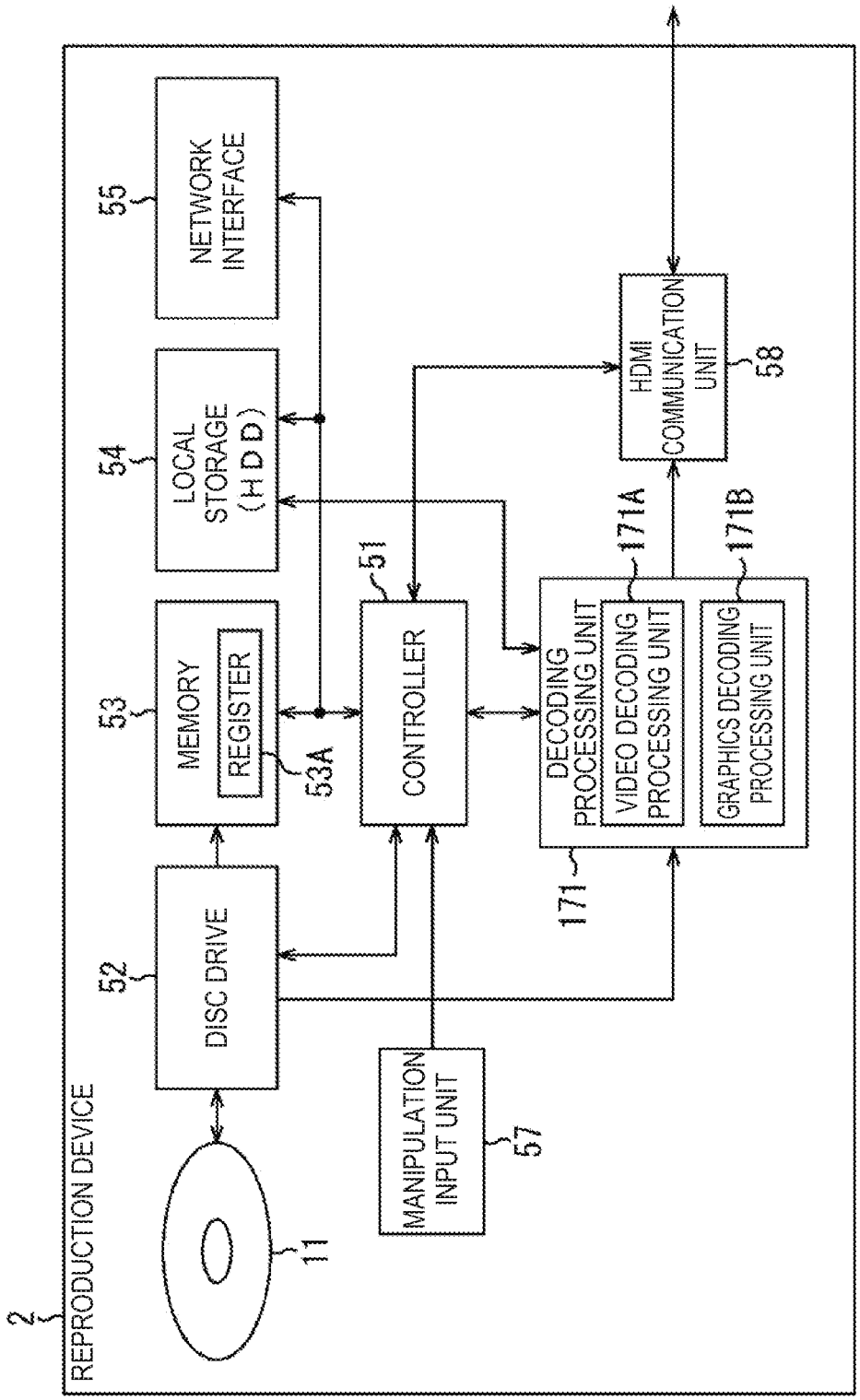
FIG. 53 is a diagram illustrating a configuration example of a reproduction device of the third embodiment of the recording and reproduction system to which the present technology is applied.

FIG. 53 is a diagram illustrating a configuration example of a reproduction device 2 of the third embodiment of the recording and reproduction system to which the present technology is applied.

In the configuration illustrated in FIG. 53, the same reference numerals are given to the same configurations as the configurations in FIG. 25. The redundant description will be appropriately omitted.

The configuration of the reproduction device 2 in FIG. 53 is different from the configuration in FIG. 25 in that a decoding processing unit 171 is provided instead of the decoding processing unit 56.

The decoding processing unit 171 is configured to include a video decoding processing unit 171A and a graphics decoding processing unit 171B. The video decoding processing unit 171A extracts the video stream in the AV streams read and supplied by the disc drive 52. The video decoding processing unit 171A extracts tone_mapping_info including the HDR information and tone_mapping_info which is the tone mapping definition information from the SEI of the video stream. The video decoding processing unit 171A decodes the encoded data included in the video stream in accordance with the HEVC scheme.

The video decoding processing unit 171A selects tone_mapping_info_ref of the video stream based on tone_mapping_info_ref of the video stream supplied from the controller 51. The video decoding processing unit 171A converts the HDR video or the STD video obtained as the decoding result into the STD video or the HDR video with reference to the tone mapping definition information which is the selected tone_mapping_info and outputs the STD video or the HDR video to the HDMI communication unit 58, as necessary. When the video decoding processing unit 171A outputs the HDR video, the video decoding processing unit 56A outputs the HDR information included in the selected tone_mapping_info to the HDMI communication unit 58 along with the HDR video.

The graphics decoding processing unit 171B extracts the graphics stream in the AV streams read and supplied by the disc drive 52 and tone_mapping_info from the TDS of the graphics stream. The graphics decoding processing unit 171B decodes the ODS of the graphics stream.

The graphics decoding processing unit 171B converts the HDR graphics or the STD graphics obtained as the decoding result into the STD graphics or the HDR graphics with reference to the tone mapping definition information which is tone_mapping_info and outputs the STD graphics or the HDR graphics to the HDMI communication unit 58, as necessary. When the graphics decoding processing unit 171B outputs the HDR graphics, the graphics decoding processing unit 171B outputs the HDR information included in tone_mapping_info to the HDMI communication unit 58 along with the HDR graphics.

(Configuration of Graphics Decoding Processing Unit 171B)

Figure 54:
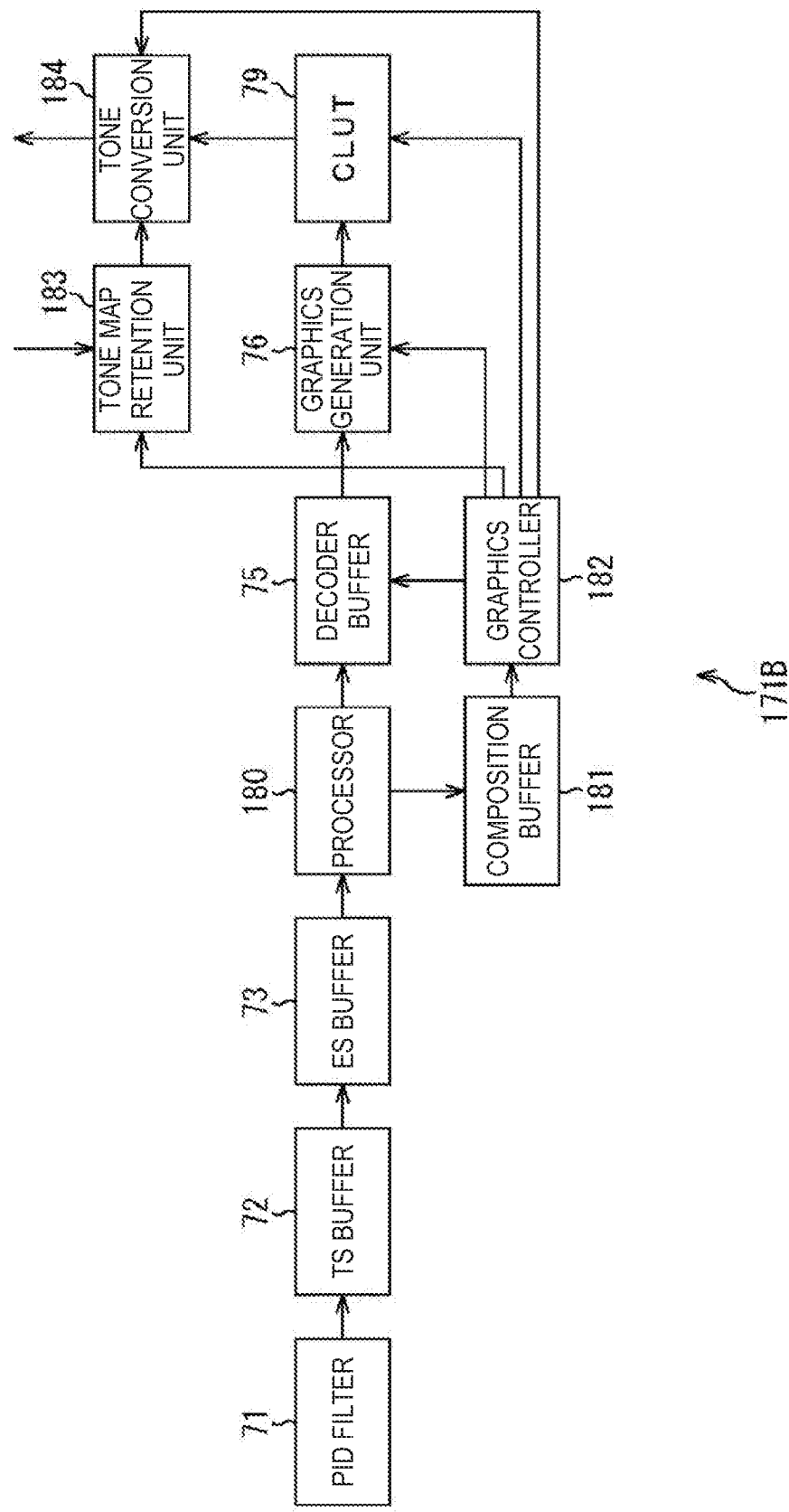
FIG. 54 is a block diagram illustrating a configuration example of a graphics decoding processing unit in FIG. 53.

FIG. 54 is a block diagram illustrating a configuration example of the graphics decoding processing unit 171B in FIG. 53.

In the configuration illustrated in FIG. 54, the same reference numerals are given to the same configurations as the configurations in FIG. 26. The redundant description will be appropriately omitted.

The configuration of the graphics decoding processing unit 171B in FIG. 54 is different from the configuration in FIG. 26 in that a processor 180, a composition buffer 181, a graphics controller 182, a tone map retention unit 183, and a tone conversion unit 184 are provided instead of the processor 74, the composition buffer 77, the graphics controller 78, the tone map retention unit 80, and the tone conversion unit 81.

The processor 180 reads the ES from the ES buffer 73 and supplies control data of the graphics included in the ES to the composition buffer 181. For example, when the ES is the PG stream, the processor 180 supplies the PCS, the WDS, the XPDS, and the TDS included in the PG stream to the composition buffer 181. On the other hand, when the ES is the IG stream, the processor 180 supplies the ICS, the XPDS, and the TDS included in the IG stream to the composition buffer 181. The processor 180 decodes the ODS included in the ES and supplies the decoded ODS to the decoder buffer 75.

The composition buffer 181 retains the control data supplied from the processor 180.

As described above, it can be recognized whether tone_mapping_info is included in the graphics stream before the reproduction of the graphics stream based on number_of_tone_mapping_info included in [Graphics Block]. Accordingly, the composition buffer 181 ensures a capacity assumed as the capacity of tone_mapping_info as a storage capacity only when it is recognized that tone_mapping_info is included in the graphics stream. Thus, it is possible to prevent a storage capacity from being ensured unnecessarily in the composition buffer 181.

The graphics controller 182 reads the control data from the composition buffer 181. The graphics controller 182 controls a reading timing in the decoder buffer 75 and the graphics generation unit 76 based on the PCS or the WDS in the control data. The graphics controller 182 supplies the XPDS to the CLUT 79.

The graphics controller 182 extracts tone_mapping_info from the TDS and supplies tone_mapping_info to the tone map retention unit 183. The graphics controller 182 supplies tone_mapping_info_ref included in the XPDS to the tone conversion unit 184.

The tone map retention unit 183 retains tone_mapping_info supplied from the graphics controller 182.

The tone conversion unit 184 reads tone_mapping_info in which tone_mapping_info_ref is described as tone_map_id from the tone map retention unit 183 based on tone_mapping_info_ref supplied from the graphics controller 182. For example, information indicating a recording mode specified by mode_flag included in Clip Information and information which is information regarding the performance of the monitor included in the display device 3 and is specified by the information acquired from the display device 3 are supplied from the controller 51 to the tone conversion unit 184 in a way similar to the tone conversion unit 81.

The tone conversion unit 184 outputs the HDR information and the STD graphics or the HDR graphics to the HDMI communication unit 58, as in the tone conversion unit 81.

(Recording Process)

A recording process of the recording device 1 according to the third embodiment is similar to the recording process in FIG. 28 except for the encoding process of mode-i in step S2, the encoding process of mode-ii in step S3, and the Data Base information generation process in step S4. Accordingly, only the encoding process of mode-i, the encoding process of mode-ii, and the Data Base information generation process will be described.

Figure 55:
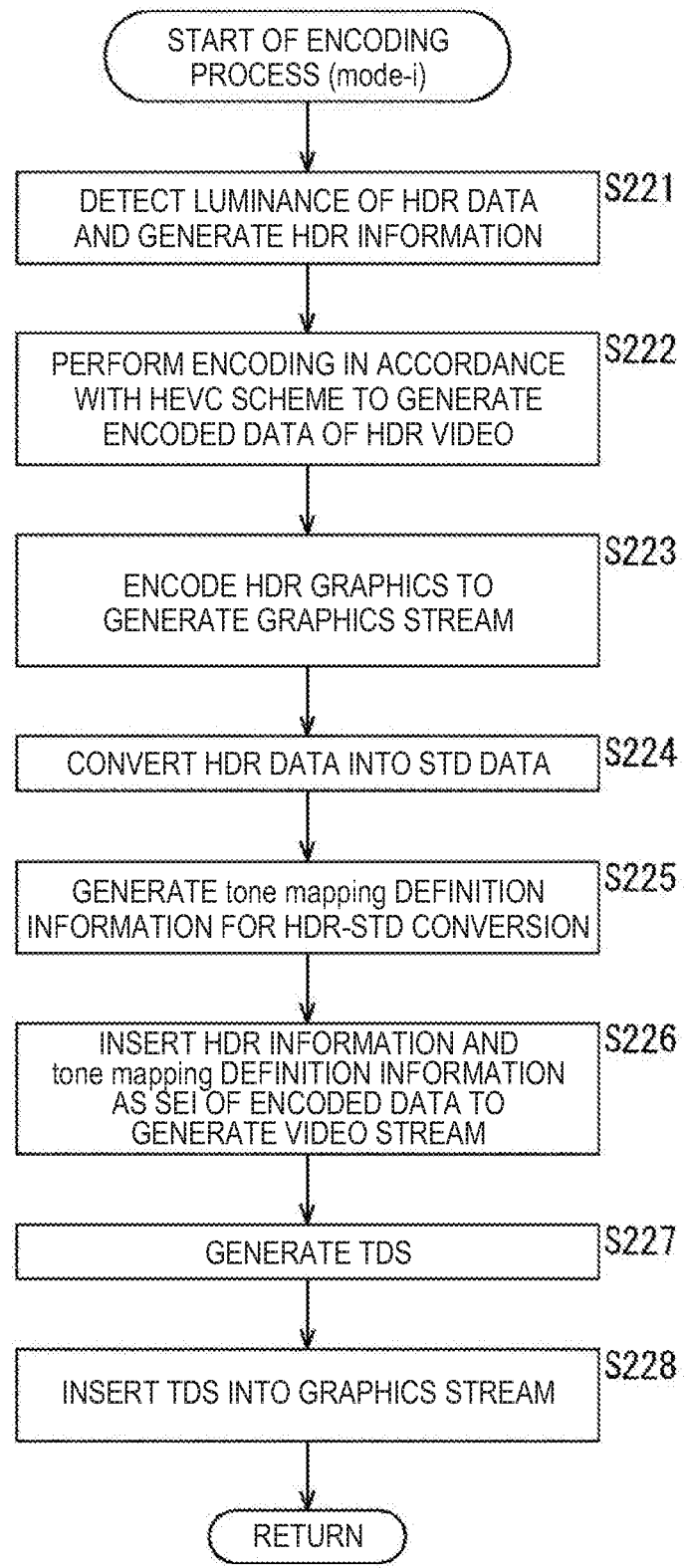
FIG. 55 is a flowchart for describing an encoding process of mode-i in the encoding processing unit in FIG. 52.

FIG. 55 is a flowchart for describing an encoding process of mode-i in the encoding processing unit 22 in FIG. 52.

Since the processes from steps S221 to S225 in FIG. 55 are similar to the processes of steps S11 to S15 in FIG. 29, the description thereof will be omitted. In step S226, the stream generation unit 163 inserts Tone_mapping_info including the HDR information of the video stream generated by the HDR information generation unit 160 and tone_mapping_info which is the tone mapping definition information of the video stream generated by the definition information generation unit 161 as the SEI of the encoded data into the encoded data to generate the video stream.

In step S227, the encoder 162 generates the TDS that includes tone_mapping_info including the HDR information of the graphics stream supplied from the HDR information generation unit 160 and tone_mapping_info which is the tone mapping definition information of the graphics stream supplied from the definition information generation unit 161.

In step S228, the encoder 162 inserts the TDS into the graphics stream and outputs the TDS to the stream generation unit 163. The encoder 162 supplies the number of pieces of tone_mapping_info of the graphics stream and tone_map_id to the controller 21. Then, the process ends.

Figure 56:
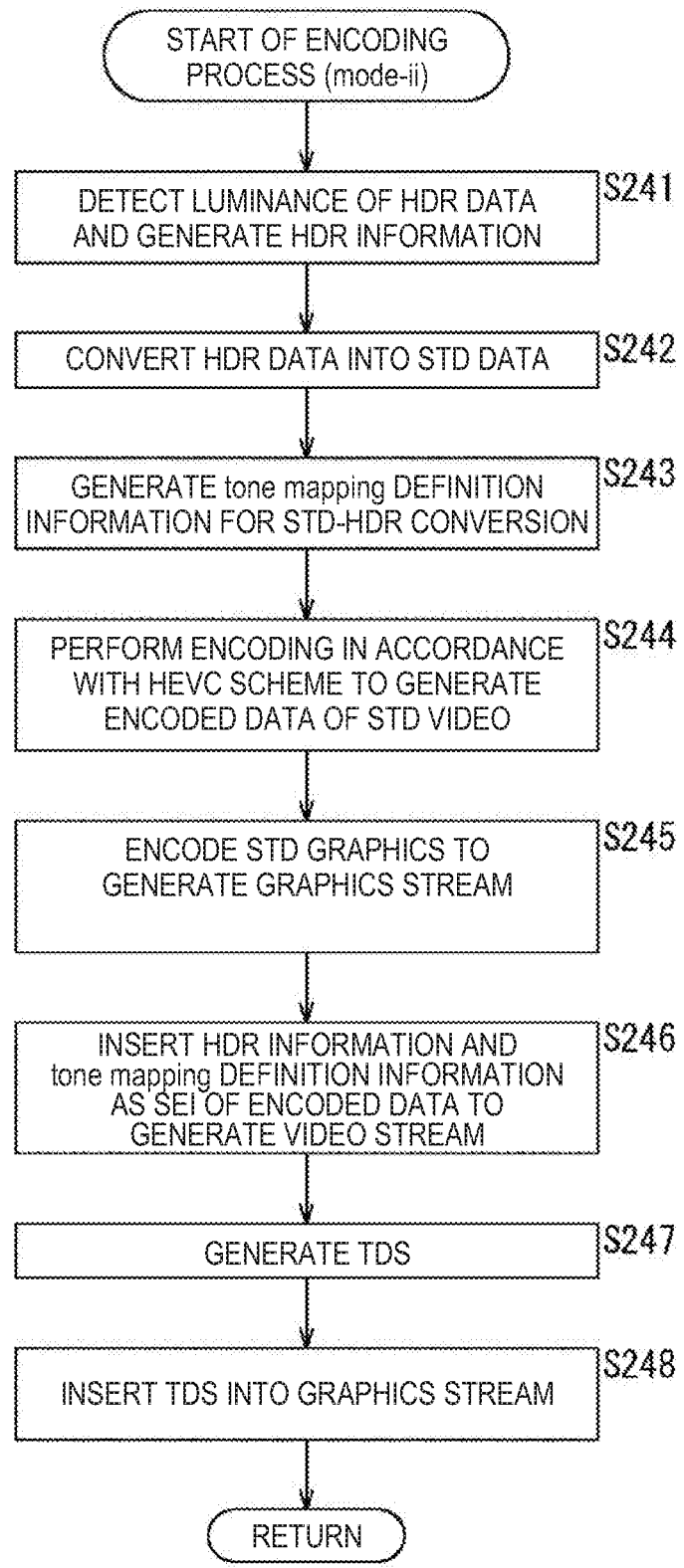
FIG. 56 is a flowchart for describing an encoding process of mode-ii in the encoding processing unit in FIG. 52.

FIG. 56 is a flowchart for describing an encoding process of mode-ii in the encoding processing unit 22 in FIG. 52.

Since the processes of steps S241 to S245 in FIG. 56 are similar to the processes of steps S21 to S25 in FIG. 30 and the processes of steps S246 to S248 are similar to the processes of steps S226 to S228 in FIG. 55, the description thereof will be omitted.

Figure 57:
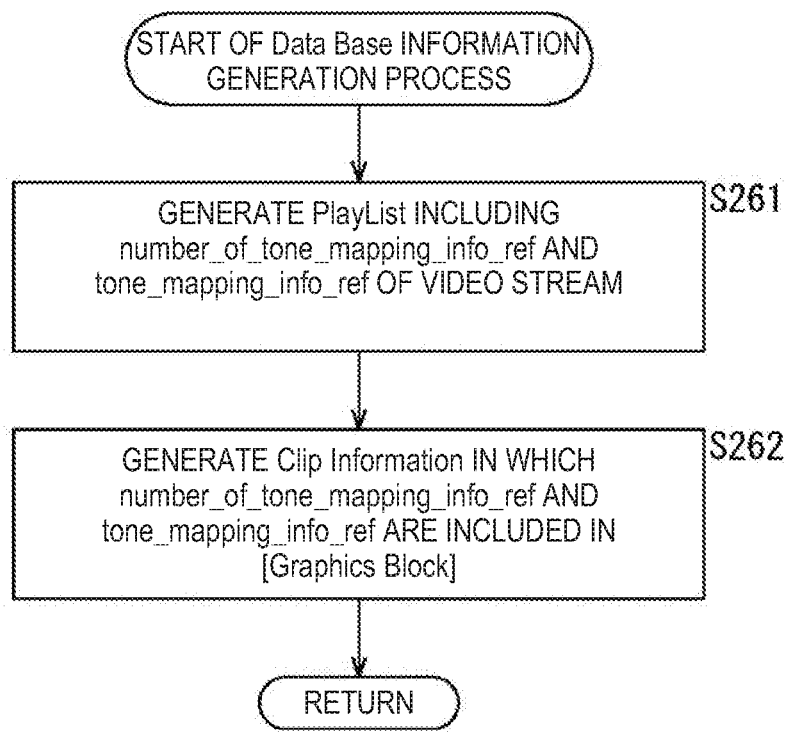
FIG. 57 is a flowchart for describing a Data Base information generation process in the third embodiment.

FIG. 57 is a flowchart for describing a Data Base information generation process of the Data Base information generation unit 21A.

In step S261, the Data Base information generation unit 21A generates PlayList including number_of_tone_mapping_info_ref and tone_mapping_info_ref of the video stream described with reference to FIG. 16. Specifically, the Data Base information generation unit 21A describes the number of pieces of tone_mapping_info of the video stream supplied from the encoding processing unit 22 as number_of_tone_mapping_info_ref in PlayList. The Data Base information generation unit 21A describes tone_map_id of the video stream supplied from the encoding processing unit 22 as tone_mapping_info_ref in PlayList.

In step S262, the Data Base information generation unit 21A generates Clip Information in which number_of_tone_mapping_info_ref and tone_mapping_info_ref are included in [Graphics Block] described with reference to FIGS. 17, 18A, and 18B.

Specifically, the Data Base information generation unit 21A describes the number of pieces of tone_mapping_info of the graphics stream supplied from the encoding processing unit 22 as number_of_tone_mapping_info_ref in [Graphics Block] of Clip Information. The Data Base information generation unit 21A describes tone_map_id of tone_mapping_info of the graphics stream supplied from the encoding processing unit 22 as tone_mapping_info_ref in [Graphics Block] of Clip Information. Clip Information also includes HDR_flag and mode flag.

The recording device 1 records the video stream, the graphics stream, and the Data Base information generated through the foregoing processes on the optical disc 11.

(Reproduction Process)

The reproduction process of the reproduction device 2 according to the third embodiment is similar to the reproduction process in FIG. 32 except for the decoding process of mode-i in step S44 and the decoding process of mode-ii in step S45. Accordingly, only the decoding process of mode-i and the decoding process of mode-ii will be described.

Figure 58:
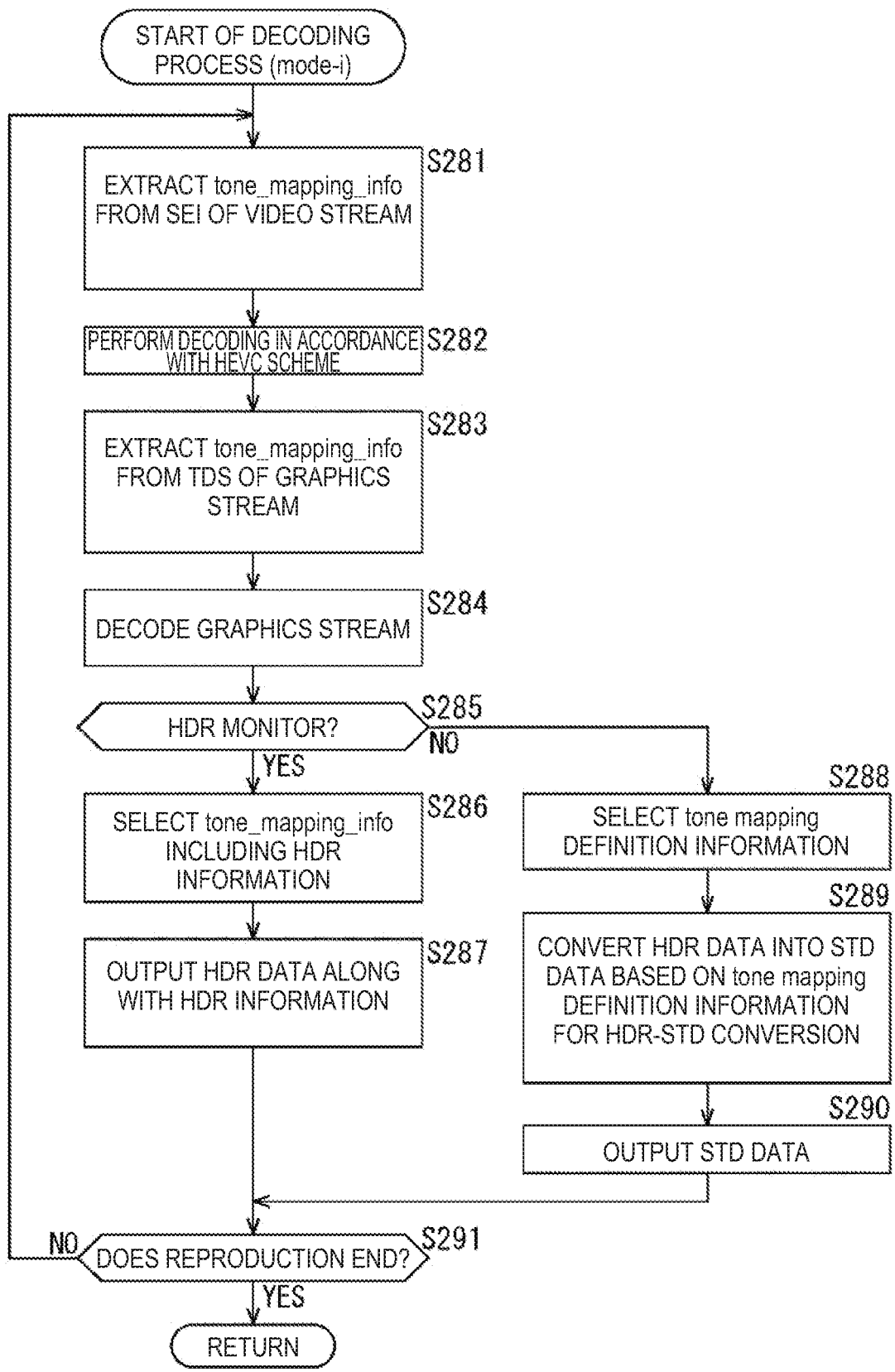
FIG. 58 is a flowchart for describing a decoding process of mode-i in a decoding processing unit in FIG. 53.

FIG. 58 is a flowchart for describing a decoding process of the decoding processing unit 171 in mode-i in FIG. 53.

In step S281, the video decoding processing unit 171A extracts tone_mapping_info from the SEI of the video stream.

In step S282, the video decoding processing unit 171A decodes the encoded data included in the video stream in accordance with the HEVC scheme to generate the HDR video.

In step S283, the graphics decoding processing unit 171B extracts tone_mapping_info from the TDS of the graphics stream. Specifically, in the graphics decoding processing unit 171B, the PID filter 71 extracts the graphics stream and the control data is retained in the composition buffer 181 via the TS buffer 72, the ES buffer 73, and the processor 180. The graphics controller 182 reads the TDS in the control data from the composition buffer 181 and extracts tone_mapping_info from the TDS. The graphics controller 182 supplies the extracted tone_mapping_info to the tone map retention unit 183 and allows the tone map retention unit 183 to retain tone_mapping_info.

The graphics controller 182 supplies tone_mapping_info_ref included in the XPDS in the control data to the tone conversion unit 184.

In step S284, the graphics decoding processing unit 171B decodes the ODS of the graphics stream to generate values of Y, Cr, Cb of the HDR graphics. The values of Y, Cr, and Cb of the HDR graphics are supplied to the tone conversion unit 184.

In step S285, the controller 51 determines whether the monitor included in the display device 3 is the HDR monitor based on the information stored in the register 53A.

When it is determined in step S285 that the monitor included in the display device 3 is the HDR monitor, the process proceeds to step S286.

In step S286, the video decoding processing unit 171A selects tone_mapping_info including tone_mapping_info_ref of the video stream described in PlayList supplied from the controller 51 as tone_map_id and including the HDR information from the extracted tone_mapping_info. The tone conversion unit 184 of the graphics decoding processing unit 171B selects tone_mapping_info including tone_mapping_info_ref supplied from the graphics controller 182 as tone_map_id and including the HDR information from tone_mapping_info retained in the tone map retention unit 183 and reads tone_mapping_info.

In step S287, the video decoding processing unit 171A outputs the HDR video along with the HDR information of the selected video stream. The tone conversion unit 184 outputs the HDR graphics along with the HDR information of the selected graphics stream.

Conversely, when it is determined in step S285 that the monitor included in the display device 3 is not the HDR monitor but the STD monitor, the process proceeds to step S288.

In step S288, the video decoding processing unit 171A selects tone_mapping_info which is the tone mapping definition information including tone_mapping_info_ref of the video stream described in PlayList supplied from the controller 51 as tone_map_id from the extracted tone_mapping_info. The tone conversion unit 184 selects tone_mapping_info which is the tone mapping definition information including tone_mapping_info_ref supplied from the graphics controller 182 as tone_map_id from tone_mapping_info retained in the tone map retention unit 183 and reads tone_mapping_info.

Since the processes from steps S289 to S291 are similar to the processes of steps S68 to S70 in FIG. 33, the description thereof will be omitted.

Figure 59:
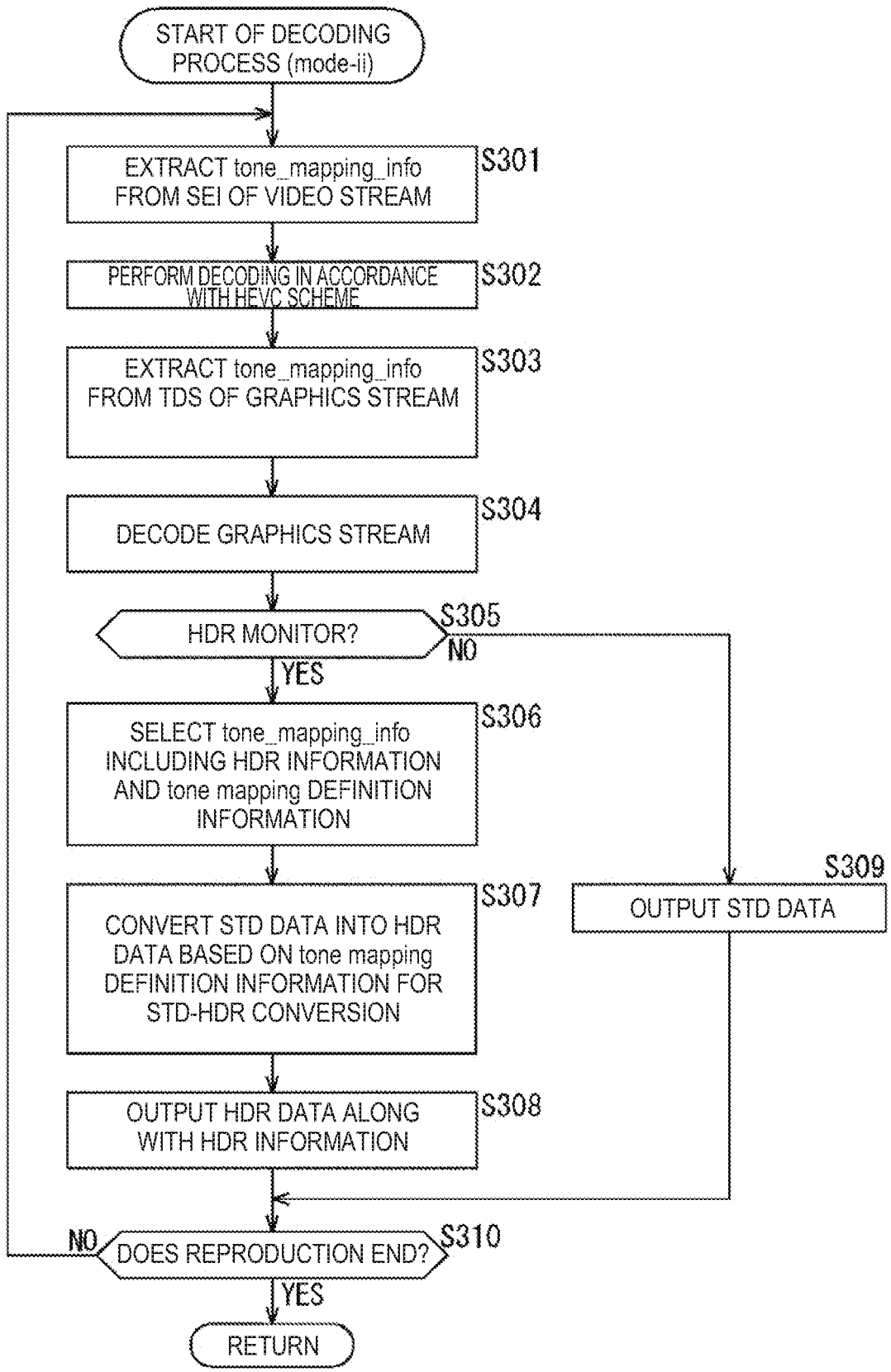
FIG. 59 is a flowchart for describing a decoding process of mode-ii in the decoding processing unit in FIG. 53.

FIG. 59 is a flowchart for describing a decoding process of the decoding processing unit 171 in mode-ii in FIG. 53.

Since the processes from steps S301 to S305 are similar to the processes of steps S281 to S285 in FIG. 58, the description thereof will be omitted.

In step S306, the video decoding processing unit 171A selects tone_mapping_info which is the tone mapping definition information including tone_mapping_info_ref of the video stream described in PlayList supplied from the controller 51 as tone_map_id and includes the HDR information and tone_mapping_info which is the tone mapping definition information from the extracted tone_mapping_info. The tone conversion unit 184 selects tone_mapping_info which is the tone mapping definition information including tone_mapping_info_ref supplied from the graphics controller 182 as tone_map_id and includes the HDR information and tone_mapping_info which is the tone mapping definition information from tone_mapping_info retained in the tone map retention unit 183 and reads tone_mapping_info.

Since the processes from steps S307 to S310 are similar to the processes of steps S86 to S89 in FIG. 34, the description thereof will be omitted.

Fourth Embodiment (BDJ Object)

Figure 60:
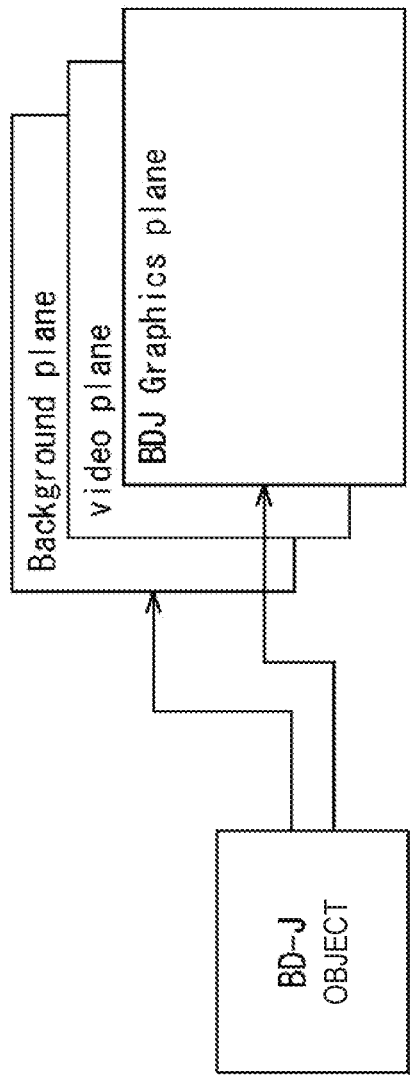
FIG. 60 is a diagram for describing a screen generated based on a BDJ object.

FIG. 60 is a diagram for describing a screen generated based on a BDJ object.

As illustrated in FIG. 60, a screen (hereinafter referred to as a BDJ screen) which can be generated by a command of a BDJ application described in the BDJ object is a screen of graphics and a background image. A screen (BDJ graphics plane) of graphics generated by the BDJ object is displayed on the front side of a screen (video plane) of a video and a screen (background plane) of a background is displayed on the rear side of the screen of the video.

In a fourth embodiment to which the present technology is applied, tone_mapping_info is used when a screen generated by the BDJ object is reproduced.

(tone_mapping_info at Time of Video Reproduction)

Figure 61:
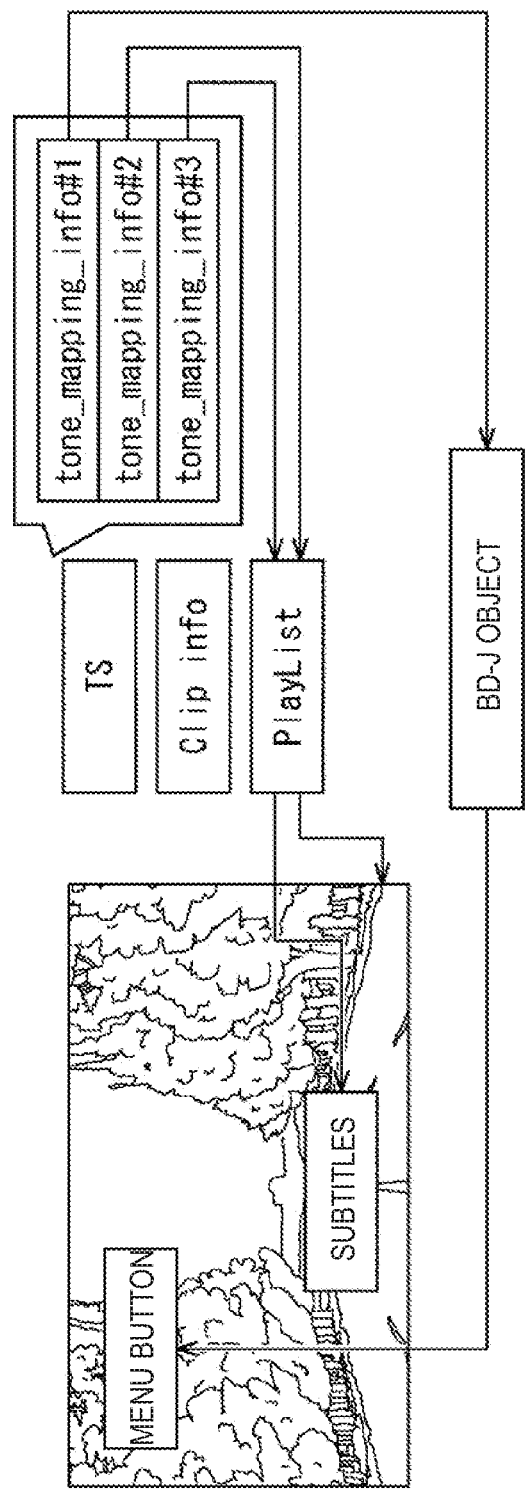
FIG. 61 is a diagram for describing tone_mapping_info at the time of video reproduction in a fourth embodiment to which the present technology is applied.

FIG. 61 is a diagram for describing tone_mapping_info at the time of video reproduction in a fourth embodiment to which the present technology is applied.

In the fourth embodiment, as illustrated in FIG. 61, tone_mapping_info is also disposed in a video stream, as in the first embodiment. In the example of FIG. 61, three pieces of tone_mapping_info #1 to #3 are disposed.

As in the first embodiment, tone_map_id of tone_mapping_info of the video stream or the PG stream is designated in PlayList. In the example of FIG. 61, for example, tone_mapping_info #3 is designated as tone_mapping_info of a video stream of a main video and tone_mapping_info #2 is designated as tone_mapping_info of the PG stream. When tone_mapping_info is disposed in the video stream in this way and the video stream is reproduced according to PlayList by the command of the BDJ object, tone_mapping_info of the BDJ screen can be acquired from the video stream.

Accordingly, tone_mapping_info of the BDJ screen at the time of video reproduction is inserted into the video stream and is designated by tone_map_id for identifying tone_mapping_info in the BDJ object. In the example of FIG. 61, 1 is designated as tone_map_id of tone_mapping_info of the BDJ screen and tone_mapping_info #1 is used when the BDJ screen is reproduced.

FIG. 62 is a diagram illustrating an example of a command to designate tone_mapping_info for identifying tone_mapping_info of the BDJ screen inserted into the video stream described in the BDJ object.

A line number and a colon (:) on the left side of FIG. 62 are shown for convenience of the description and are not included in the command. This is similar to FIG. 64 to be described below.

In the example of FIG. 62, as illustrated in the 4th line, 1 and 2 are designated as tone_map_id of tone_mapping_info of the BDJ screen.

(tone_mapping_info at Time of Video Stop)

Figure 63:
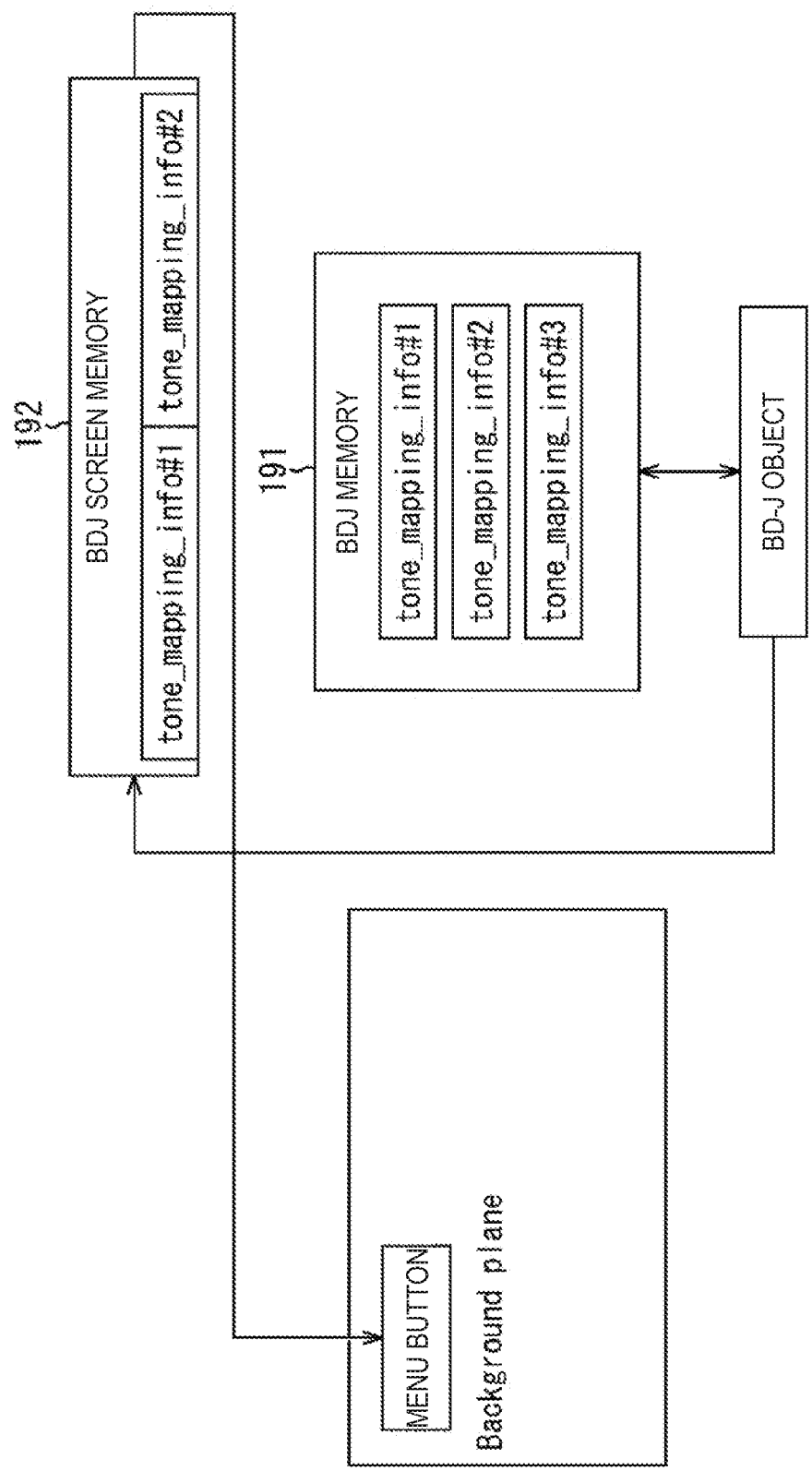
FIG. 63 is a diagram for describing tone_mapping_info at the time of video stop in the fourth embodiment to which the present technology is applied.

FIG. 63 is a diagram for describing tone_mapping_info at the time of video stop in the fourth embodiment to which the present technology is applied.

When tone_mapping_info is disposed in the video stream as in the first embodiment, tone_mapping_info of the BDJ screen cannot be acquired from the video stream at the time of the video stop. Accordingly, a command to generate tone_mapping_info of the BDJ screen at the time of the video stop and a command to designate tone_map_id for identifying tone_mapping_info of a reproduction target BDJ screen in tone_mapping_info are described in the BDJ object.

In the example of FIG. 63, commands to generate the pieces of tone_mapping_info #1 to #3 are described in the BDJ object. In the reproduction device 2, the pieces of tone_mapping_info #1 to #3 are generated according to the commands and are retained in a BDJ memory 191 which is a memory for the BDJ object in the reproduction device 2.

In the example of FIG. 63, the commands to designate 1 and 2 as tone_map_id of tone_mapping_info of the reproduction target BDJ screen are described in the BDJ object. In the reproduction device 2, tone_mapping_info #1 and tone_mapping_info #2 are retained in the BDJ screen memory 192 which is the memory for the BDJ screen in the reproduction device 2 according to the commands. Then, when the reproduction target BDJ screen is reproduced, tone_mapping_info #1 and tone_mapping_info #2 are used.

FIG. 64 is a diagram illustrating examples of a command to generate tone_mapping_info of a BDJ screen at the time of the video stop which is described in the BDJ object and a command to designate tone_map_id for identifying tone_mapping_info of the reproduction target BDJ screen in tone_mapping_info.

Commands in the 2nd to 8th lines of FIG. 64 are commands to generate tone_mapping_info of tone_map_model_id=0 and tone_map_model_id=4 as tone_mapping_info of the BDJ screen at the time of the video stop.

Commands in the 9th to 12th lines are commands to designate tone_map_id of the generated tone_mapping_info as tone_map_id of tone_mapping_info of the reproduction target BDJ screen.

FIGS. 65 and 66 are diagrams illustrating the class structure of the BDJ application necessary to execute the commands in FIGS. 62 and 64.

In FIG. 65, org.blurayx.hdr.ToneMapControl is a class in which tone_mapping_info of the screen of the graphics generated by the BDJ object is set. Further, org.blurayx.hdr.BackgroundToneMapControl is a class in which tone_mapping_info of the screen of the background generated by the BDJ object is set. Further, org.blurayx.hdr.ToneMapFactory is a class in which tone_mapping_info is generated.

In FIG. 66, org.blurayx.hdr.ToneMap is a class in which common information to models of all the tone maps is described in tone_mapping_info. Further, org.blurayx.hdr.ToneMapLinear is a class in which tone_map_model_id=0 is described. Further, org.blurayx.hdr.ToneMapSigmoidal is a class in which tone_map_model_id=1 is described. Further, org.blurayx.hdr.ToneMapUserDefinedTable is a class in which tone_map_model_id=2 is described.

Here, org.blurayx.hdr.ToneMapPieceWiseLinear is a class in which tone_map_model_id=3 is described. Further, org.blurayx.hdr.ToneMapLuminanceDynamicRangeInfo is a class in which tone_map_model_id=4 is described.

(Configuration of Recording Device 1)

FIG. 67 is a diagram illustrating a configuration example of the recording device 1 of the fourth embodiment of the recording and reproduction system to which the present technology is applied.

The recording device 1 in FIG. 67 is configured to include a controller 201, an encoding processing unit 202, and a disc drive 203. A master HDR video is input to the encoding processing unit 202.

The controller 201 is configured to include a CPU, a ROM, and a RAM. The controller 201 executes a predetermined program to control an operation of the entire recording device 1.

In the controller 201, a predetermined program is executed to realize a Data Base information generation unit 201A and a BDJ object generation unit 201B. The Data Base information generation unit 201A describes the number of pieces of tone_mapping_info of the video stream supplied from the encoding processing unit 202 as number_of_tone_mapping_info_ref of the video stream of the main video of PlayList and describes tone_map_id as tone_mapping_info_ref.

Further, the Data Base information generation unit 201A describes the number of pieces of tone_mapping_info inserted into the video stream supplied from the encoding processing unit 202 as number_of_tone_mapping_info_ref of [Video Block] of Clip Information and describes tone_map_id in tone_mapping_info_ref. The Data Base information generation unit 201A generates PlayList and Clip Information which are Data Base information by describing the various kinds of information, as described above, and outputs PlayList and Clip Information to the disc drive 203.

The BDJ object generation unit 201B generates a BDJ object in which a reproduction command to reproduce an AV stream according to the BDJ screen or the play list is described. The BDJ object generation unit 201B generates the tone mapping definition information and the HDR information of the BDJ screen at the time of the video reproduction, as necessary, and supplies the tone mapping definition information and the HDR information to the encoding processing unit 202. The BDJ object generation unit 201B acquires tone_map_id of tone_mapping_info of the BDJ screen supplied from the encoding processing unit 202 at the time of the video reproduction.

The BDJ object generation unit 201B further describes a command to designate the acquired tone_map_id in the BDJ object, as described with reference to FIG. 62. The BDJ object generation unit 201B generates tone_mapping_info which is the tone mapping definition information of the BDJ screen at the time of the video stop and tone_mapping_info including the HDR information.

The BDJ object generation unit 201B further describes a command to generate tone_mapping_info of the BDJ screen at the time of the video stop and a command to designate tone_map_id of tone_mapping_info in the BDJ object, as described with reference to FIG. 63. The BDJ object generation unit 201B outputs the BDJ object to the disc drive 203.

The encoding processing unit 202 assigns tone_map_id to tone_mapping_info supplied from the controller 201. The encoding processing unit 202 encodes the master HDR video. The encoding processing unit 202 inserts tone_mapping_info supplied from the controller 201 and tone_mapping_info of the video stream as the SEI into the encoded data obtained by encoding the master HDR video and outputs the encoded data to the disc drive 203. The encoding processing unit 202 supplies the controller 201 with tone_map_id and the number of pieces of tone_mapping_info of the video stream and tone_map_id assigned to tone_mapping_info of the BDJ screen at the time of the video reproduction.

The disc drive 203 records PlayList, Clip Information, and the BDJ object supplied from the controller 201 and a file in which the video stream supplied from the encoding processing unit 202 is stored on the optical disc 11 according to the directory structure in FIG. 15.

(Configuration of Encoding Processing Unit 202)

FIG. 68 is a block diagram illustrating a configuration example of the encoding processing unit 202 in FIG. 67.

The configuration of the encoding processing unit 202 in FIG. 68 is different from the configuration of the encoding processing unit 22 in FIG. 22 in that an HDR information generation unit 211, an HDR-STD conversion unit 212, and a stream generation unit 213 are provided instead of the HDR information generation unit 31, the HDR-STD conversion unit 33, and the stream generation unit 36 and the encoder 35 is not provided.

The HDR information generation unit 211 detects luminance of the input master HDR video and generates HDR information including each piece of information described with reference to FIG. 12. The HDR information generation unit 211 outputs the generated HDR information to the stream generation unit 213.

The HDR-STD conversion unit 212 converts the input master HDR video into the STD video. The conversion performed by the HDR-STD conversion unit 212 is appropriately performed according to conversion parameters input by the author. The HDR-STD conversion unit 212 outputs, to the definition information generation unit 34, information indicating a correspondence relation between input data and output data in which RGB signals of the HDR video are set as the input data and RGB signals of the STD video are set as the output data.

When the recording mode is mode-ii, the HDR-STD conversion unit 212 outputs the STD video obtained by converting the HDR video to the HEVC encoder 32.

The stream generation unit 213 supplies the number of pieces of tone_mapping_info including the HDR information supplied from the HDR information generation unit 211 and the number of pieces of tone_mapping_info which is the tone mapping definition information supplied from the definition information generation unit 34 as the number of pieces of tone_mapping_info of the video stream to the controller 201 in FIG. 67. The stream generation unit 213 supplies the controller 201 with tone_map_id of tone_mapping_info as tone_map_id of the video stream.

The stream generation unit 213 generates tone_mapping_info which is the tone mapping definition information of the BDJ screen at the time of the video reproduction which is supplied from the controller 201 and tone_mapping_info including the HDR information. The stream generation unit 213 supplies the controller 201 with tone_map_id of the generated tone_mapping_info.

The stream generation unit 213 supplies the controller 201 with the video stream, and tone_map_id and the number of pieces of tone_mapping_info of the BDJ screen at the time of the video reproduction as tone_map_id and the number of pieces of tone_mapping_info inserted into the video stream. The stream generation unit 213 inserts the video stream and tone_mapping_info of the BDJ screen at the time of the video reproduction as the SEI into the encoded data to generate the video stream. The stream generation unit 213 outputs the generated video stream to the disc drive 203 in FIG. 67.

(Configuration of Reproduction Device 2)

Figure 69:
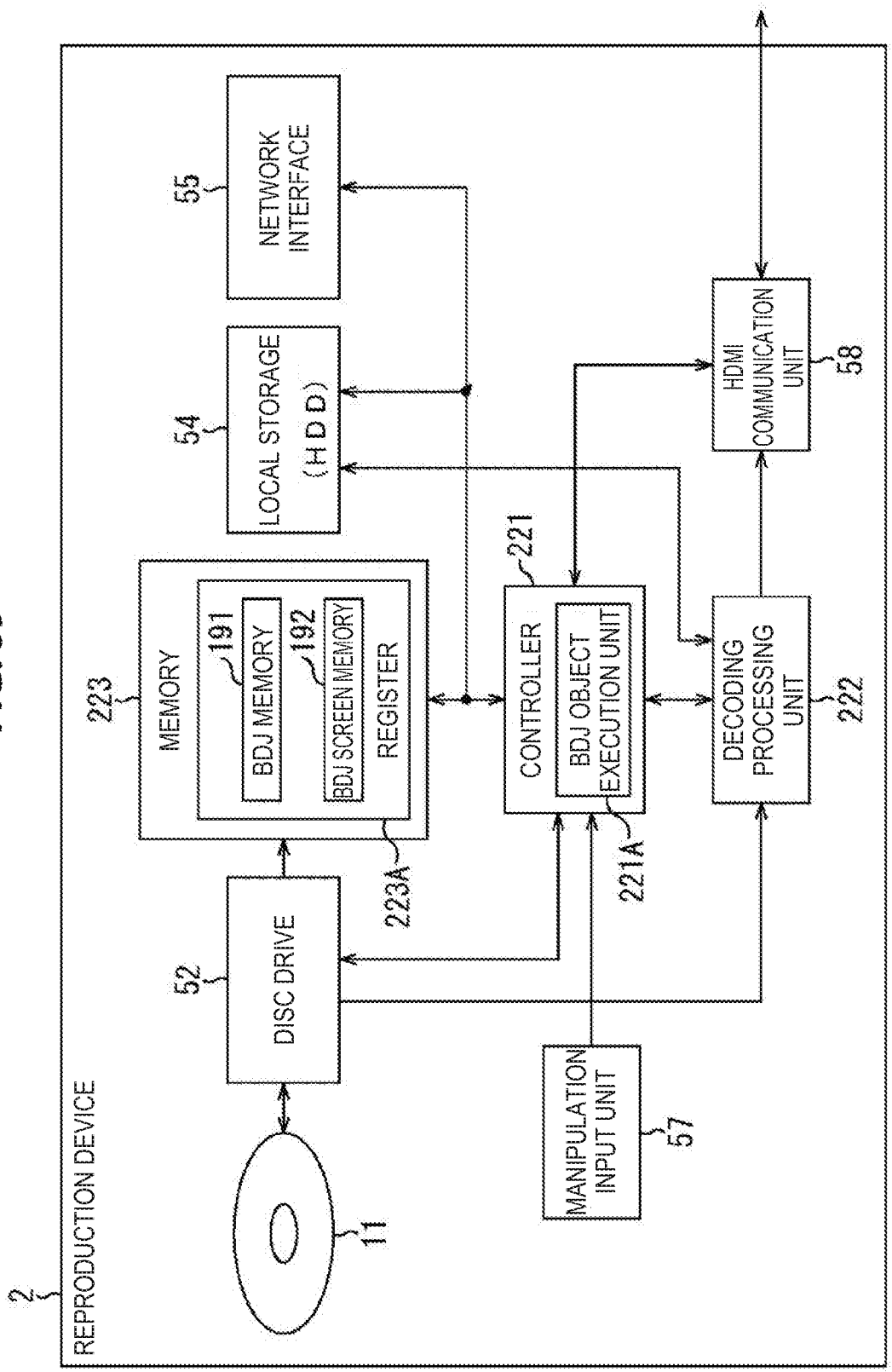
FIG. 69 is a block diagram illustrating a configuration example of the fourth embodiment of a reproduction device 2 to which the present technology is applied.

FIG. 69 is a block diagram illustrating a configuration example of the fourth embodiment of a reproduction device 2 to which the present technology is applied.

The configuration of the reproduction device 2 in FIG. 69 is different from the configuration in FIG. 25 in that a controller 221, a decoding processing unit 222, and a memory 223 are provided instead of the controller 51, the decoding processing unit 56, and the memory 53.

The controller 221 is configured to include a CPU, a ROM, and a RAM. The controller 221 executes a predetermined program to control an operation of the entire reproduction device 2. For example, the controller 221 supplies the decoding processing unit 222 with tone_mapping_info_ref of the video stream described in PlayList supplied from the disc drive 52.

In the controller 221, a BDJ object execution unit 221A is realized by executing a BDJ object supplied from the disc drive 52. The BDJ object execution unit 221A generates a BDJ screen of an HDR (hereinafter referred to as an HDR screen) or a BDJ screen of an STD (hereinafter referred to as an STD screen) according to the reproduction command. At the time of the video reproduction, the BDJ object execution unit 221A acquires tone_mapping_info of tone_map_id designated by the command from the decoding processing unit 222.

The BDJ object execution unit 221A converts the generated HDR screen or STD screen into the STD screen or the HDR screen with reference to the tone_mapping_info definition information which is the acquired tone_mapping_info and supplies the STD screen or the HDR screen to the HDMI communication unit 58, as necessary. When the HDR screen is output, the BDJ object execution unit 221A outputs the HDR information included in the acquired tone_mapping_info to the HDMI communication unit 58 along with the HDR screen.

On the other hand, at the time of the video stop, the BDJ object execution unit 221A generates tone_mapping_info of the BDJ screen according to the command, supplies tone_mapping_info to the memory 223, and retains tone_mapping_info in the BDJ memory 191. The BDJ object execution unit 221A selects tone_mapping_info of tone_map_id from tone_mapping_info retained in the memory 223 based on tone_map_id of tone_mapping_info of the reproduction target BDJ screen designated by the command and retains tone_mapping_info in the BDJ screen memory 192.

The BDJ object execution unit 221A reads tone_mapping_info from the BDJ screen memory 192, as necessary. The BDJ object execution unit 221A converts the generated HDR screen or STD screen into the STD screen or the HDR screen with reference to the tone_mapping_info definition information which is the read tone_mapping_info and supplies the STD screen or the HDR screen to the HDMI communication unit 58, as necessary. When the HDR screen is output, the BDJ object execution unit 221A outputs the HDR information included in the read tone_mapping_info to the HDMI communication unit 58 along with the HDR screen.

The decoding processing unit 222 extracts tone_mapping_info from the SEI of the video stream supplied from the disc drive 52. The decoding processing unit 222 supplies the BDJ object execution unit 221A with tone_mapping_info of predetermined tone_map_id in the extracted tone_mapping_info in response to a request from the BDJ object execution unit 221A.

The decoding processing unit 222 decodes the encoded data included in the video stream in accordance with the HEVC scheme. The decoding processing unit 222 selects tone_mapping_info_ref of the video stream based on tone_mapping_info_ref of the video stream supplied from the controller 221. The video decoding processing unit 222A converts the HDR video or the STD video obtained as the decoding result into the STD video or the HDR video with reference to the tone mapping definition information which is the selected tone_mapping_info and outputs the STD video or the HDR video to the HDMI communication unit 58, as necessary. When the video decoding processing unit 222A outputs the HDR video, the video decoding processing unit 56A outputs the HDR information included in the selected tone_mapping_info to the HDMI communication unit 58 along with the HDR video.

The memory 223 stores data or the like necessary for the controller 221 to perform various processes. In the memory 223, a register 223A which is a PSR is formed. The register 223A stores various kinds of information referred to at the time of reproduction of the optical disc 11 by the reproduction device 2 which is a BD player. The register 223A forms, for example, the BDJ memory 191 and the BDJ screen memory 192. The BDJ memory 191 retains tone_mapping_info supplied from the BDJ object execution unit 221A. The BDJ screen memory 192 retains tone_mapping_info selected by the BDJ object execution unit 221A in tone_mapping_info retained in the BDJ memory 191.

(Recording Process)

Figure 70:
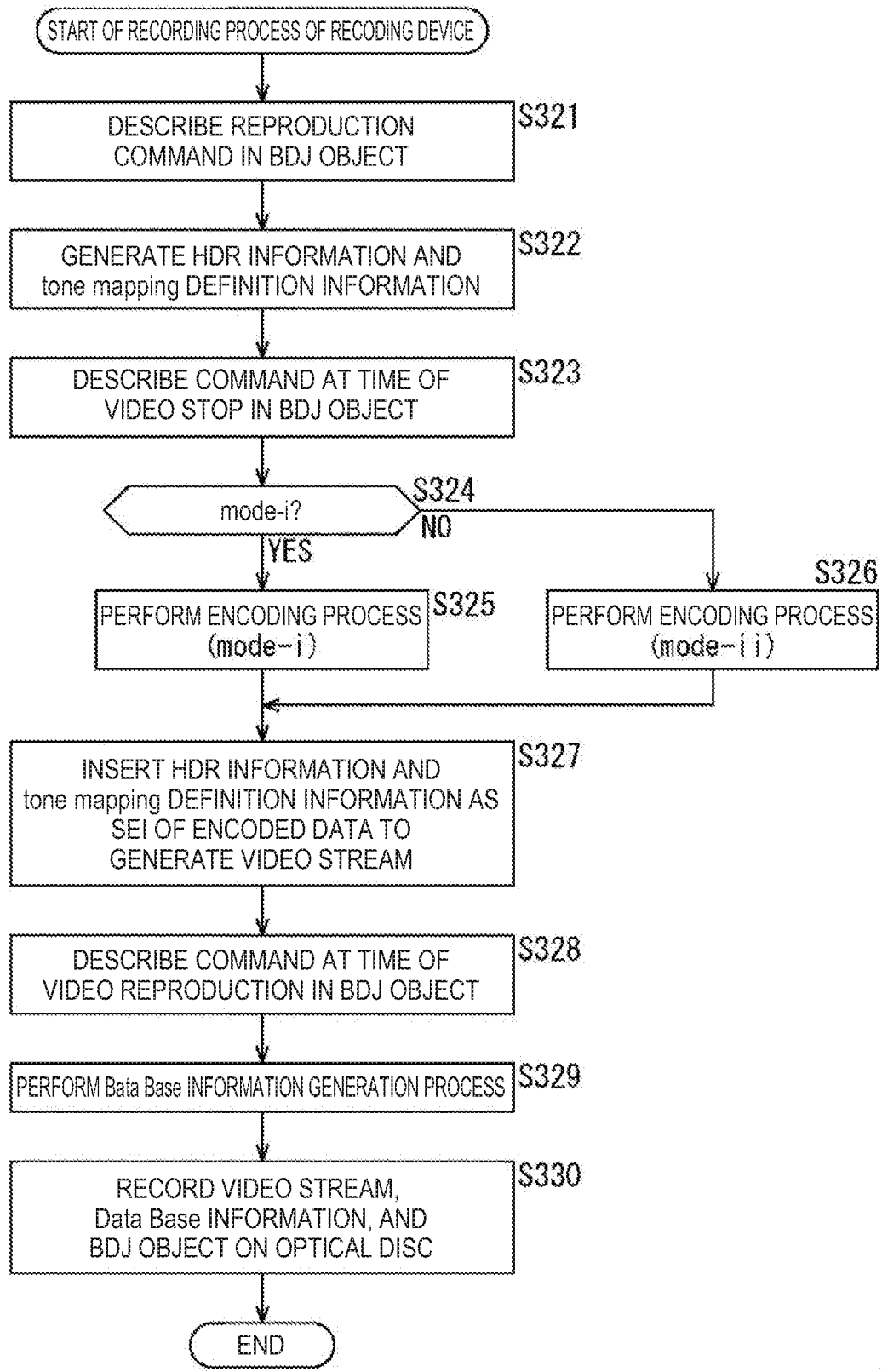
FIG. 70 is a flowchart for describing a recording process of the recording device in FIG. 67.

FIG. 70 is a flowchart for describing a recording process of the recording device 1 in FIG. 67. The recording process starts when the master HDR video is input to the recording device 1.

In step S321, the BDJ object generation unit 201B of the recording device 1 describes the reproduction command in the BDJ object.

In step S322, the BDJ object generation unit 201B generates the HDR information and the tone mapping definition information at the time of the video reproduction and the video stop on the BDJ screen. The BDJ object generation unit 201B supplies the HDR information and the tone mapping definition information at the time of the video reproduction to the encoding processing unit 202.

In step S323, the BDJ object generation unit 201B describes the commands to generate tone_mapping_info including the HDR information at the time of the video stop and tone_mapping_info which is the tone mapping definition information and the command to designate tone_map_id of tone_mapping_info in the BDJ object.

In step S324, the controller 201 determines whether the recording mode is mode-i. The recording mode is set by, for example, an author.

When it is determined in step S324 that the recording mode is mode-i, the encoding processing unit 202 performs the encoding process of mode-i in step S325. Specifically, the encoding processing unit 202 performs the processes of steps S11, S12, S14, and S15 in FIG. 29 on the video. Then, the process proceeds to step S327.

On the other hand, when it is determined in step S324 that the recording mode is mode-ii, the encoding processing unit 202 performs the encoding process of mode-ii in step S326. Specifically, the encoding processing unit 202 performs the processes of steps S21 to S24 in FIG. 30 on the video. Then, the process proceeds to step S327.

In step S327, the stream generation unit 213 of the encoding processing unit 202 inserts tone_mapping_info including the HDR information generated by the HDR information generation unit 211 and tone_mapping_info which is the tone mapping definition information generated by the definition information generation unit 34 as the SEI of the encoded data into the encoded data. The stream generation unit 213 generates tone_mapping_info which is the tone mapping definition information of the BDJ screen at the time of the video reproduction which is supplied from the controller 201 and tone_mapping_info including the HDR information. The stream generation unit 213 supplies the controller 201 with tone_map_id of the generated tone_mapping_info, and inserts them as the SEI of the encoded data into the encoded data As described above, the stream generation unit 213 generates a video stream in which tone_mapping_info is inserted into the encoded data. The stream generation unit 213 supplies the video stream to the disc drive 23. The stream generation unit 213 supplies the controller 201 with tone_map_id of tone_mapping_info including the HDR information at the time of the video reproduction and tone_mapping_info which is the tone mapping definition information.

The stream generation unit 213 supplies the controller 201 with tone_map_id and the number of pieces of tone_mapping_info of the video stream and tone_map_id and the number of pieces of tone_mapping_info inserted into the video stream.

In step S328, the BDJ object generation unit 201B describes the command to designate tone_map_id of tone_mapping_info at the time of the video reproduction which is supplied from the stream generation unit 213 in the BDJ object.

In step S329, the Data Base information generation unit 201A performs the Data Base information generation process. Specifically, the Data Base information generation unit 201A performs the processes of steps S31 and S32 of FIG. 31 on the video. Clip Information and the PlayList file generated through the Data Base information generation process are supplied to the disc drive 203.

In step S330, the disc drive 23 records the file in which the video stream, the Data Base information, and the BDJ object are stored on the optical disc 11. Thereafter, the process ends.

(Reproduction Process)

Since the process of reproducing the video stream in the reproduction device 2 in FIG. 69 is similar to the process on the video in the reproduction process of FIG. 32, the description thereof will be omitted. This process is performed in response to the reproduction command to reproduce the video stream according to the play list described in the BDJ object.

Figure 71:
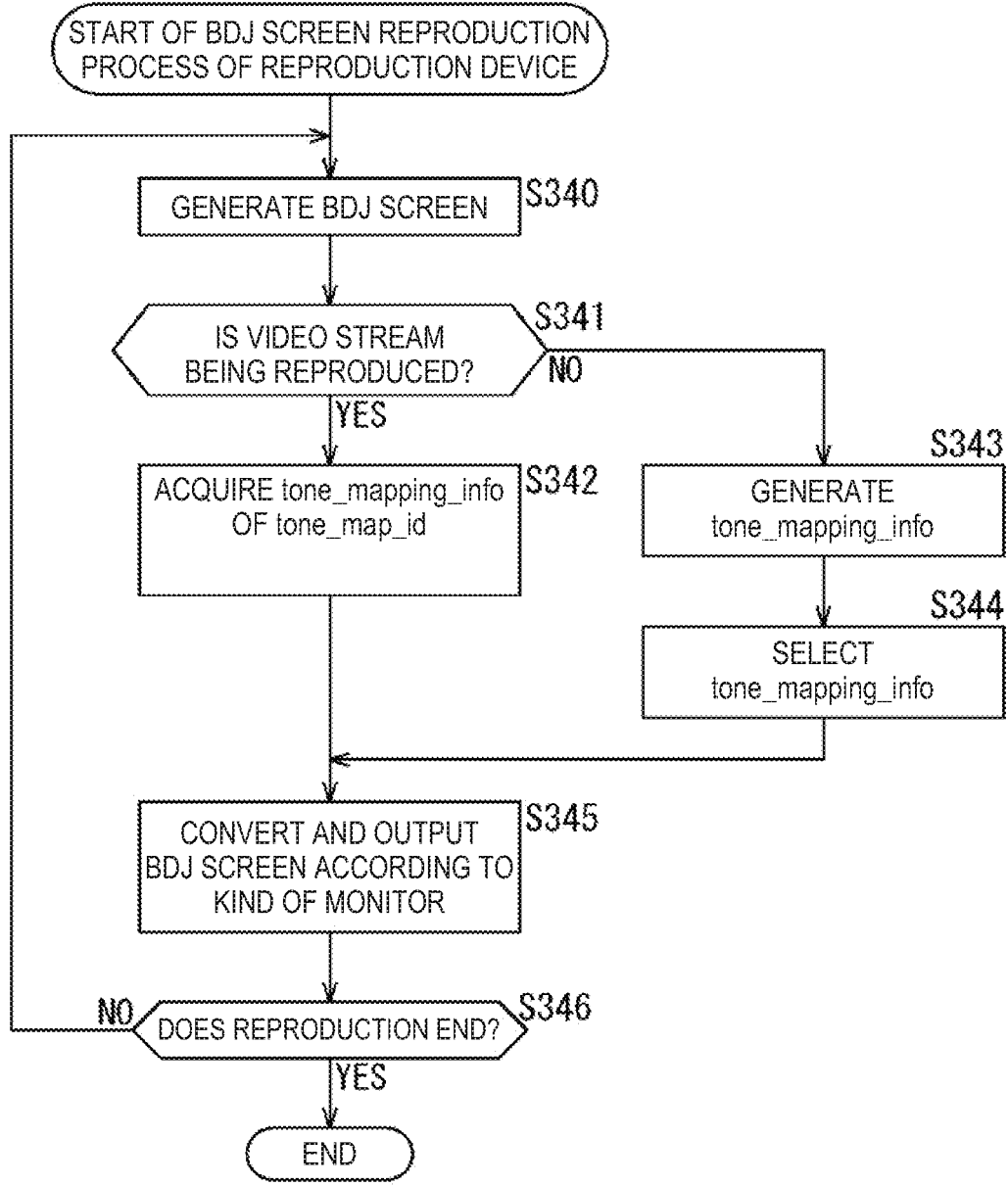
FIG. 71 is a flowchart for describing a BDJ screen reproduction process of the reproduction device in FIG. 69.

FIG. 71 is a flowchart for describing a BDJ screen reproduction process of the reproduction device 2 in FIG. 69.

In Step S340, the BDJ object execution unit 221A generates the BDJ screen in response to the reproduction command to reproduce the BDJ screen.

In step S341, the BDJ object execution unit 221A determines whether the video stream is being reproduced. When it is determined in step S341 that the video stream is being reproduced, the process proceeds to step S342.

In step S342, the BDJ object execution unit 221A selects and acquires tone_mapping_info of tone_map_id designated by the command described in the BDJ object from tone_mapping_info extracted from the SEI by the decoding processing unit 222. Then, the process proceeds to step S345.

When it is determined in step S341 that the video stream is being reproduced, the process proceeds to step S343. In step S343, the BDJ object execution unit 221A generates tone_mapping_info including the HDR information and tone_mapping_info which is the tone mapping definition information in response to the command described in the BDJ object and allows the BDJ memory 191 to retain tone_mapping_info.

In step S344, the BDJ object execution unit 221A selects tone_mapping_info of tone_map_id designated by the command described in the BDJ object from tone_mapping_info retained in the BDJ memory 191 and allows the BDJ screen memory 192 to retain tone_mapping_info. The BDJ object execution unit 221A reads tone_mapping_info retained in the BDJ screen memory 192 and the process proceeds to step S345.

In step S345, when the monitor is the HDR monitor despite tone_mapping_info according to the kind of monitor included in the display device 3 and the BDJ screen generated in step S340 is the STD screen or the monitor is the STD monitor and the generated BDJ screen is the HDR screen, the BDJ object execution unit 221A performs the conversion to the HDR screen or the STD screen with reference to the tone mapping definition information.

On the other hand, when the monitor is the HDR monitor despite tone_mapping_info and the BDJ screen generated in step S340 is the HDR screen or the monitor is the STD monitor and the generated BDJ screen is the STD screen, the BDJ object execution unit 221A does not perform the conversion of the BDJ screen.

The BDJ object execution unit 221A supplies the HDMI communication unit 58 with the converted HDR screen or STD screen or the unconverted HDR screen or STD screen. When the monitor is the HDR monitor, the BDJ object execution unit 221A supplies the HDMI communication unit 58 with the HDR information included in tone_mapping_info.

In step S346, the controller 221 determines whether the reproduction ends.

When it is determined in step S346 that the reproduction does not end, the process returns to step S340 and the controller 221 repeatedly performs the foregoing processes. When it is determined in step S346 that the reproduction ends, the process ends.

Fifth Embodiment (Configuration of Computer)

The above-described series of processing may be performed by hardware or may be performed by software. When the series of processing is performed by software, a program forming the software is installed into a computer that is incorporated in a dedicated hardware, or installed from a program storage medium into a general-purpose personal computer.

Figure 72:
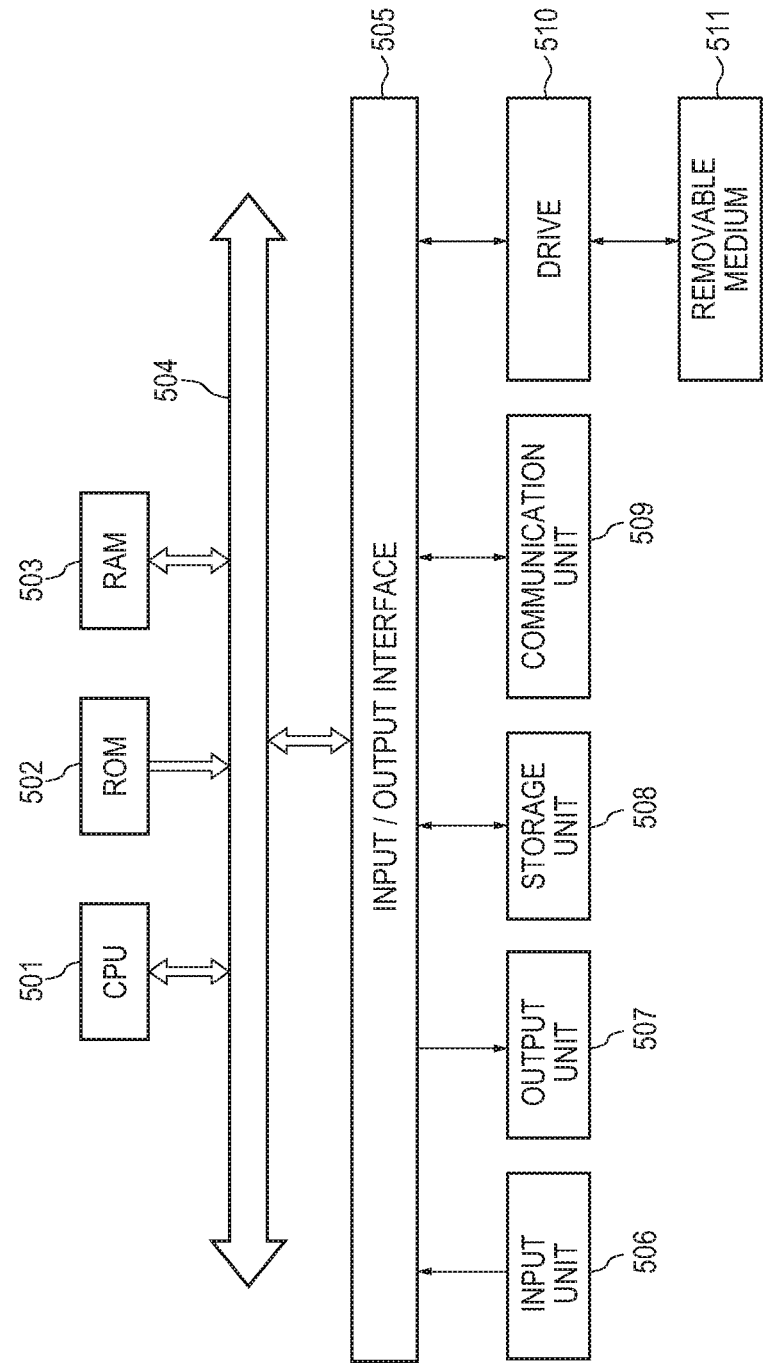
FIG. 72 is a block diagram illustrating a configuration example of a computer.

FIG. 72 is a block diagram showing a hardware configuration example of a computer that performs the above-described series of processing using a program.

The CPU 501, the ROM 502 and the RAM 503 are mutually connected via a bus 504.

Further, an input/output interface 505 is connected to the bus 504. Connected to the input/output interface 505 are an input unit 506 formed by a keyboard, a mouse, a microphone and the like, an output unit 507 formed by a display, a speaker and the like, a storage unit 508 formed by a hard disk, a nonvolatile memory and the like, a communication unit 509 formed by a network interface and the like, and a drive 510 that activates a removable medium 511.

In the computer configured as described above, the CPU 501 loads a program that is stored, for example, in the storage unit 508 onto the RAM 503 via the input/output interface 505 and the bus 504, and executes the program. Thus, the above-described series of processing is performed.

Programs to be executed by the CPU 501 may be recorded in the removable medium 511, or may be provided via a wired or wireless transmission medium, such as a local area network, the Internet or digital satellite broadcasting, and may be installed to the Storage medium 533

It should be noted that the program executed by a computer may be a program that is processed in time series according to the sequence described in this specification or a program that is processed in parallel or at necessary timing such as upon calling.

The embodiment of the present technology is not limited to the above-described embodiment, and various modifications are possible insofar as they do not depart from the essence of the present technology.

For example, HDR_flag and mode_flag may be set independently in a video and graphics. Further, when HDR_flag and mode_flag are fixed in advance, HDR_flag and mode_flag may not be recorded on the optical disc 11. The reproduction device 2 may not transmit the HDR information to the display device 3 even when the HDR data is transmitted to the display device 3. The reproduction device 2 may be configured by a mobile terminal.

In the present specification, a system means a collective of a plurality of constituent elements (devices, modules (components), or the like) and all of the constituent elements may not be present in the same casing. Accordingly, a plurality of devices accommodated in separate casings and connected via networks and a single device in which a plurality of modules are accommodated in a single casing are all systems.

The present technology can also be applied to a recording and reproduction system in which Moving Picture Experts Group phase 4 (MPEG4) is adopted as the encoding scheme.

Additionally, the present technology may also be configured as below.

(1)

A reproduction device including:
a reading unit configured to read association information, extended graphics, HDR information, and luminance conversion definition information from a recording medium having recorded therein the association information which associates the extended graphics, which are graphics having a second luminance range different from and broader than a first luminance range, with the HDR information indicating a luminance characteristic of the extended graphics, and the luminance conversion definition information used when luminance conversion from the extended graphics to standard graphics which are graphics having the first luminance range is performed, the extended graphics, the HDR information, and the luminance conversion definition information; a conversion unit configured to convert the extended graphics into the standard graphics based on the luminance conversion definition information associated with the extended graphics in the association information; and
an output unit configured to output the extended graphics and the HDR information associated with the extended graphics in the association information to a display device which is capable of displaying the extended graphics, and to output the standard graphics converted by the conversion unit to a display device which is not capable of displaying the extended graphics.

(2)

The reproduction device according to (1),
wherein the association information is included in information regarding reproduction of the extended graphics.

(3)

The reproduction device according to (2),
wherein the recording medium is a Blu-ray disc, and the association information is included in a PlayList file as the information regarding the reproduction.

(4)

The reproduction device according to any of (1) to (3),
wherein the luminance conversion definition information is first tone_mapping_info in which one value among 0, 2, and 3 is set as a value of tone_map_model_id, and
the HDR information is second tone_mapping_info in which 4 is set as the value of tone_map_model_id.

(5)

The reproduction device according to (4),
wherein the association information is information associating the extended graphics with tone_map_id of the first tone_mapping_info and tone_map_id of the second tone_mapping_info of the extended graphics.

(6)

The reproduction device according to any of (1) to (5),
wherein the association information associates an extended video which is a video having a fourth luminance range different from and broader than a third luminance range with video HDR information indicating a luminance characteristic of the extended video and video luminance conversion definition information used when luminance conversion from the extended video to a standard video which is a video having the third luminance range is performed,
the recording medium records the extended video, the video HDR information, and the video luminance conversion definition information,
the reading unit reads the extended video, the video HDR information, and the video luminance conversion definition information from the recording medium,
the conversion unit converts the extended video into the standard video based on the video luminance conversion definition information associated with the extended video in the association information, and
the output unit outputs the extended video and the video HDR information associated with the extended video in the association information to a display device which is capable of displaying the extended video and outputs the standard video converted by the conversion unit to a display device which is not capable of displaying the extended video.

(7)

A reproduction method including:
a reading step of reading, by a reproduction device, association information, extended graphics, HDR information, and luminance conversion definition information, from a recording medium having recorded therein the association information which associates the extended graphics, which are graphics having a second luminance range different from and broader than a first luminance range, with the HDR information indicating a luminance characteristic of the extended graphics, and the luminance conversion definition information used when luminance conversion from the extended graphics to standard graphics which are graphics having the first luminance range is performed, the extended graphics, the HDR information, and the luminance conversion definition information;
a conversion step of converting, by the reproduction device, the extended graphics into the standard graphics based on the luminance conversion definition information associated with the extended graphics in the association information; and
an output step of outputting, by the reproduction device, the extended graphics and the HDR information associated with the extended graphics in the association information to a display device which is capable of displaying the extended graphics, and outputting, by the reproduction device, the standard graphics converted in the conversion step to a display device which is not capable of displaying the extended graphics.

(8)

A recording medium recording:
association information configured to associate extended graphics which are graphics having a second luminance range different from and broader than a first luminance range with HDR information indicating a luminance characteristic of the extended graphics, and luminance conversion definition information used when luminance conversion from the extended graphics to standard graphics, which are graphics having the first luminance range is performed;
the extended graphics;
the HDR information; and
the luminance conversion definition information,
wherein a reproduction device reproducing the recording medium performs processes of reading the association information, the extended graphics, the HDR information, and the luminance conversion definition information from the recording medium,
converting the extended graphics into the standard graphics based on the luminance conversion definition information associated with the extended graphics in the association information, and
outputting the extended graphics and the HDR information associated with the extended graphics in the association information to a display device which is capable of displaying the extended graphics, and outputting the converted standard graphics to a display device which is not capable of displaying the extended graphics.

(9)

A reproduction device including:
a reading unit configured to read association information, extended graphics, HDR information, and luminance conversion definition information from a recording medium having recorded therein the association information which associates standard graphics, which are graphics having a first luminance range, with the HDR information indicating a luminance characteristic of the extended graphics, which are graphics having a second luminance range different from and broader than the first luminance range and the luminance conversion definition information used when luminance conversion from the standard graphics to the extended graphics is performed, the standard graphics, the HDR information, and the luminance conversion definition information;
a conversion unit configured to convert the standard graphics into the extended graphics based on the luminance conversion definition information associated with the standard graphics in the association information; and
an output unit configured to output the extended graphics converted by the conversion unit and the HDR information associated with the standard graphics before the conversion in the association information to a display device which is capable of displaying the extended graphics, and to output the standard graphics to a display device which is not capable of displaying the extended graphics.

(10)

The reproduction device according to (9),
wherein the association information is included in information regarding reproduction of the standard graphics.

(11)

The reproduction device according to (10),
wherein the recording medium is a Blu-ray disc, and
the association information is included in a PlayList file as the information regarding the reproduction.

(12)

The reproduction device according to any of (9) to (11),
wherein the luminance conversion definition information is first tone_mapping_info in which one value among 0, 2, and 3 is set as a value of tone_map_model_id, and the HDR information is second tone_mapping_info in which 4 is set as the value of tone_map_model_id.

(13)
The reproduction device according to (12),
wherein the association information is information associating the standard graphics with tone_map_id of the first tone_mapping_info and tone_map_id of the second tone_mapping_info of the standard graphics.

(14)
The reproduction device according to any of (9) to (13),
wherein the association information associates a standard video which is a video having a third luminance range with video HDR information indicating a luminance characteristic of an extended video which is a video having a fourth luminance range different from and broader than the video with the third luminance range and video luminance conversion definition information used when luminance conversion from the standard video to the extended video is performed,
the recording medium records the standard video, the video HDR information, and the video luminance conversion definition information,
the reading unit reads the standard video, the video HDR information, and the video luminance conversion definition information from the recording medium,
the conversion unit converts the standard video into the extended video based on the video luminance conversion definition information associated with the standard video in the association information, and
the output unit outputs the extended video converted by the conversion unit and the video HDR information associated with the standard video before the conversion in the association information to a display device which is capable of displaying the extended video and outputs the standard video to a display device which is not capable of displaying the extended video.

(15)
A reproduction method including:
a reading step of reading, by a reproduction device, association information, extended graphics, HDR information, and luminance conversion definition information from a recording medium having recorded therein the association information which associates standard graphics, which are graphics having a first luminance range, with the HDR information indicating a luminance characteristic of the extended graphics, which are graphics having a second luminance range different from and broader than the first luminance range and the luminance conversion definition information used when luminance conversion from the standard graphics to the extended graphics is performed, the standard graphics, the HDR information, and the luminance conversion definition information;
a conversion step of converting, by the reproduction device, the standard graphics into the extended graphics based on the luminance conversion definition information associated with the standard graphics in the association information; and
an output step of outputting, by the reproduction device, the extended graphics converted in the conversion step and the HDR information associated with the standard graphics before the conversion in the association information to a display device which is capable of displaying the extended graphics, and outputting, by the reproduction device, the standard graphics to a display device which is not capable of displaying the extended graphics.

(16)
A recording medium recording:
association information which associates standard graphics which are graphics having a first luminance range with HDR information indicating a luminance characteristic of the extended graphics which are graphics having a second luminance range different from and broader than the first luminance range and the luminance conversion definition information used when luminance conversion from the standard graphics to the extended graphics is performed;
the standard graphics;
the HDR information; and
the luminance conversion definition information,
wherein a reproduction device reproducing the recording medium performs processes of reading the association information, the extended graphics, the HDR information, and the luminance conversion definition information from the recording medium,
converting the standard graphics into the extended graphics based on the luminance conversion definition information associated with the standard graphics in the association information, and
outputting the converted extended graphics and the HDR information associated with the standard graphics before the conversion in the association information to a display device which is capable of displaying the extended graphics, and outputting the standard graphics to a display device which is not capable of displaying the extended graphics.

DESCRIPTION OF SYMBOLS

1 recording device
2 reproduction device
11 optical disc
52 disc drive
56 decoding processing unit
56A video decoding processing unit
58 HDMI communication unit
81 tone conversion unit
131 decoding processing unit
131A video decoding processing unit
171 decoding processing unit
184 tone conversion unit
221A BDJ object execution unit

The invention claimed is:
1. A reproduction device, comprising:
circuitry configured to:
  receive display information of a display device, brightness characteristic information, a first coded video, and a second coded video;
  decode each of the first coded video and the second coded video;
  convert each of the decoded first coded video and the decoded second coded video to first data, wherein a first brightness range of each of the first coded video and the second coded video is wider than a second brightness range of the first data; and
  output, based on the display information, the decoded first coded video, the decoded second coded video, the brightness characteristic information, and the first data to the display device.
2. The reproduction device according to claim 1, wherein the circuitry is further configured to output, based on the display information, the decoded first coded video, the decoded second coded video, and the brightness characteristic information to the display device.
3. The reproduction device according to claim 1, wherein the circuitry is further configured to output the first data, having the second brightness range, based on the display information to the display device.

4. The reproduction device according to claim 1, wherein each of the first coded video and the second coded video is decoded based on a High Efficiency Video Coding (HEVC) scheme.

5. The reproduction device according to claim 1, wherein each of the first coded video and the second coded video is decoded based on tone mapping definition information.

6. The reproduction device according to claim 1, wherein the conversion of each of the decoded first coded video and the decoded second coded video to the first data is based on tone mapping definition information.

7. A reproduction method, comprising:

in a reproduction device:

receiving display information of a display device, brightness characteristic information, a first coded video, and a second coded video;

decoding each of the first coded video and the second coded video;

converting each of the decoded first coded video and the decoded second coded video to first data, wherein a first brightness range of each of the first coded video and the second coded video is wider than a second brightness range of first data; and outputting, based on the display information, the decoded first coded video, the decoded second coded video, the brightness characteristic information, and the first data to the display device.

8. The reproduction method according to claim 7, further comprising outputting, based on the display information, the decoded first coded video, the decoded second coded video, and the brightness characteristic information to the display device.

9. The reproduction method according to claim 7, further comprising outputting the first data, having the second brightness range, based on the display information to the display device.

10. The reproduction method according to claim 7, wherein the decoding of each of the first coded video and the second coded video is based on a High Efficiency Video Coding (HEVC) scheme.

11. The reproduction method according to claim 7, wherein the decoding of each of the first coded video and the second coded video is based on tone mapping definition information.

12. The reproduction method according to claim 7, wherein the conversion of each of the decoded first coded video and the decoded second coded video to the first data is based on tone mapping definition information.

* * * * *